United States Patent
Fujiki et al.

(10) Patent No.: US 9,082,213 B2
(45) Date of Patent: Jul. 14, 2015

(54) IMAGE PROCESSING APPARATUS FOR COMBINING REAL OBJECT AND VIRTUAL OBJECT AND PROCESSING METHOD THEREFOR

(75) Inventors: Masakazu Fujiki, Kawasaki (JP); Kaname Tomite, Tokyo (JP); Yasuo Katano, Kawasaki (JP); Takayuki Hashimoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 746 days.

(21) Appl. No.: 12/265,546

(22) Filed: Nov. 5, 2008

(65) Prior Publication Data
US 2009/0128552 A1 May 21, 2009

(30) Foreign Application Priority Data

| Nov. 7, 2007 | (JP) | 2007-289966 |
| Dec. 7, 2007 | (JP) | 2007-316810 |
| Jan. 9, 2008 | (JP) | 2008-002163 |
| Jan. 15, 2008 | (JP) | 2008-006291 |

(51) Int. Cl.
G06T 7/00 (2006.01)
G06T 19/00 (2011.01)
G06T 15/06 (2011.01)

(52) U.S. Cl.
CPC ............. *G06T 19/006* (2013.01); *G06T 15/06* (2013.01)

(58) Field of Classification Search
CPC ................................. G06T 19/006; G06T 7/00
See application file for complete search history.

(56) References Cited

U.S. PATENT DOCUMENTS

| 5,933,146 A * | 8/1999 | Wrigley ................. 345/420 |
| 7,477,777 B2 * | 1/2009 | Wells ...................... 382/154 |
| 2005/0231532 A1 | 10/2005 | Suzuki | |
| 2008/0001947 A1 * | 1/2008 | Snyder et al. ............. 345/426 |

FOREIGN PATENT DOCUMENTS

| JP | 5046782 A | 2/1993 |
| JP | 10334278 A | 12/1998 |
| JP | 2001188917 A | 7/2001 |
| JP | 2005-293142 A | 10/2005 |
| JP | 2007042055 A | 2/2007 |

OTHER PUBLICATIONS

Automatic Generation of Consistent Shadows for Augmented Reality, Jacobs et al., 2005.*
Ray Tracing Point Set Surfaces, Adamson et al., 2003.*
Streaming Video Textures for Mixed Reality Applications in Interactive Ray Tracing Environments, Pomi et al., 2003.*
Interactive Rendering with Real-World Illumination, Gibson et al., 2000.*

(Continued)

*Primary Examiner* — David Zarka
*Assistant Examiner* — Phong Nguyen
(74) *Attorney, Agent, or Firm* — Canon USA Inc. IP Division

(57) ABSTRACT

When an image in a virtual space in which a virtual object is arranged is generated using a ray tracing method, and when it is determined that a ray which is generated in accordance with the ray tracing method successively intersected an approximate virtual object such as a hand which is a real object at lest twice, an image corresponding to a first intersection is generated in accordance with the ray emitted to the first intersection.

7 Claims, 34 Drawing Sheets

(56) References Cited

OTHER PUBLICATIONS

A Mixed Reality System with Visual and Tangible Interaction Capability, Ohshima et al., 2003.*
Realtime Ray Tracing on current CPU Architectures, Benthin, 2006.*
Occlusion in collaborative augmented environments, Fuhrmann et al., Computers & Graphics 23, 1999, pp. 809-819.*
Ray Tracing: Graphics for the Masses, Rademacher, 1997, pp. 1-14.*
Ray Tracing Animated Scenes using Coherent Grid Traversal, Wald et al., ACM SIGGRAPH, 2006, pp. 485-493.*
Chevrier, C., "Handling Interactions between Real and Virtual Worlds", IEEE, 1996, pp. 74-83.

"Introduction to Realtime Ray Tracing", Siggraph 2005—Course 38, PART I: Fundamentals, The Basic Algorithm, Ch 10 Ray Tracing, pp. 153-189.
Pomi, A., et al., "Interactive Ray Tracing for Virtual TV Studio Applications", Journal of Virtual Reality and Broadcasting, 2005, vol. 2, No. 1.
W•llert, T., "Realtime and Interactive Ray Tracing, Basics and Latest Developments", Advanced Seminar Thesis, Jun. 22, 2006.
Pomi, A., et al., "Interactive In-Shader Image-Based Visual Hull Reconstruction and Compositing of Actors in a Distributed Ray Tracing Framework".
Scheer, F., et al., "Towards Using Realistic Ray Tracing in Augmented Reality Applications with Natural Lighting".

* cited by examiner

IMAGE PROCESSING APPARATUS FOR COMBINING REAL OBJECT AND VIRTUAL OBJECT AND PROCESSING METHOD THEREFOR

BACKGROUND OF THE INVENTION

1. Field of the Invention

The present invention relates to a technique of generating an image in a virtual space in accordance with a ray tracing method.

2. Description of the Related Art

In recent years, a mixed reality technique in which a computer graphics (CG) image is superposed on a photographed scenery image serving as a background so that a composite image is generated and a person who views the composite image has a feeling that a virtual object is actually there has been proposed.

In addition, a system which is constituted by combining the mixed reality technique and a ray-tracing technique has been proposed (refer to "Interactive Mixed Reality Rendering in a Distributed Ray Tracing Framework", Andreas Pomi, and Philipp Slusallek, and "IEEE and ACM International Symposium on Mixed and Augmented Reality" (ISMAR) 2004, Student Colloquium, Arlington, USA, Nov. 2-5, 2004). In rendering systems disclosed in these articles, a virtual object is rendered on a photographed image obtained as a video image so as to be superposed on the photographed image by means of the ray tracing technique whereby a mixed reality image is generated. In an example of rendering using this system, an image including an image of a ball which is a virtual object, which is a CG image, and which makes a shadow on a floor which is a real object is generated. To realize such an image, a virtual object representing the floor which is the real object is defined. Then, an image serving as the shadow cast on the virtual object corresponding to the floor is generated, and is combined with an image corresponding to the floor which is the real object.

Furthermore, a method for arranging a virtual object representing a real object in a mixed reality space in accordance with a result of sensing of a position and a posture of the real object and generating an image which shows a correct relationship between a depth of the virtual object and a depth of the real object has been proposed (refer to Japanese Patent Laid-Open No. 2005-293142).

In general, a person recognizes the positional relationship between objects in accordance with visual information such as a shadow and a reflection image. Therefore, also in a case of a mixed reality space, a shadow and a reflection should be correctly shown so that the person can correctly recognize a positional relationship between objects in the mixed reality space. In this case, not only a shadow and a reflection of a virtual object cast on another virtual object but also a shadow and a reflection of a real object cast on a virtual object should be correctly shown.

In the foregoing articles, a shadow of the virtual object cast on the virtual object (shown as a transparent object) representing the floor which is the real object is rendered. Here, it is assumed that two virtual objects represent real objects and one of them makes a shadow on the other. In this case, since an image of the shadow is shown in a photographed image of a real space, it is not necessary to generate an image corresponding to the shadow when the virtual objects are rendered. However, since such a case is not considered in the foregoing articles, an unnecessary image of a shadow is generated in a photographed image having a shadow. This problem may occur when a self-shadow is generated in a virtual object representing a real object. Furthermore, there arises another problem in the foregoing articles in that a reflection may not be correctly shown similarly to the case of the shadow.

In addition, in the technique in the related art, even if a position, a posture, and a shape of a real object represented by an image included in a photographed image is different from those of a virtual object corresponding to the real object, processing of generating an MR (Mixed Reality) image is performed without taking such difference into consideration. Therefore, a contradictory MR (mixed reality) image may be generated.

SUMMARY OF THE INVENTION

The present invention provides a technique of generating a correct image of an approximate virtual object including a shadow and a reflection which includes a plurality of virtual elements so that an approximate shape of a real object having an uneven surface is realized.

According to an exemplary embodiment of the present invention, there is provided an image processing apparatus that generates an image in a virtual space in which a virtual object is arranged using ray tracing method, including an arrangement unit configured to arrange an approximate virtual object which includes at least one virtual element and which has a shape obtained by approximating a shape of a real object in the virtual space, a determination unit configured to determine an intersection of a ray generated in accordance with the ray tracing method and the approximate virtual object, and a generation unit configured to generate, when it is determined that the ray successively intersected the approximate virtual object at least twice, an image corresponding to a first intersection in accordance with the ray emitted to the first intersection.

According to another exemplary embodiment of the present invention, there is provided an image processing apparatus that generates an image in a virtual space in which a virtual object is arranged using a ray tracing method, including an extraction unit configured to extract a region corresponding to a real object included in a photographed image obtained using a camera, an arrangement unit configured to arrange an approximate virtual object which includes at least one virtual element and which has a shape obtained by approximating a shape of a real object in the virtual space, and a generation unit configured to generate an image by combining an image of a virtual object different from the approximate virtual object, which is projected in the virtual space with an image of the real object using the ray tracing method. The generation unit generates an image which is located out of the region extracted using the extraction unit and which is included in a region corresponding to the approximate virtual object by performing an operation of detecting an intersection of a ray and a virtual object by means of the ray tracing method.

Further features of the present invention will become apparent from the following description of exemplary embodiments with reference to the attached drawings.

DESCRIPTION OF THE EXEMPLARY EMBODIMENTS

While the present invention is described with reference to exemplary embodiments hereinafter, it is to be understood that components included in the exemplary embodiments are merely examples and the invention is not limited to the exemplary embodiments.

In this exemplary embodiment, an image in a virtual space (virtual-space image) in which shadows and reflections of a real object and a virtual object are rendered is generated by means of a general ray tracing method. Then, the generated virtual-space image is superposed on a real-space image so that a composite image is generated. The generated composite image is displayed for a user.

However, in order that a user who views an MR space which is constituted by combining a real space and a virtual space may appropriately recognize the positional relationship between objects in accordance with visual information, not only a shadow and a reflection of a virtual object but also a shadow and a reflection of a real object should be appropriately shown.

Accordingly, in this exemplary embodiment, in order to show the shadow and the reflection of the real object in the virtual-space image, when a ray successively intersects an approximate virtual object which include a plurality of virtual elements so that an approximate shape of the real object (a hand, for example) is obtained, generation of rays thereafter is stopped. Therefore, an appropriate shadow is rendered and a load of calculation is reduced.

Figure 1:
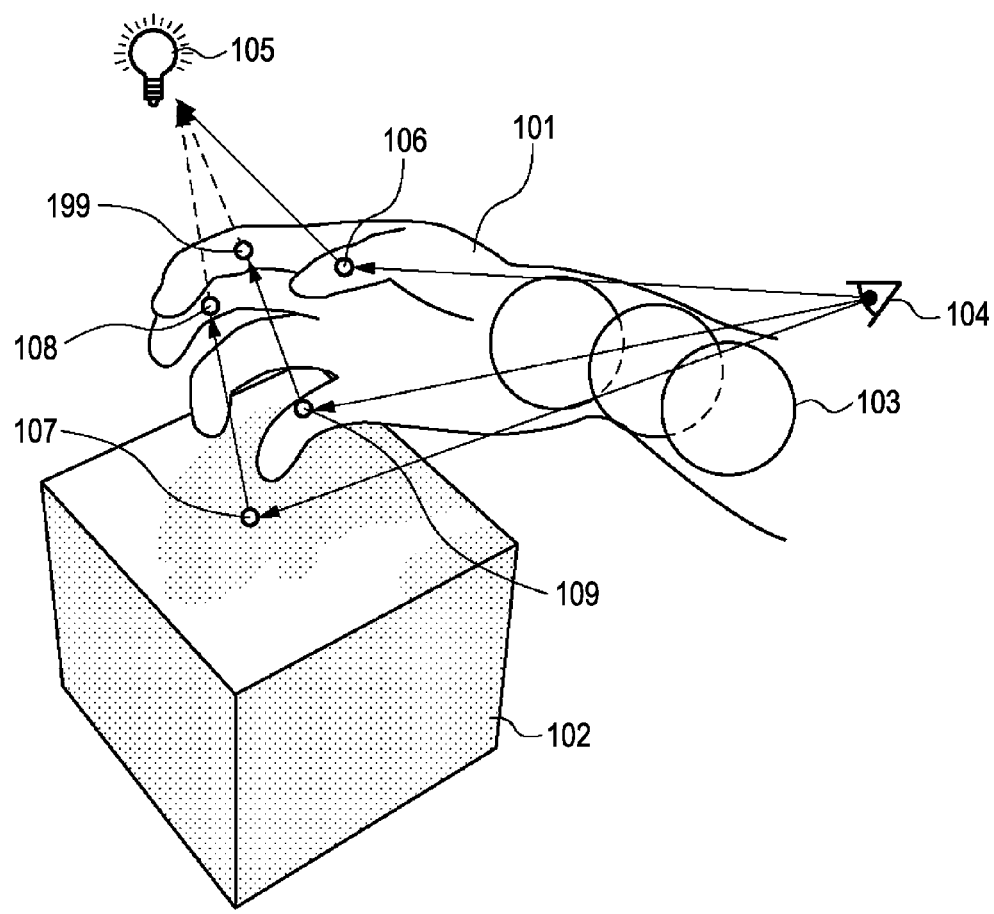
FIG. 1 illustrates a problem which may occur when a ray is emitted by means of a ray tracing method.

FIG. 1 illustrates a problem which may occur when a ray is emitted by means of the ray tracing method. Referring to FIG. 1, in order to show a hand 101 which is a real object as if the hand 101 makes a shadow on a virtual object 102, a plurality of virtual elements 103 are generated so that an approximate shape of the hand 101 is obtained and shadows of the plurality of virtual elements 103 are cast on the virtual object 102.

Here, the virtual elements 103 correspond to plurality of virtual objects which constitute the shape of the hand 101. In FIG. 1, the hand 101 is shown as an aggregate of a plurality of virtual balls. That is, a single ball corresponds to one of the virtual elements 103 in FIG. 1. Note that although a number of virtual elements 103 which constitute a part of the hand 101 among all the virtual elements 103 are shown in FIG. 1, the hand 101 is constituted by the plurality of virtual elements 103 of various sizes.

Here, when the virtual-space image is generated according to this exemplary embodiment, shadows and reflections which may be generated between virtual objects, between real objects, and between a virtual object and a real object are rendered as follows.
(1) A shadow and a reflection of a virtual object cast on another virtual object are rendered by means of a general ray tracing method.
(2) A shadow and a reflection of a virtual object cast on a real object are rendered taking influence of a shadow and a reflection of the virtual object cast on an approximate virtual object into consideration.
(3) A shadow and a reflection of a real object cast on a virtual object is rendered taking influence of a shadow and a reflection of an approximate virtual object cast on the virtual object into consideration.
(4) A shadow and a reflection of a real object cast onto another real object are rendered by utilizing a real-space image instead of an approximate virtual object.

In FIG. 1, a viewpoint (virtual viewpoint) 104 is set in a virtual space so as to correspond to a viewpoint of a user of a certain posture.

According to the ray tracing method, rays corresponding to pixels in a virtual-space image to be generated are emitted from the virtual viewpoint 104. One of the emitted rays intersects one of the virtual elements 103 at an intersection 106. By tracing a path of the ray reflected at the intersection 106, a virtual light source 105 which affects the intersection 106 is detected. As a result of the detection, the reflected ray reaches the virtual light source 105. Here, a blocking object does not exist between the intersection 106 and the virtual light source 105. That is, a shadow and a reflection are not cast on the intersection 106. Therefore, a pixel corresponding to the intersection 106 in the virtual-space image corresponds to a pixel in a real-space image captured from a viewpoint the same as the virtual viewpoint 104 of the virtual-space image.

One of the rays emitted from the virtual viewpoint 104 intersects one of the virtual elements 103 (referred to as a "first virtual element" 103 here) at an intersection 107. Furthermore, the ray reflected at the intersection 107 intersects another of the virtual elements 103 (referred to as a "second virtual element" 103 here) at an intersection 108 before reaching the virtual light source 105. That is, a ray emitted from the virtual light source 105 is blocked by the second virtual element. Therefore, influence of a shadow of the second virtual element 103 is taken into consideration in order to determine a value of a pixel corresponding to the intersection 107 in the virtual-space image. Consequently, the value of the pixel corresponding to the intersection 107 in the virtual-space image is lowered, that is, the pixel becomes dark, by an amount of shielding of the ray emitted from the virtual light source by the hand 101 which is the real object. In this case, a value of the pixel corresponding to the intersection 107 in the virtual-space image which has not yet been influenced by the second virtual element 103 is calculated first (it is assumed that the virtual elements 103 do not exist, and a value of the pixel corresponding to the intersection 107 on the virtual object 102 is obtained). Then, influence of the shadow of the second virtual element 103 is calculated. Thereafter, a final value of the pixel corresponding to the intersection 107 in the virtual-space image is obtained.

One of the rays emitted from the virtual viewpoint intersects one of the virtual elements 103 (referred to as a "third virtual element" 103 here) at an intersection 109. Furthermore, the ray reflected at the intersection 109 intersects another of the virtual elements 103 (referred to as a "fourth virtual element" 103 here) at an intersection before reaching the virtual light source 105. That is, a ray emitted from the virtual light source 105 is blocked by the fourth virtual element 103. Therefore, influence of a shadow of the fourth virtual elements 103 is taken into consideration in order to determine a value of a pixel corresponding to the intersection 109 in the virtual-space image. Furthermore, since the intersection 109 is influenced by overlapping of fingers, i.e., a little finger and an annular finger, in the real space, that is, since the intersection 109 is influenced by shadows of real objects, the value of the pixel corresponding to the intersection 109 may become lower than that actually shown. Since calculation is performed on a shadow at the intersection 109 in the virtual object which should not be calculated, the pixel corresponding to the intersection 109 becomes darker than adjacent pixels, which is not appropriate. Consequently, realistic sensation is deteriorated.

As with the case of the intersection 109, since a portion which is influenced by a real shadow generated in a real object 101 and a shadow of one of the virtual elements 103 unnecessarily becomes dark, an image of a shadow which is optically incorrect is rendered.

Figure 2:
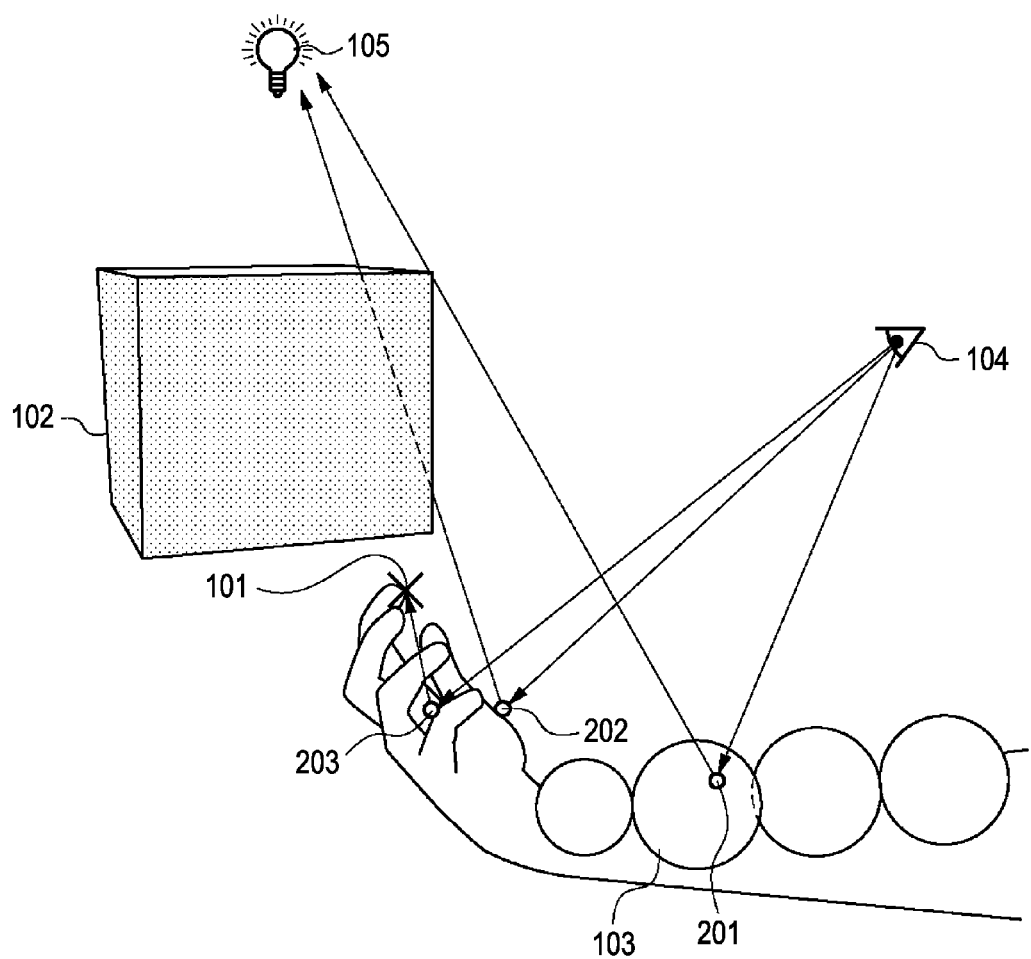
FIG. 2 illustrates another problem which may occur when a ray is emitted by means of the ray tracing method.

FIG. 2 illustrates another problem which may occur when a ray is emitted by means of the ray tracing method. Referring to FIG. 2, in order to show the virtual object 102 as if the virtual object 102 makes a shadow on the hand 101 which is the real object, an aggregate of a plurality of virtual elements 103 are used so as to attain an approximate shape of the hand 101, and shadows of the plurality of virtual elements 103 are cast on the hand 101. That is, the relationship between the hand 101 and the virtual object 102 in FIG. 2 is opposite to the relationship between the hand 101 and the virtual object 102 in FIG. 1.

One of rays emitted from the virtual viewpoint 104 intersects one of the virtual elements 103 at an intersection 201. By tracing a path of the ray reflected at the intersection 201, a virtual light source 105 which affects the intersection 201 is detected. As a result of the detection, the reflected ray reaches the virtual light source 105. Here, a blocking object does not exist between the intersection 201 and the virtual light source 105. That is, a shadow and a reflection are not cast on the intersection 201. Therefore, a pixel corresponding to the intersection 201 in the virtual-space image corresponds to a pixel in a real-space image captured from a viewpoint the same as the virtual viewpoint 104 of the virtual-space image.

One of the rays emitted from the virtual viewpoint 104 intersects one of the virtual elements 103 at an intersection 202. Furthermore, the ray reflected at the intersection 202 intersects the virtual object 102 before reaching the virtual light source 105. That is, a ray emitted from the virtual light source 105 to the intersection 202 is blocked by the virtual object 102. Therefore, influence of a shadow of the virtual object 102 is taken into consideration in order to determine a value of a pixel corresponding to the intersection 202 in the virtual-space image. In this case, the value of the pixel corresponding to the intersection 202 is obtained by adding a result of calculation of the influence of the shadow of the virtual object 102 to a value of a pixel, which corresponds to the pixel corresponding to the intersection 202, in the real-space image which is captured from a viewpoint the same as the virtual viewpoint 104 of the virtual-space image.

One of the rays generated in the virtual viewpoint 104 intersects one of the virtual elements 103 (referred to as a "first virtual element" 103 here) at an intersection 203. Furthermore, the ray reflected at the intersection 203 intersects another of the virtual elements 103 (referred to as a "second virtual element" 103 here) before reaching the virtual light source 105. That is, a shadow is cast on the intersection 203 due to the hand 101, and in addition, a real shadow affects a portion in the real-space image corresponding to the intersection 203. Since the ray reflected by the intersection 203 intersects the second virtual element 103 after intersecting the first virtual element 103, in accordance with the foregoing description, a value of a pixel corresponding to the intersection 203 is obtained as follows. Specifically, the value of the pixel corresponding to the intersection 203 is obtained by adding a result of calculation of the influence of the shadow of the second virtual element 103 to a value of a pixel, which corresponds to the pixel corresponding to the intersection 203, in the real-space image which is captured from a viewpoint the same as the virtual viewpoint 104 of the virtual-space image. However, when the value of the pixel corresponding to the intersection 203 is determined as described above, a final pixel value is obtained by adding the influence of the shadow in the virtual-space image in addition to the influence of the shadow in the real-space image to the pixel value in the real-space image. Consequently, as with the case of the intersection 109, an optically incorrect value of the pixel corresponding to the intersection 203 is obtained.

Figure 3:
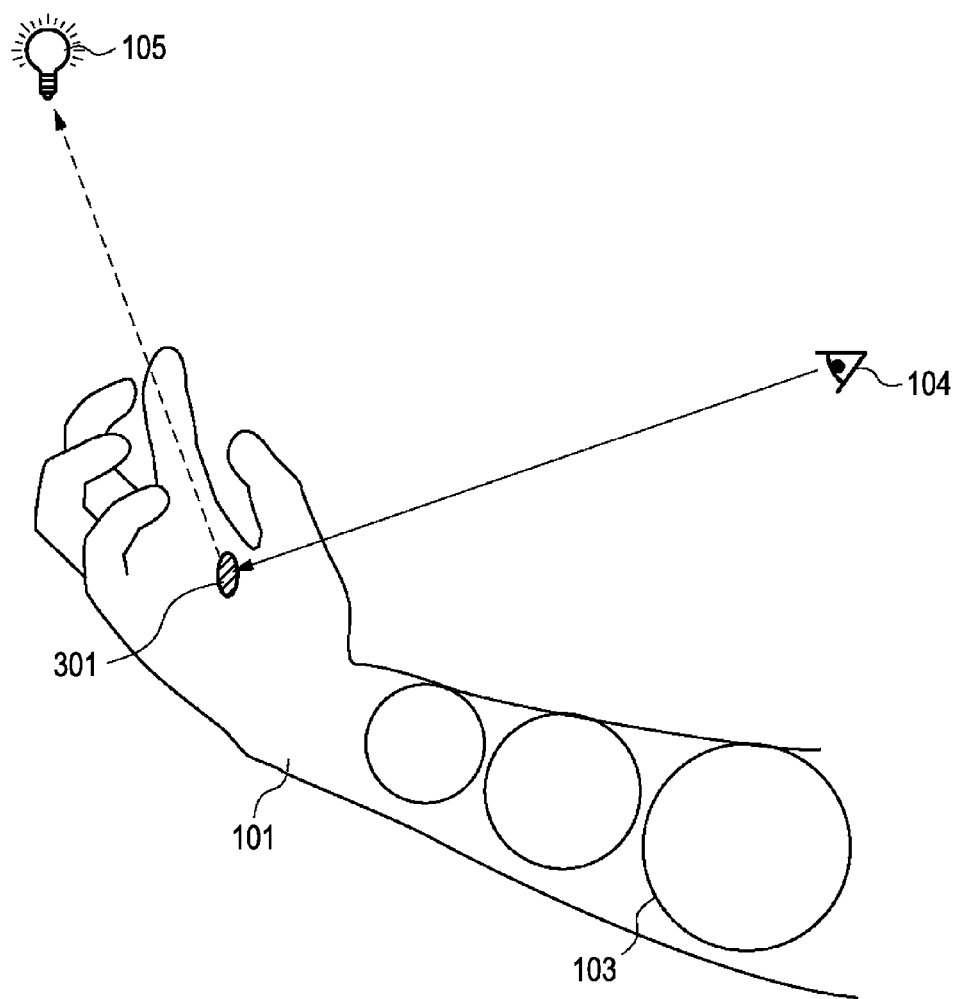
FIG. 3 illustrates a further problem which may occur when a ray is emitted by means of the ray tracing method.

FIG. 3 illustrates a further problem which may occur when a ray is emitted by means of the ray tracing method. FIG. 3 shows an example of a case where optical inconsistency occurs due to a self-shadow generated in the virtual elements 103.

In a three dimensional measurement technique and a light source estimation technique it is difficult to faithfully reproduce a real environment. Therefore, it is not necessarily the case that the shape of the approximate virtual object configured by the plurality of virtual elements 103 is exactly equal to the shape of the real object 101. That is, a virtual shadow which does not exist in reality may be rendered on the real-space image serving as a background so as to be superposed on the real-space image depending on a method for arranging a virtual light source or approximate accuracy of the approximate virtual object. In a region 301, a self-shadow is generated since a ray emitted from the virtual viewpoint 104 is internally reflected in the virtual elements 103 a plurality of times. Therefore, optical inconsistency occurs in the region 301. Note that the self-shadow will be described in detail hereinafter with reference to FIG. 10.

The problems which may occur when rays are emitted by means of the ray tracing method, that is, problems which may occur when the plurality of virtual elements 103 are arranged in the virtual space and rays are emitted from the virtual viewpoint by means of the ray tracing method are described above with reference to FIGS. 1 to 3. As described above, as for the intersections 109 and 203, the problems occur since the rays emitted in the virtual viewpoint 104 successively intersect the virtual elements 103.

This exemplary embodiment solves a problem of optical inconsistency which occurs when a ray generated in the virtual viewpoint 104 successively intersect the virtual elements 103.

Figure 4:
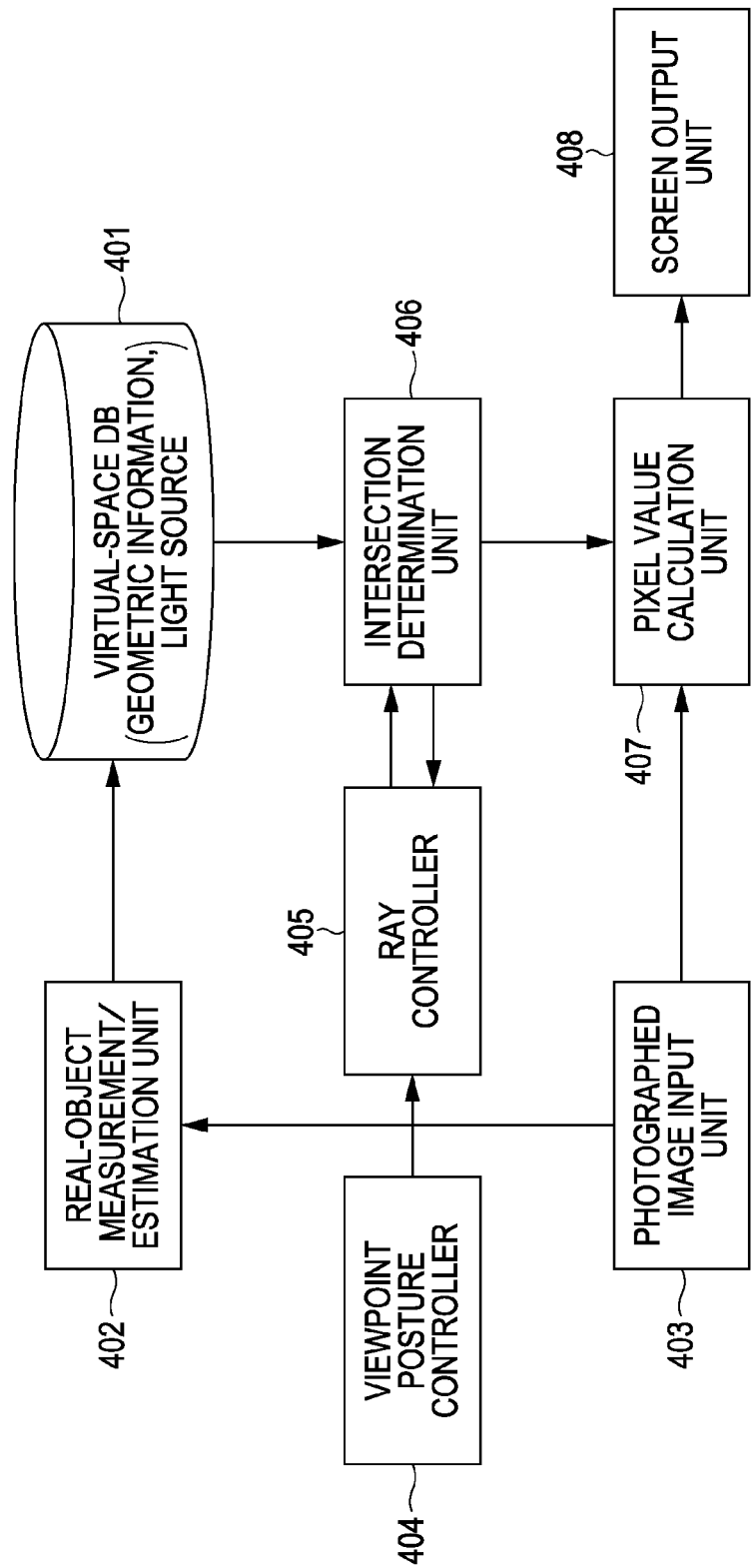
FIG. 4 is a block diagram illustrating an example of a functional configuration of an image processing apparatus according to a first exemplary embodiment of the present invention.

FIG. 4 is a block diagram illustrating an example of a functional configuration of an image processing apparatus according to this exemplary embodiment.

A virtual-space database (DB) 401 stores therein a variety of information, such as information on a virtual object including information on a shape of a virtual object, information on a posture of a virtual object, information on material of a virtual object, information on a virtual light source, and information on a virtual viewpoint. The information stored in the virtual-space DB 401 may be appropriately changed in accordance with an operation performed by a user or a flow of processing. For example, the information on a posture of a virtual object and the information on material of a virtual object may be changed in accordance with an operation performed by a user. Specifically, the latest information on a virtual object, the latest information on a viewpoint, and the latest information on a light source is normally stored in the virtual-space DB 401.

A real-object measurement/estimation unit 402 measures or estimates information on a real object including information on a shape of a real object, information on a posture of a real object, and information on material of a real object, and the information on a virtual light source. Then, the real-object measurement/estimation unit 402 supplies the measured or estimated information on a real object and the measured or estimated information on a virtual light source to the virtual-space DB 401. In this exemplary embodiment, the real-object measurement/estimation unit 402 estimates a depth by performing stereo matching using a real-space image obtained using a photographed image input unit 403. Furthermore, the real-object measurement/estimation unit 402 estimates a three-dimensional shape on the basis of a result of the estimation of the depth. Here, a known technique is employed for a method for measuring and estimating a real object performed using the real-object measurement/estimation unit 402, and therefore, detailed description of operation of the real-object measurement/estimation unit 402 is not included herein. Examples of the operation of the real-object measurement/estimation unit 402 include operation employing a three-dimensional reconstruction by means of stereo matching using a plurality of cameras and operation employing a measurement/estimation method using measurement equipment such as a three-dimensional range finder.

The photographed image input unit 403 obtains, as data, an image in a real space captured using a video camera disposed on an HMD (Head Mount Display) on a head of a user who views a composite image constituted by a real-space image and a virtual-space image. Such a video camera captures moving images in the real space, and the captured images (real-space images) corresponding to frames are successively supplied to the photographed image input unit 403. The photographed image input unit 403 supplies the real-space images received from the video camera to the real-object measurement/estimation unit 402 and a pixel value calculation unit 407.

A viewpoint posture controller 404 obtains posture information of the video camera (information on a posture in a viewpoint), and sets the obtained posture information as posture information in a viewpoint (virtual viewpoint) to be set in a virtual space. Various methods may be employed as a method for obtaining the posture information of the video camera using the viewpoint posture controller 404. For example, a six-degree-of-freedom sensor may be disposed on the video camera, and the posture information in the virtual viewpoint may be obtained using a sensor controller in accordance with a measurement value obtained using the six-degree-of-freedom sensor. Alternatively, a two-dimensional marker may be arranged in the real space, an image of the real object may be obtained using the video camera, and the posture information in the virtual viewpoint may be obtained using the obtained real-space image. Note that these methods which are described above as examples of the method for obtaining the posture information in the virtual viewpoint are known techniques, and therefore, detailed description thereof is not included herein.

A ray controller 405 emits rays from the virtual viewpoint and controls paths of the emitted rays in order to obtain information on rays which are emitted from the virtual light source and which are focused on the virtual viewpoint in accordance with a known ray tracing method. The ray tracing method employs an algorithm in which an intersection of a ray transmitted through a pixel in a virtual screen and the virtual object and a path from the intersection to the virtual light source are calculated so that a value of the pixel is obtained. The ray tracing method will be described in detail hereinafter.

Furthermore, the ray controller 405 generates, when the ray (referred to as a "first ray" here) intersects the virtual object, another ray (referred to as a "second ray" here) used to calculate a shadow, a reflection, and refraction in accordance with the information on material of the virtual object by setting an intersection of the first ray and the virtual object as an origin. Here, the ray emitted from the virtual viewpoint is referred to as a "first-order ray", and the number of an order of the ray becomes large in accordance with the number of times the reflection and the refraction occur. That is, a ray reflected once is referred to as a "second-order ray", and a ray reflected twice is referred to as a "third-order ray". The ray controller 405 stops generation of new rays when a ray is emitted to infinity or reaches the virtual light source or when a stop instruction is received from an intersection determination unit 406.

The intersection determination unit 406 determines a virtual object among virtual objects (virtual objects arranged in accordance with virtual object information stored in the virtual-space DB 401) arranged in the virtual space which intersected and reflected the ray generated using the ray controller 405. When the intersection determination unit 406 determines that the ray is successively intersected the approximate virtual object, the intersection determination unit 406 transmits a stop instruction to the ray controller 405.

The pixel value calculation unit 407 calculates a value of the pixel corresponding to a portion in the virtual screen which intersects the ray generated in the virtual viewpoint using a result of the determination made by the intersection determination unit 406 in accordance with the algorithm of the ray tracing method (which will be described in detail hereinafter). When the ray does not intersect any of the virtual objects or when it is not necessary to take influence of a shadow or a reflection of an object which intersects the approximate virtual object into consideration, the pixel value calculation unit 407 determines the value of the pixel corresponding to the portion in the virtual screen which intersects the ray generated in the virtual viewpoint as follows. Specifically, a value of a pixel in a real-space image obtained using the photographed image input unit 403 which corresponds to the pixel of the portion in the virtual screen which intersects the ray is employed for the value of the pixel of the portion in the virtual screen which intersects the ray. In addition, when the ray intersects the approximate virtual object and influence of a shadow and a reflection should be taken into consideration, first, the photographed image input unit 403 obtains the value of the pixel in the real-space image which corresponds to the pixel in the position in the virtual screen which intersects the ray. Then, a pixel value which is obtained by adding the influence of the shadow and the reflection to the obtained pixel value is determined as a final pixel value.

When it is determined that the ray intersects one of the virtual objects and when an object which blocks a ray emitted from the virtual light source does not exist, the pixel value calculation unit 407 calculates a reflection and refraction in accordance with the information on material of the one of the virtual objects. Then, a pixel value obtained by adding a result of the calculation of the shadow to the calculation result is obtained as the value of the pixel corresponding to the portion in the virtual screen which intersects the ray. The calculation is performed in accordance with the algorithm of a known ray tracing method.

When it is determined that the ray intersects one of the virtual objects and when the approximate virtual object blocks the ray emitted from the virtual light source, the reflection and refraction of the ray emitted to the one of the virtual objects are calculated, and thereafter, influence of a shadow of the approximate virtual object is calculated. In this way, the value of the pixel in a portion in the virtual screen which intersects the ray is obtained.

When it is determined that the ray is emitted to infinity, the value of the pixel in the real-space image obtained using the photographed image input unit 403 which corresponds to the pixel in the position in the virtual screen which intersects the ray is obtained. Then, the obtained pixel value is set as the value of the pixel in the position in the virtual screen which intersects the ray.

When the ray intersects the approximate virtual object and when the ray emitted from the virtual light source is blocked by another virtual object in a course of searching for the light source, the value of the pixel in the real-space image obtained using the photographed image input unit 403 which corresponds to the pixel in the position in the virtual screen which intersects the ray is obtained. Then, a pixel value obtained by taking the influence of the shadow and the reflection into consideration is added to the obtained pixel value thus determining a final pixel value.

Note that the pixel value calculation unit 407 performs such processing of determining (calculating) a pixel value on pixels included in the virtual-space image. By this, the pixel value calculation unit 407 generates a virtual-space image corresponding to a single frame. The generated virtual-space image is supplied to a screen output unit 408 in a later stage.

The screen output unit 408 combines the virtual-space image supplied from the pixel value calculation unit 407 with the real-space image and supplies a resultant composite image to a display apparatus included in the HMD.

Figure 5:
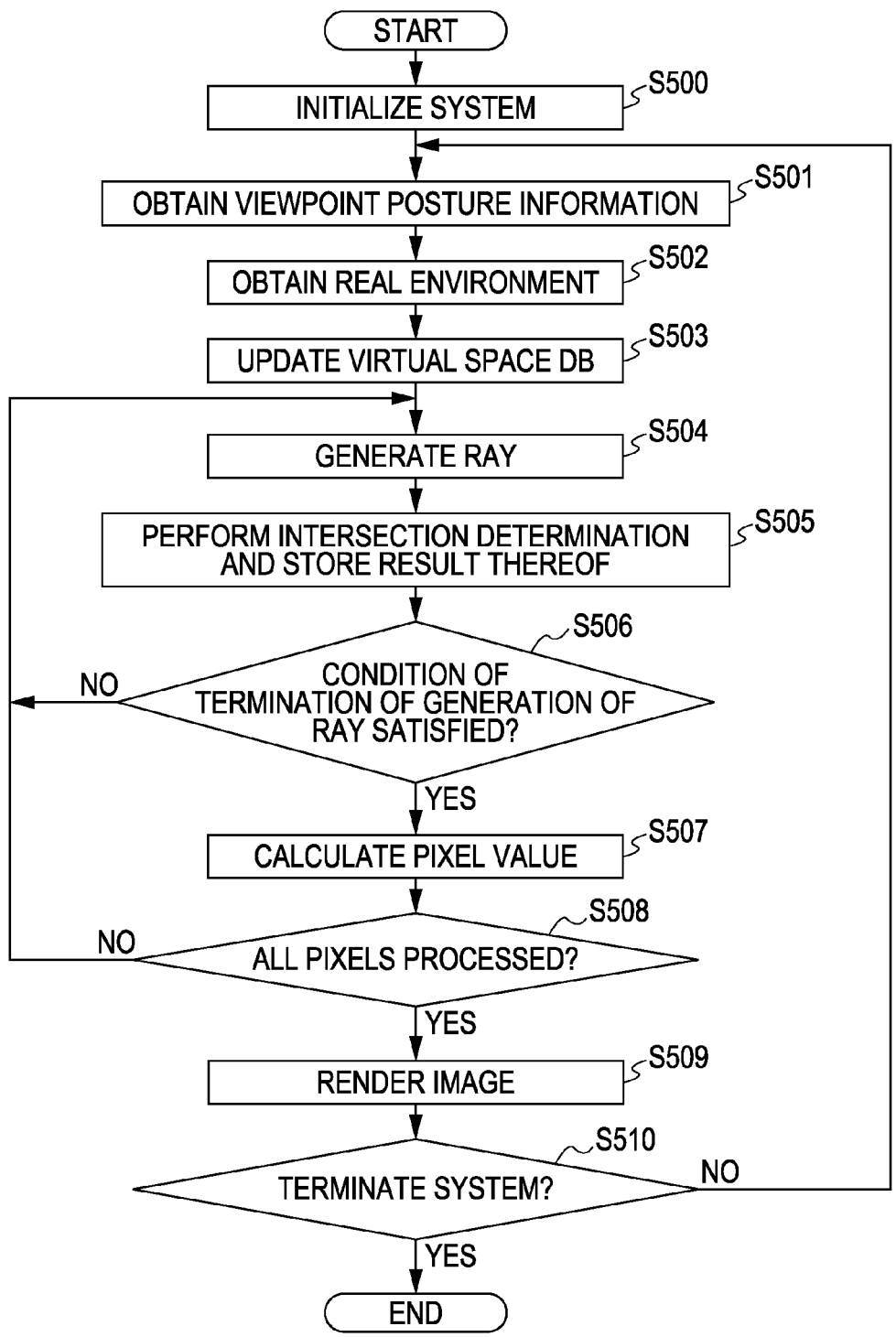
FIG. 5 is a flowchart illustrating processing of generating a virtual-space image by means of the ray tracing method using the image processing apparatus according to the first exemplary embodiment of the present invention.

FIG. 5 is a flowchart illustrating processing of generating the virtual-space image by means of the ray tracing method using the image processing apparatus according to the this exemplary embodiment. Note that the image processing apparatus of this exemplary embodiment performs processing of obtaining the real-space image in parallel to the processing performed in accordance with the flowchart shown in FIG. 5. Therefore, the image processing apparatus of this exemplary embodiment performs not only the processing performed in accordance with the flowchart shown in FIG. 5 but also other processes. Furthermore, in the processing performed in accordance with the flowchart shown in FIG. 5, an operation performed when a ray intersects the approximate virtual object will be mainly described. That is, descriptions of operations in other situations are simplified or are not described in detail herein.

In step S500, units other than the virtual-space DB 401 are initialized. Different initializing operations are performed on the different units. In the initializing operations, storage areas required for performing processing described below are obtained, for example.

In step S501, the viewpoint posture controller 404 obtains information on a posture in a viewpoint. Then, the viewpoint posture controller 404 transmits the obtained information on a posture in the viewpoint to the virtual-space DB 401.

In step S502, the real-object measurement/estimation unit 402 estimates information (information on a shape, information on a posture, and information on material, for example) on a real object represented by a real-space image and information on a virtual light source using the real-space image obtained using the photographed image input unit 403. This estimating technique is known, and therefore, description thereof is not included herein.

If a direction and darkness of a shadow generated due to influence of the light source determined in accordance with the estimated information on the virtual light source is considerably different from those generated due to influence of the real light source, it is highly possible that realistic sensation is deteriorated. Therefore, it is desirable that information on a position, information on the direction, and information on the darkness of the real light source are faithfully realized in the virtual space. Here, various methods for reproducing an environment of the real light source in the virtual space have been proposed. An example of the various methods is a technique of extracting a highlight component from the real-space image obtained using the photographed image input unit 403, and calculating and estimating the information (the information on the position, the information on the direction, and the information on the darkness) on the real light source by analyzing a main component of the highlight component. As described above, since various methods for obtaining a three-dimensional shape and various methods for estimating the light source in a real environment have been proposed, any of them may be suitably selected in accordance with a system desired to be configured.

Then, the real-object measurement/estimation unit 402 transmits the estimated information to the virtual-space DB 401.

In step S503, the virtual-space DB 401 updates information which has been stored in the virtual-space DB 401 by replacing the information which has been stored in the virtual-space DB 401 by information supplied in step S501 and step S502.

Then, the virtual-space DB 401 sets the information on a posture of a viewpoint supplied from the viewpoint posture controller 404 in step S501 as information on a posture in a virtual viewpoint. The information on posture in the virtual viewpoint is stored in the virtual-space DB 401.

Furthermore, the virtual-space DB 401 generates an approximate virtual object based on the information on the real object supplied form the real-object measurement/estimation unit 402 in step S502 (that is, an approximate virtual object is generated by combining the virtual elements), and arranges the approximate virtual object so that the approximate virtual object takes a posture corresponding to the information on a posture included in the information on the real object. Here, the virtual elements may be represented by points each of which only has three-dimensional position information, or may be represented by triangle patches each of which is aggregate of the points. That is, the approximate virtual object may be constituted by a group of points or a group of polyhedrons. However, in an image generating method in accordance with the ray tracing method, it is not necessary to constitute the virtual object using polyhedrons.

In general, since processing of determining an intersection of a ray and a ball is performed at high speed and with reduced calculation cost, the virtual elements are sphere objects each having arbitrary radius parameters in this exemplary embodiment. Accordingly, the approximate virtual object in this exemplary embodiment is configured as a virtual object which includes a plurality of sphere objects each having arbitrary radius parameters and which has a shape approximating a shape of the real object. However, the approximate virtual object may be constituted by polyhedrons or may be constituted in accordance with a metaball representation.

In step S503, a virtual light source is set in the virtual space in accordance with the information on the virtual light source obtained in step S502. That is, the light source in the real space is copied to the virtual space. However, a virtual light source which meets all information items included in the information on the virtual light source may not be set in the virtual space in step S502. In this case, a light source having the highest contribution ratio (brightness value) in the real space is preferentially arranged in the virtual space. Note that a method for setting the virtual light source is not limited to this.

In step S503, the virtual-space DB 401 arranges a virtual object (the virtual object 102 shown in FIG. 1, for example) in addition to the approximate virtual object in the virtual space.

In step S504, the ray controller 405 emits a ray from a position set as a current origin in accordance with the ray tracing method. When the processing of step S504 is performed for the first time, the ray controller 405 emits a ray to be passed through a position of a pixel in which a value thereof is to be determined in the virtual screen from the virtual viewpoint set in step S503.

Here, the ray tracing method includes an algorithm in which values of pixels in the virtual screen are obtained by calculating rays which emit from the virtual viewpoint serving as the origin and which pass through the virtual screen so that rays emitted to the virtual viewpoint are calculated.

The ray tracing method will now be described in more detail.

Figure 6:
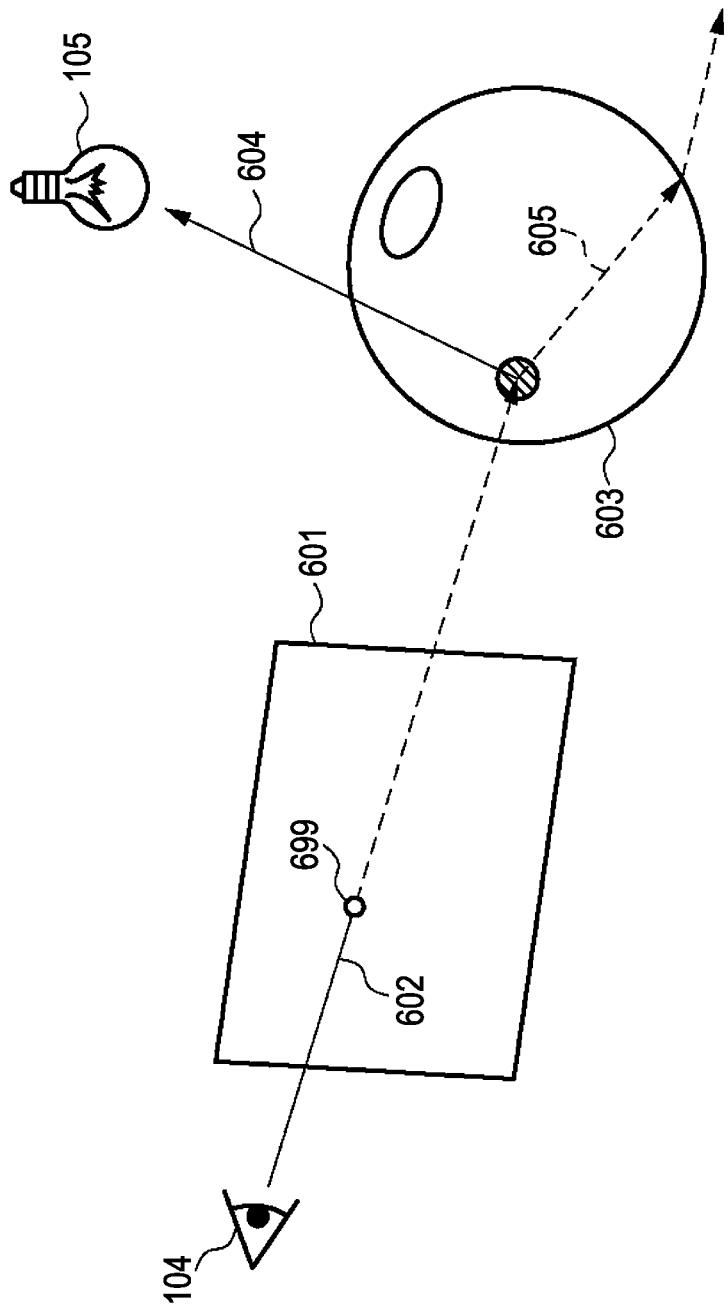
FIG. 6 illustrates a system in which an image is generated by means of the ray tracing method.

FIG. 6 illustrates a system in which an image is generated by means of the ray tracing method.

In FIG. 6, pixel values of pixel positions in a virtual screen 601 are obtained by performing processing described below on rays which emitted from the virtual viewpoint 104 and which pass through the pixel positions in the virtual screen 601, and consequently, a single image is formed on the virtual screen 601. Hereinafter, a ray which is emitted from the virtual viewpoint 104 and which passes through a point (a pixel position 699) in the virtual screen 601 will be described. When the processing described below is performed on all the pixel positions in the virtual screen 601, a single image is formed on the virtual screen 601.

In the ray tracing method, first, a ray 602 is emitted toward a point (pixel position 699) in the virtual screen 601 from the virtual viewpoint 104, and it is determined whether a virtual object exists in a destination of the ray 602. In FIG. 6, a virtual object 603 exists in the destination of the ray 602. Accordingly, in this case, a pixel value (brightness) in the pixel position 699 included in the virtual screen 601 is calculated in accordance with information on material of the virtual object 603 and a surface state of the virtual object 603. Note that when the ray 602 encounters the virtual object 603, a transmitted ray 605 and a reflected ray 604 are calculated. Therefore, a determination is similarly made whether a virtual object exists in each of destinations of these rays (the transmitted ray 605 and the reflected ray 604).

The ray tracing method has the principles described above, and processing steps of the ray tracing method will be briefly described hereinafter.

(1) A virtual viewpoint and a virtual screen are set.
(2) A pixel position in which a pixel value (brightness) thereof is to be obtained is determined in the virtual screen.
(3) A ray which passes through the pixel position determined in step (2) is emitted.
(4) A virtual object in which the ray encounters is searched for (intersection determination).
(5) When the virtual object in which the ray encounters is detected, the pixel value (brightness) in the pixel position is determined taking illumination effect in an intersection of the ray and the virtual object and material of the virtual object into consideration.

(6) Another ray is emitted from the intersection, which is detected first, in accordance with reflectivity and transmittance of the virtual object, and the processing of step (4) onwards is performed.

In the processing of step (1) to step (4), an operation of step (4) which is processing of intersection determination is a main operation. A general intersection determination processing will be described hereinafter by citing a concrete example.

It is assumed that a coordinate position V corresponding to the virtual viewpoint is denoted by (Vx, Vy, Vz), and a pixel position S, in which brightness thereof is to be determined, in the virtual screen is denoted by (x1, y1, z1).

In this case, an equation which represents a ray which emitted from the virtual viewpoint corresponding to the coordinate position V and which passes through the pixel position S is shown as follows using a variable t.

Equation 1 is as follows:

$$X = Ax \cdot t + Vx$$

$$Y = Ay \cdot t + Vy$$

$$Z = Az \cdot t + Vz$$

Here, an equation A=(Ax, Ay, Az) denotes a directional vector of the ray and is obtained using the following Equation 2:

$$(Ax, Ay, Az) = (x1-Vx, y1-Vy, z1-Vz)$$

Assuming that a virtual element which is a sphere object has a radius of r, and a center coordinate position of (x0, y0, z0), the sphere object is represented by the following Equation 3:

$$(x-x0)^2 + (y-y0)^2 + (z-z0)^2 = r^2$$

When Equation 1 representing the ray is assigned to Equation 3 representing the virtual element, the following Equation 4 is obtained $$(Ax \cdot t + Vx - x0)^2 + (Ay \cdot t + Vy - y0)^2 + (Az \cdot t + Vz - z0)^2 = r^2$$

When Equation 4 is rearranged for the variable t, the following quadratic Equation 5 is obtained:

$$at^2 + bt + c = 0$$

Here, a, b, and c in Equation 5 (below) are represented as follows.

$$a = Ax^2 + Ay^2 + Az^2$$

$$b = \{Ax(Vx-x0) + Ay(Vy-y0) + Az(Vz-z0)\}$$

$$c = (Vx-x0)^2 + (Vy-y0)^2 + (Vz-z0)^2$$

Accordingly, it is determined whether the quadratic equation (Equation 5) has a real root by calculating discriminant for the quadratic equation (Equation 5). When the number of real roots is one or more, (that is, a result of the discriminant is 0 or more), it is determined that the ray encounters the sphere object whereas when the number of real roots is 0 (a result of the discriminant is smaller than 0), it is determined that the ray does not encounter the sphere object. When it is determined that the ray encounters the sphere object, a coordinate value of an intersection should be obtained. The coordinate value of the intersection is obtained such that a value of the variable t is obtained by calculating Equation (5) for the variable t and the obtained value of the variable t is assigned to Equation 1 and X, Y, and Z on the left side of the equation represent an x coordinate value, a y coordinate value, and a z coordinate value of the intersection.

Note that in a case where two intersections are obtained, one of the two intersections which is nearer the viewpoint is employed in the subsequent operations. In other words, in a case where two values of the variable t are obtained by solving Equation 5 for the variable t, a smaller value of the two values of the variable t is employed for obtaining the coordinate value of the intersection.

The obtained variable t represents a distance between the virtual viewpoint and the sphere object. When the sphere object is a virtual object which is located the nearest the virtual viewpoint, the sphere object is determined as a virtual object (referred to as a "first virtual object" here) displayed so as to correspond to the intersection determined on the basis of the obtained variable t. However, it is possible that another virtual object (referred to as a "second virtual object" here) may exist nearer the virtual viewpoint relative to the first virtual object, and therefore, the second virtual object is similarly subjected to the intersection determination processing. When it is determined that the ray encounters the second object, a distance between the virtual viewpoint and the second virtual object is obtained. Then, the distance between the virtual viewpoint and the first virtual object is compared with the distance between the virtual viewpoint and the second virtual object.

As described above, virtual objects which are displayed in the virtual screen for individual pixel positions are determined. Accordingly, the pixel values of the pixel positions in the virtual screen are obtained.

Note that a known technique is employed for the ray tracing method as described above.

In step S505, the intersection determination unit 406 performs intersection determination as described above. The result of the intersection determination is stored. Then, in step S506, it is determined whether a condition for termination of ray generation is satisfied. As described above, the ray controller 405 stops generation of new rays when a ray is emitted to infinity or reaches the virtual light source or when a stop instruction is received from an intersection determination unit 406. If it is determined in step S506 that a condition of termination of ray generation is not satisfied, processing returns to step S504. On the other hand, if it is determined in step S506 that a condition of termination of ray generation is satisfied, processing proceeds to step S507.

In step S507, the pixel value calculation unit 407 calculates a pixel value in accordance with results of the ray tracing processing. The results of the ray tracing processing include "information on material of the virtual object in which the ray encounters" and "information on an intersection of the ray and the virtual object" obtained using the intersection determination unit 406 in step S505. The pixel value calculation unit 407 calculates the pixel value corresponding to the intersection of the ray and the virtual object in accordance with the obtained information. A method for calculating the pixel value will be briefly described. The information on material of the virtual object includes information on a diffuse reflection component, information on a specular component, information on environment illumination, and information on a self-luminous component, for example. Accordingly, the pixel value is obtained by calculating the information on material, a direction of a normal line of the virtual object in the virtual viewpoint and in the intersection, and information on the virtual light source (information on a type, information on a posture, and information on brightness). Such a method for calculating the pixel value corresponding to the intersection is a known technique in a field of the computer graphics, and therefore, detailed description thereof is not provided herein.

In step S508 it is determined whether all pixels have been processed. When it is determined in step S508 that values of all the pixels in the virtual screen are obtained, the process proceeds to step S509, and otherwise, the process returns to step S504 and the processing in step S504 onwards is performed on a ray which is emitted from the virtual viewpoint and which passes through a pixel position in which a pixel value thereof has not yet been obtained.

In step S509, the pixel value calculation unit 407 transmits a virtual-space image generated by obtaining the values of all the pixels to the screen output unit 408. The screen output unit 408 combines the virtual-space image with the real-space image so as to generate a composite image (MR image) and supplies the composite image to the display apparatus included in the HMD.

In step S510 it is determined whether processing is to be terminated. When it is determined in step S510 that the user inputs an instruction for termination of this processing or when it is determined that a condition for termination of this processing is met, this processing is terminated. Otherwise, the process returns to step S501, and the processing in step S501 onwards is performed.

As described above, this exemplary embodiment addresses optical inconsistency generated when a ray successively encounters an approximate virtual object. Specifically, after the ray successively encounters the approximate virtual object, generation of another ray is suppressed so that the approximate virtual object is not influenced by an unnecessary shadow.

Note that, in this exemplary embodiment, the approximate virtual object is configured as an aggregate of sphere objects. However, the approximate virtual object may be configured as an aggregate of polyhedrons.

In addition, in this exemplary embodiment, the aggregate of the plurality of virtual elements is employed for the approximate virtual object serving as the hand so that approximate shape of the hand is attained. However, an object to be approximated is not limited to the hand.

In the first exemplary embodiment, after the ray successively encounters the approximate virtual object, generation of another ray is suppressed so that the optical inconsistency generated when the ray successively encounters the approximate virtual object is addressed. However, it is not necessarily the case that when a ray successively encounters an approximate virtual object, optical inconsistency occurs.

Figure 7:
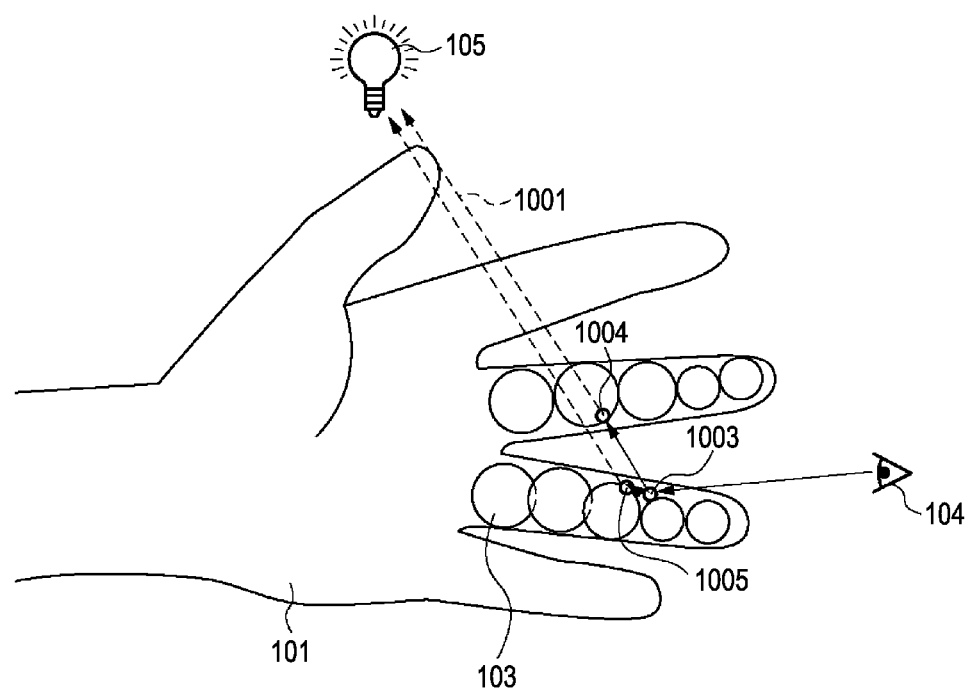
FIG. 7 illustrates a case where optical inconsistency occurs since when a ray successively encounters an approximate virtual object, generation of another ray is suppressed.

FIG. 7 illustrates a case where optical inconsistency occurs since when a ray successively encounters an approximate virtual object, generation of another ray is suppressed.

In FIG. 7, a ray emitted from a virtual viewpoint 104 intersects one of a plurality of virtual elements 103 at an intersection 1003, and the ray subsequently intersects another of the plurality of virtual elements 103 at an intersection 1005. In the case of the first exemplary embodiment, generation of a ray emitted from the intersection 1003 is suppressed. However, when the ray is suppressed in accordance with the method of the first exemplary embodiment, calculation of a shadow cast on a region to be dark due to the shadow is not performed. Therefore, although the intersection 1003 should be dark due to influence of one of the virtual elements 103 constituting a middle finger, it is possible that the intersection 1003 becomes brighter than adjacent pixels. That is, a region which should be shown so as to have even darkness partially includes a pixel having a value representing a brighter pixel. Accordingly, realistic sensation for the user is considerably deteriorated.

In a second exemplary embodiment, even when a ray successively intersects the virtual elements 103, generation of another ray is not suppressed, and generation of a ray and intersection determination are recursively repeated. When it is determined that a condition of termination of an algorithm of a general ray tracing method is satisfied, a final pixel value is calculated by retracing history of the intersection determination.

Note that, in this exemplary embodiment, an image processing apparatus similar to the image processing apparatus of FIG. 4 used in the first exemplary embodiment is employed.

Figure 8:
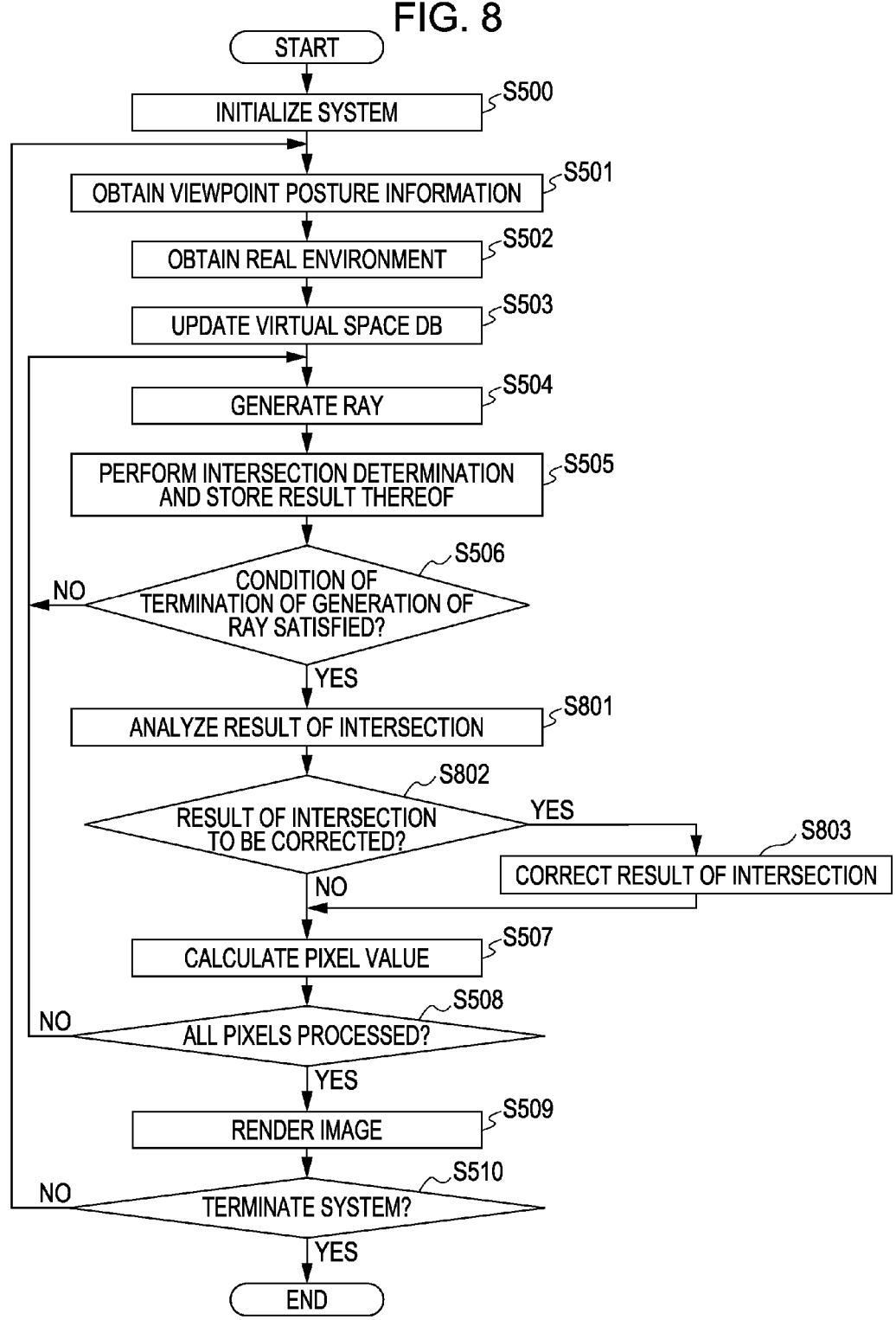
FIG. 8 is a flowchart illustrating processing of generating a virtual-space image by means of the ray tracing method using an image processing apparatus according to a second exemplary embodiment of the present invention.

FIG. 8 is a flowchart illustrating processing of generating a virtual-space image by means of the ray tracing method using the image processing apparatus according to the second exemplary embodiment of the present invention. Note that steps in FIG. 8 which are the same as those of FIG. 5 are denoted by reference numerals the same as those shown in FIG. 5, and therefore, descriptions thereof are not repeated.

The image processing apparatus of this exemplary embodiment performs processing of obtaining a real-space image in parallel to the processing performed in accordance with the flowchart shown in FIG. 8. That is, the image processing apparatus of this exemplary embodiment performs not only the processing performed in accordance with the flowchart shown in FIG. 8 but also other processes. Furthermore, in the processing performed in accordance with the flowchart shown in FIG. 8, an operation performed when a ray intersects the approximate virtual object will be mainly described. That is, descriptions of operations in other situations are simplified or are not described in detail herein.

In this exemplary embodiment, to address optical inconsistency which occurs when a ray successively intersects the approximate virtual object, even when the ray successively intersects the approximate virtual object, generation of another ray is not suppressed. That is, only when one of conditions, i.e., a condition in which a ray reaches a virtual light source and a condition in which a ray reaches infinity, is satisfied, the intersection determination unit 406 issues an instruction of stop of generation of a ray to the ray controller 405.

In step S801 of FIG. 8, the intersection determination unit 406 performs analysis of a result of intersection determination performed on a ray obtained by calculation of a shadow, a reflection, and refraction performed a plurality of times in step S505.

Specifically, the intersection determination unit 406 determines a virtual object in which the ray encountered, determines whether the ray successively intersected the approximate virtual object, and determines whether the ray successively intersected the approximate virtual object and thereafter intersected a virtual object, for example.

In step S802, the intersection determination unit 406 determines whether the result of the intersection determination of the ray obtained through a plurality of calculation operations is to be corrected in accordance with a result of the analysis. The result of the intersection determination is to be corrected when the ray successively intersects the approximate virtual object, and reaches the light source without intersecting a virtual object or another approximate object. In this case, since a shadow is generated due to a real object and a ray emitted from the light source is not blocked by any virtual object, shadow calculation is not performed. Accordingly, when the determination is affirmative in step S802, the process proceeds to step S803 where the result of the intersection determination is corrected. On the other hand, when it is determined that the ray intersected the approximate virtual object and thereafter successively intersected a virtual object or another approximate virtual object, the process proceeds to step S507.

In step S803, the intersection determination unit 406 corrects the result of the intersection determination performed on the ray obtained in step S505. Specifically, the result of the intersection determination obtained after the ray successively intersected the approximate virtual object is corrected (invalidated or deleted). Then, the processing in step S507 onwards is performed.

As described above, according to this exemplary embodiment, the optical inconsistency generated due to suppression of generation of a ray is addressed.

In the foregoing exemplary embodiment, generation of a ray is not suppressed, but generation of a ray is recursively repeated until the condition of termination of the ray tracing method is satisfied. When it is determined that the termination condition is satisfied, the intersection determination unit 406 checks again the history of the intersection detection, discards an unnecessary result of the intersection determination, and determines final pixel value.

Note that when the termination condition is satisfied, the final pixel value may be obtained by calculating a pixel value using the pixel value calculation unit 407 in accordance with the result of the intersection determination obtained using the intersection determination unit 406. That is, even when the ray successively intersects the approximate virtual object and when a successive ray intersects a virtual object, calculation on a shadow of the virtual object is performed so that a final pixel value is obtained. On the other hand, when the ray successively intersects the approximate virtual object and thereafter a successive ray does not intersect a virtual object, a final pixel value is obtained without performing the shadow calculation.

Specifically, the pixel value calculation unit 407 determines a pixel value in accordance with the result of the analysis obtained in step S801. According to the second exemplary embodiment, the corrected result of the intersection determination is used for obtaining the pixel value. However, even when the ray successively intersects the approximate virtual object and when a successive ray intersects a virtual object, the calculation on the shadow of the virtual object may be performed so that the final pixel value is obtained. On the other hand, when the ray successively intersects the approximate virtual object and thereafter a successive ray does not intersect a virtual object, a final pixel value is obtained without performing a shadow calculation.

In addition, the intersection determination performed using the intersection determination unit 406 includes a determination as to whether a shadow is to be rendered when the ray successively intersects virtual elements, in accordance with the relationship between a distance between intersections and sizes of the virtual elements.

In FIG. 7, a ray 1001 which reaches the virtual light source 105 is obtained after the ray emitted from the virtual viewpoint 104 is reflected by one of the virtual elements 103 (referred to as a "first virtual element" 103 here) at the intersection 1003, and thereafter, intersects another of the virtual elements 103 (referred to as a "second virtual element" 103 here) at an intersection 1004. The intersection 1003 is influenced by the second virtual element 103 in which the ray intersects at the intersection 1004, and therefore, a shadow is cast on the intersection 1003.

Furthermore, the ray reflected at the intersection 1003 is further reflected by still another of virtual elements 103 (referred to as a "third virtual element" 103 here) at the intersection 1005, and thereafter, reaches the virtual light source 105. Here, a self-shadow is generated at the intersection 1003 due to influence of the third virtual element 103 in which the ray intersects at the intersection 1005.

When it is assumed that a real light source corresponds to the virtual light source, and when it is assumed that a forefinger and a middle finger of a person are included in a real object 101, a shadow of the forefinger is cast on the middle finger in a real space. That is, the shadow generated in the real space corresponds to the shadow generated due to the influence of the intersection 1004 as shown in FIG. 7. Accordingly, the user may not feel odd when the shadow is rendered.

However, a shadow corresponding to the self-shadow generated due to the influence of the third virtual element 103 including the intersection 1005 does not exist in the real space. Accordingly, the user feels odd when the self-shadow is rendered.

According to this exemplary embodiment, when a ray successively intersects the virtual elements 103, it is determined whether a shadow is to be rendered in accordance with information on distance between intersections so that optical inconsistency is addressed.

Furthermore, the processing of generating a virtual-space image in accordance with the ray tracing method using the image processing apparatus of this exemplary embodiment shown in FIG. 8 is realized by modifying the flowchart of FIG. 5 so that an operation of step S505 of FIG. 5 is modified and operations of step S801 to step S803 are added as described below.

In step S505, in addition to the processing described in the first exemplary embodiment, the intersection determination unit 406 obtains a distance between the intersections.

In step S801, the intersection determination unit 406 analyzes the distance between the intersections obtained in step S505 in addition to the result of the intersection determination of the ray obtained through the plurality of calculations performed on a shadow, a reflection, and refraction.

Here, the information on the distance between the intersections is compared with the size of the virtual element in which the ray intersects first (compared with a radius in a case where the virtual element is a sphere object, or compared with a distance between surfaces in a case where the virtual element is a polyhedral object). That is, when the distance between the intersections is larger than the virtual element in which the ray intersects first (for example, the virtual element 103 having the intersection 1003 in FIG. 7), it is determined that the ray intersected an object which generates a cast shadow. On the other hand, when the distance between the intersections is equal to or smaller than the virtual element, it is determined that the ray intersected an object which makes a self-shadow, and influence of the shadow of the object is invalidated.

In this way, by additionally using the information on the distance between the intersections, optical inconsistency is addressed.

Note that a plurality of virtual elements constitute an approximate virtual object in the exemplary embodiments described above. However, it is not necessarily the case that an approximate virtual object is constituted by a plurality of virtual elements, and an approximate virtual object may be constituted by a single virtual element in some cases. It is assumed that an approximate virtual object is constituted by at least one virtual element hereinafter.

In the exemplary embodiments described above, the units are configured as hardware. However, among the units, units other than the virtual-space DB 401 may be implemented by computer programs. In this case, the computer programs corresponding to the units are executed using a general PC (Personal Computer) including the virtual-space DB 401 and the operations described in the foregoing exemplary embodiments may be realized.

Figure 9:
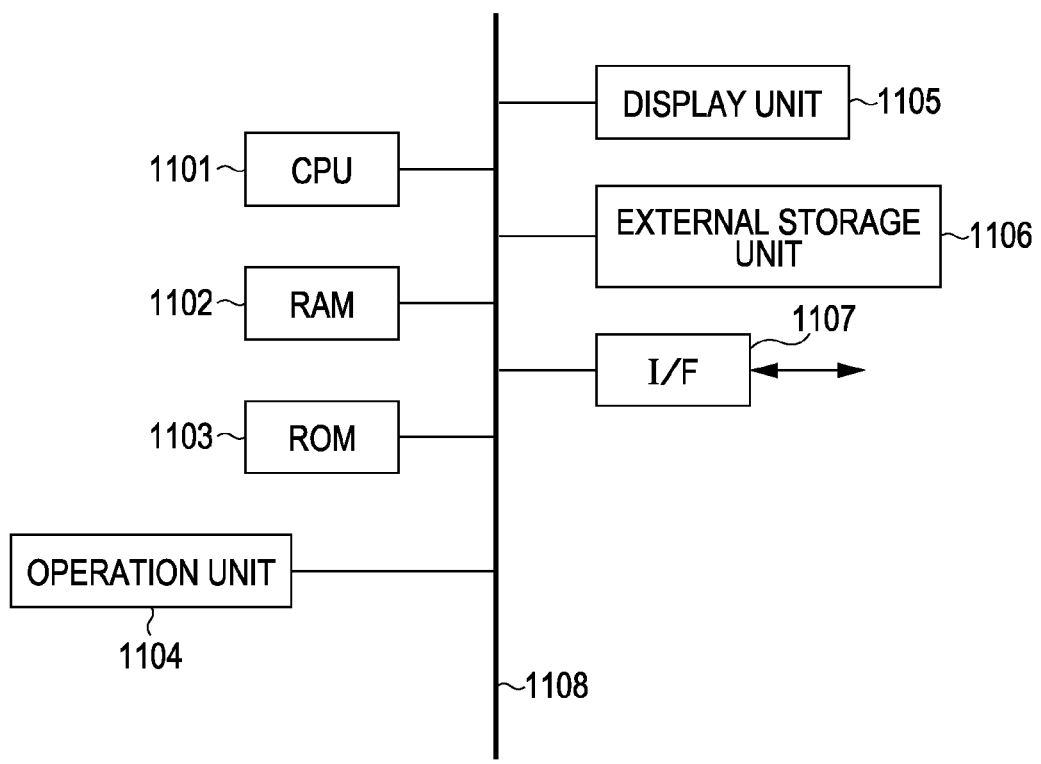
FIG. 9 is a block diagram illustrating an example of a configuration of hardware of a computer capable of executing computer programs for units except for a virtual space database.

FIG. 9 is a block diagram illustrating an example of a configuration of hardware of a computer capable of executing computer programs for the units except for a virtual-space DB 401.

A CPU 1101 controls the computer using programs and data stored in a RAM (Random Access Memory) 1102 and a ROM (Read Only Memory) 1103, and performs the various operations described above which are described as the operations performed using the image processing apparatus having the configuration shown in FIG. 4. The various operations include operations performed in accordance with the flowcharts shown in FIGS. 5 and 8.

The RAM 1102 has an area used to temporarily store a program and data loaded from an external storage apparatus 1106 and data externally received through an I/F (interface) 1107. Furthermore, the RAM 1102 has a work area which is used when the CPU 1101 executes the various programs. That is, the RAM 1102 appropriately supplies the various areas.

The ROM 1103 stores therein a boot program and setting data.

An operation unit 1104 includes a keyboard and a mouse. When a user of the computer operates the operation unit 1104, various instructions are supplied to the CPU 1101. An example of the various instructions input using the operation unit 1104 is an instruction of termination of processing.

A display unit 1105 includes a CRT (Cathode Ray Tube) and a liquid crystal display, and displays a result of processing executed using the CPU 1101 by means of an image and text, for example.

The external storage apparatus 1106 is a mass storage apparatus including a hard disk drive device. The external storage apparatus 1106 stores therein an OS (Operating System), programs which cause the CPU 1101 to execute the various operations which are described as the operations performed using the image processing apparatus, and data. The programs include programs which cause the CPU 1101 to execute operations of the units except for the virtual-space DB 401 (except for an information storage function of the virtual-space DB 401). Furthermore, the data stored in the external storage apparatus 1106 includes data which is described above as the data stored in the virtual-space DB 401.

The programs and the data stored in the external storage apparatus 1106 are loaded in the RAM 1102 under the control of the CPU 1101. Then, the CPU 1101 executes operations in accordance with the loaded programs and the loaded data and the computer performs the various operations which are described as the operations performed using the image processing apparatus.

An HMD and a posture sensor are connected to the I/F 1107.

A bus 1108 connects the units described above to one another.

In a third exemplary embodiment, a method for rendering a shadow of a virtual object on an image including an image of a shadow of a real object which is cast on another real object without generating optical inconsistency. Specifically, the shadow of the virtual object is rendered on a region other than a region in which the shadow of the real object is cast on the real object.

Figure 10:
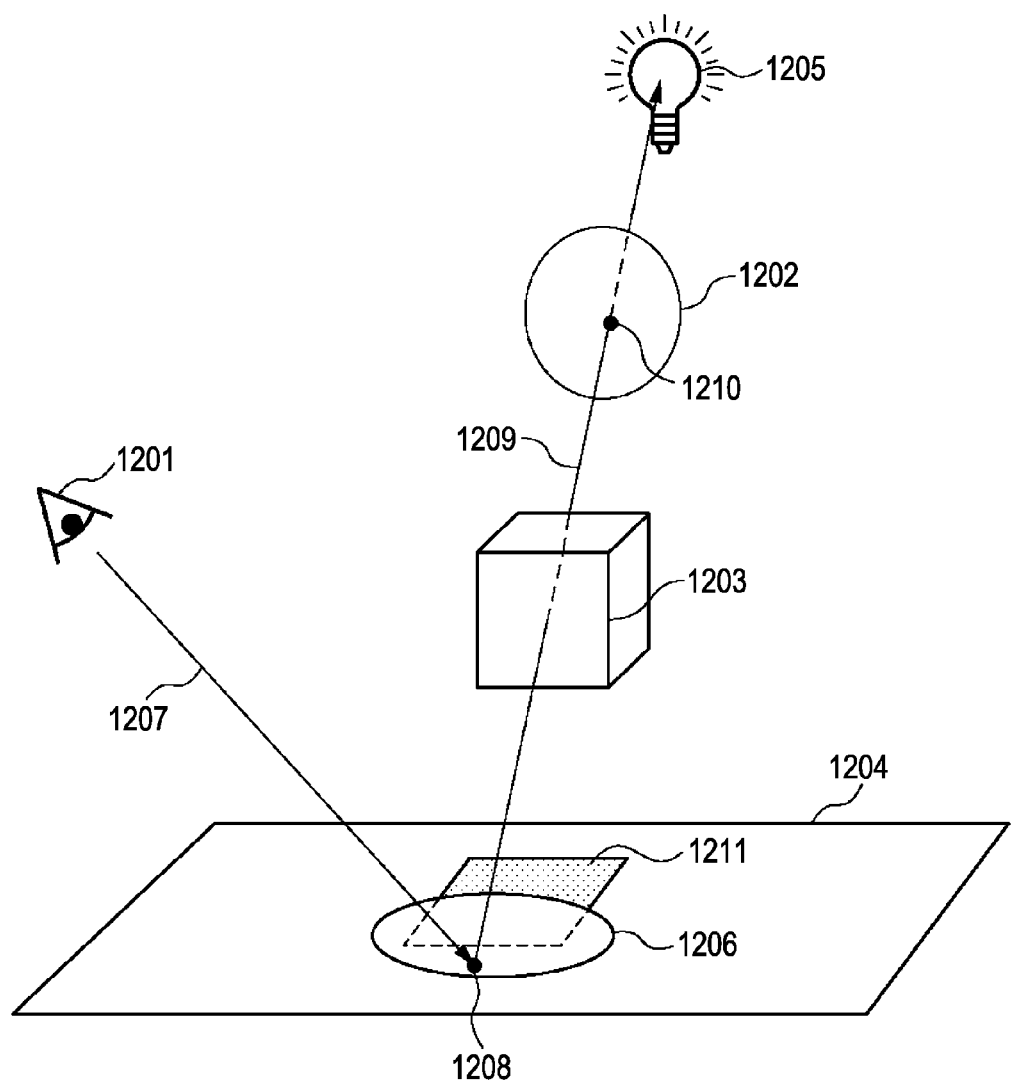
FIG. 10 illustrates main processing according to a third exemplary embodiment of the present invention.

FIG. 10 illustrates main processing according to this exemplary embodiment of the present invention. FIG. 10 shows a mixed reality space including real objects and a virtual object. In FIG. 10, a virtual viewpoint 1201 corresponds to a viewpoint of a user using a real camera. A real object 1202 has a sphere shape. In a region corresponding to the real object 1202, an approximate virtual object 1202' (not shown) which is generated by copying the shape of the real object 1202 is arranged (that is, the approximate virtual object 1202' has a shape and a size the same as those of the real object 1202). A virtual object 1203 is a cubic virtual object, and a real object 1204 has a planer shape. In a region corresponding to the real object 1204, an approximate virtual object 1204' (not shown) which is generated by copying the shape of the real object 1204 is arranged. A light source 1205 is a real light source. A virtual light source 1205' (not shown) which is generated by copying the real light source 1205 is arranged in a position where the real light source 1205 is located so that a posture of the virtual light source 1205' corresponds to that of the real light source 1205. An image 1206 formed on the real object 1204 corresponds to a real shadow generated by blocking the real light source 1205 using the real object 1202. Note that when a term "object" is simply used without distinguishing the virtual object from the approximate virtual objects, the term "object" represents the virtual object and approximate virtual objects hereinafter.

Here, a case where an image shown as if the virtual object 1203 casts a shadow on the real object 1204 is rendered will be described. A region corresponding to the (real) shadow 1206 of the real object 1202 has been generated. A result of a determination as to whether the region corresponding to the shadow 1206 of the real object 1202 is generated is not changed even when a virtual object which blocks the virtual light source 1205' is additionally arranged. Therefore, for values of pixels in a portion which is included in a region 1211 corresponding to a virtual shadow of the virtual object 1203 generated by blocking the virtual light source 1205' and which overlaps the region corresponding to the shadow 1206, values of pixels in a portion in a real-space image corresponding to the portion included in the region 1211 are used (that is, influence of the virtual shadow is not taken into consideration).

To perform such control of rendering of a shadow, in this exemplary embodiment, a ray referred to a "shadow ray" is generated from an intersection of a first-order ray and an object toward the light sources, and an intersection of the shadow ray and the object is checked. Then, it is understood that a condition in which the virtual shadow is not rendered even when the virtual light source 1205' is blocked by the virtual object 1203 is a case where the shadow ray emitted from an approximate virtual object encounters another approximate virtual object.

For example, a shadow ray 1209 emitted from a point (intersection) 1208 in the approximate virtual object 1204' in which a first-order ray 1207 intersects first intersects the approximate virtual object 1202' at a point 1210, and therefore, this mixed reality space shown in FIG. 10 satisfies the above-described condition. Therefore, a virtual shadow is not rendered at the intersection 1208.

Note that the above-described condition may be employed even when the shadow ray does not successively intersect the approximate virtual object, since an order of intersections of the shadow ray and the object does not relate to whether the light source is blocked.

The main processing of this exemplary embodiment will be described in detail hereinafter.

Note that description will be made taking only a first-order ray and a shadow ray which is emitted from an intersection of the first-order ray and an object to a light source into consideration here. That is, rays which are generated by a reflection and refraction which occur on a surface of the object are ignored. In addition, it is assumed that the number of light sources is one, and approximate virtual objects have shapes and material properties similar to those of corresponding real objects. Furthermore, the main processing according to this exemplary embodiment, which will be described below, is executed using a computer (image processing apparatus) having a hardware configuration shown as the example in FIG. 9.

Here, in description which will be described hereinafter, a pixel which is included in an image to be generated and in which the first-order ray intersects is referred to as a "pixel of an object to be rendered", and a point on an object (a virtual object or an approximate virtual object) in which the first-order ray intersect first is referred to as a "point of an object to be rendered".

Figure 11:
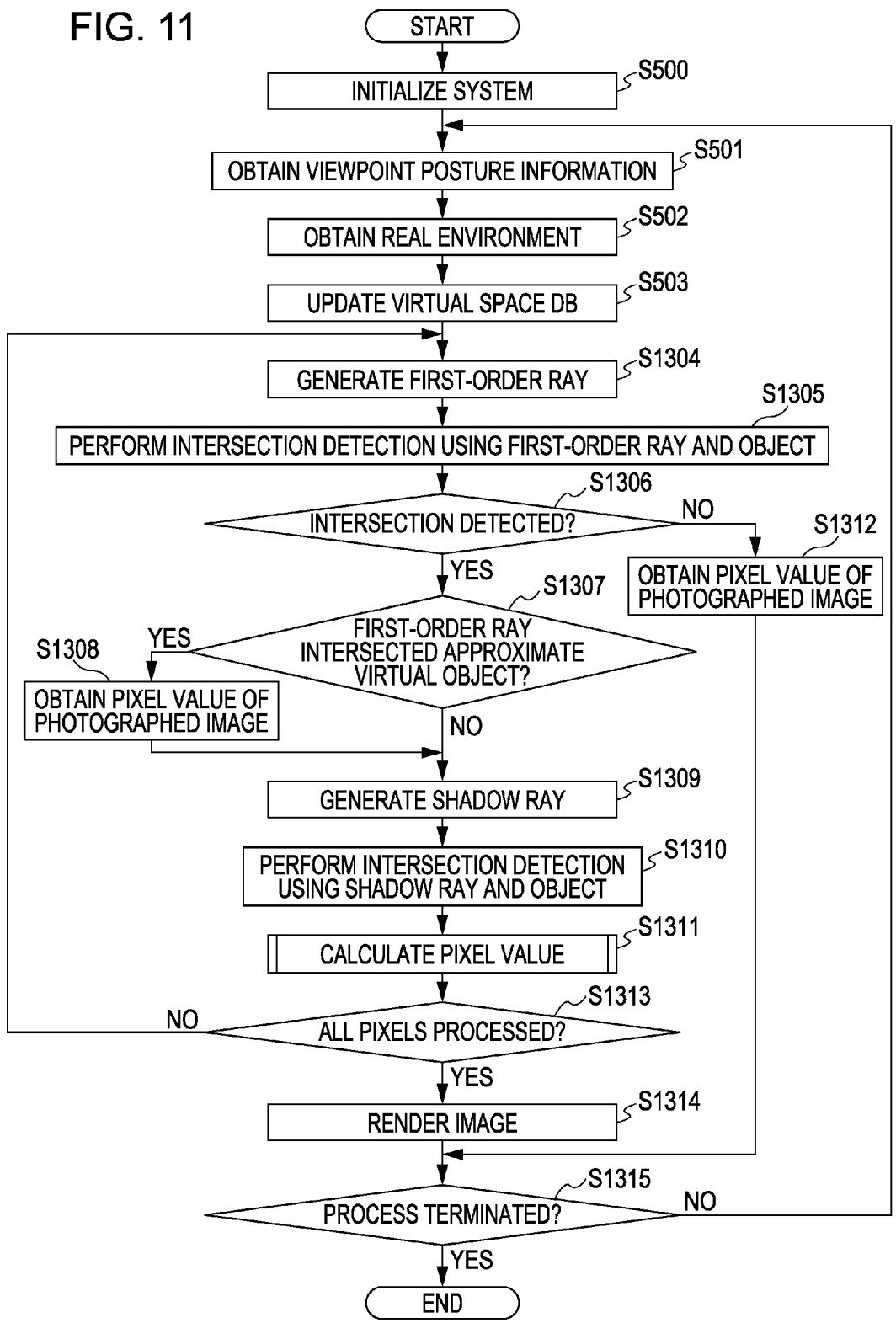
FIG. 11 is a flowchart illustrating processing of generating a mixed reality image by means of the ray tracing method using an image processing apparatus according to the third exemplary embodiment of the present invention.

FIG. 11 is a flowchart illustrating processing of generating a mixed reality image by means of the ray tracing method using the image processing apparatus according to the third exemplary embodiment of the present invention.

Operations performed in step S500 to step S503 are the same as those of FIG. 8, and therefore, descriptions thereof are not repeated here.

In step S1304, a first-order ray which passes through a pixel of an object to be rendered is emitted from a virtual viewpoint.

In step S1305, a point in which the first-order ray intersects a virtual object first or a point in which the first-order ray intersects an approximate virtual object first, that is, a point of an object to be rendered is searched for, and a result of the searching is stored in a RAM 1102.

In step S1306, it is determined whether the first-order ray intersected the virtual object or the approximate virtual object in accordance with the result of the searching in step S1305. When the determination is negative in step S1306, the pixel of the object to be rendered corresponds to a background, and then, the process proceeds to step S1312 where a pixel value of a photographed image is obtained. Then, the process proceeds to step S1315. Here, "a pixel value of a photographed image is obtained" through processing of obtaining a value of a pixel of the photographed image which corresponds to the pixel of the object to be rendered from among pixels of the photographed image and setting the obtained pixel value as a value of the pixel of the object to be rendered in an image to be generated (the same processing is performed when "a pixel value of a photographed image is obtained" hereinafter). Note that data of the image to be generated is stored in the RAM 1102.

On the other hand, when the determination is affirmative in step S1306, the process proceeds to step S1307.

In step S1307, it is determined whether the first-order ray intersected the approximate virtual object first in accordance with the result of the searching performed in step S1305. When the determination is affirmative in step S1307, the point of the object to be rendered is included in a real object, and the process proceeds to step S1308. In step S1308, a pixel value of the photographed image is obtained.

On the other hand, when it is determined that the first-order ray intersected the virtual object in step S1307, the process proceeds to step S1309.

In step S1309, a shadow ray is emitted from an intersection of the first-order ray and the object to the light source.

In step S1310, detection of an intersection of the shadow ray and an object is performed. This detection processing is not performed so that an object in which the shadow ray intersects first is detected but performed so that all objects in which the shadow ray which is emitted to the light source intersects. A result of the detection is stored in the RAM 1102.

In step S1311, a value of the pixel of the object to be rendered with reference to the result of the detection performed in step S1310 is obtained, and the process proceeds to step S1313. Note that the operation performed in step S1311 will be described in detail hereinafter.

In step S1313, it is determined whether all pixels of the image to be generated (mixed reality image) have been processed. When the determination is affirmative in step S1313, the process proceeds to step S1314, whereas when the determination is negative in step S1313, the process returns to step S1304.

In step S1314, the data of the image to be generated is read from the RAM 1102 and is displayed.

In step S1315, it is determined whether the user issued an instruction of termination of this processing (by operating the operation unit 1104) or it is determined whether a condition for termination of this processing was satisfied. When the determination is affirmative in step S1315, this processing is terminated whereas when the determination is negative in step S1315, the process returns to step S501 and the operations in step S501 onwards are performed.

Figure 12:
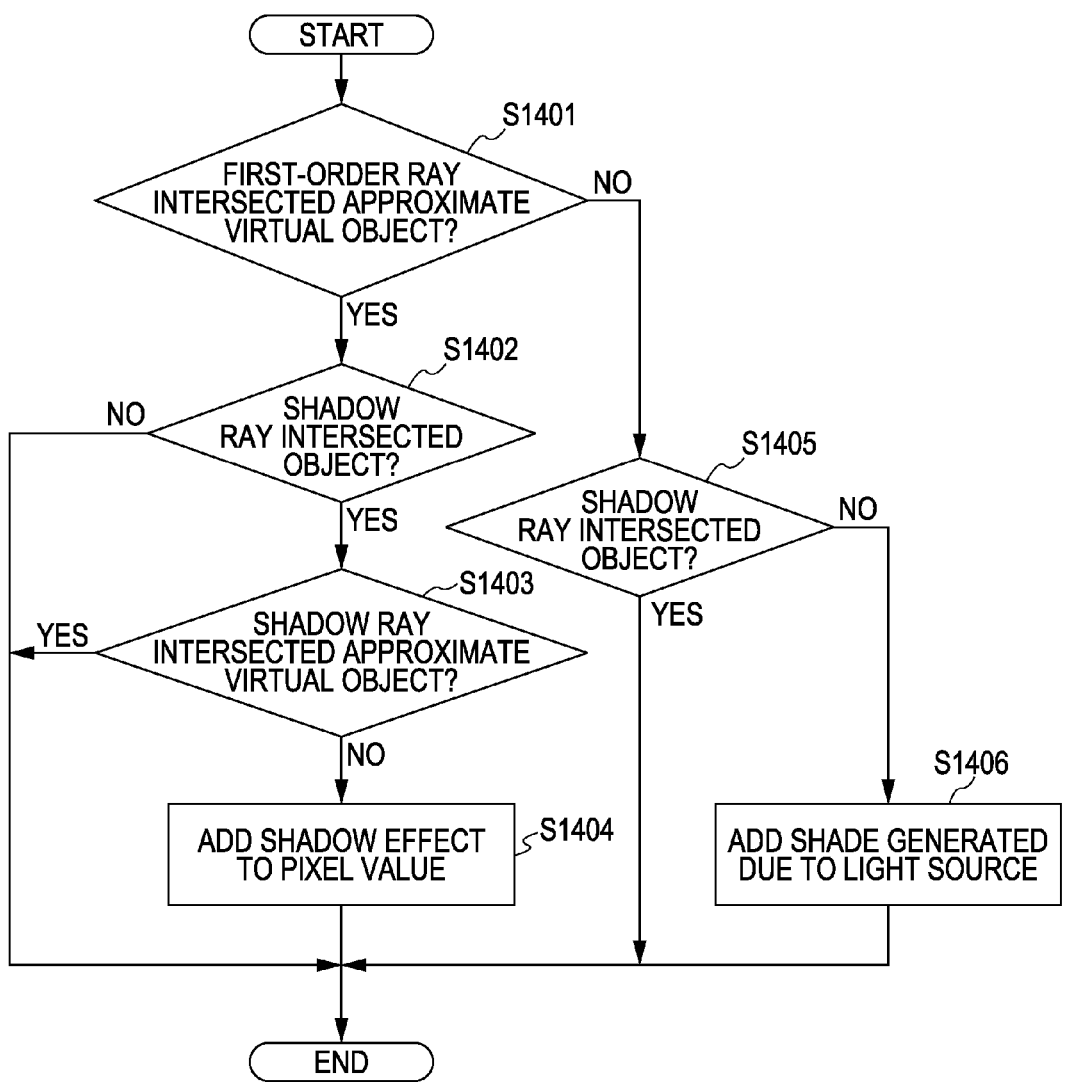
FIG. 12 is a flowchart illustrating pixel value calculation processing in detail.

The pixel value calculation processing performed in step S1311 will now be described in detail. FIG. 12 is a flowchart illustrating the operation performed in step S1311, that is, the pixel value calculation processing, in detail.

In step S1401, it is determined whether the first-order ray intersected the approximate virtual object with reference to the result of the searching performed in step S1305. When the determination is affirmative, the process proceeds to step S1402.

In step S1402, it is determined whether an intersection of the shadow ray and the object is detected with reference to the result of the detection performed in step S1310. When the determination is negative in step S1402, the pixel of the object to be rendered should not be influenced by a shadow, and the process is terminated.

On the other hand, when the determination is affirmative in step S1402, the process proceeds to step S1403.

In step S1403, it is determined whether the shadow ray intersected at least one approximate virtual object or the shadow ray intersected only virtual objects. When it is determined in step S1403 that the shadow ray intersected at least one approximate virtual object, the point of the object to be rendered has been included in a shadow of the real object, the pixel value is not changed and the process is terminated.

On the other hand, when it is determined in step S1403 that the shadow ray intersected only virtual objects, the point of the object to be rendered is included in a region other than a region of the real shadow, and furthermore, the light source is blocked by the virtual objects. Therefore, the process proceeds to step S1404 where an effect of the shadow is added to the value of the pixel of the object to be rendered. Specifically, in a case where it is determined that the point of the object to be rendered is illuminated by the light source in accordance with the material property of the approximate virtual object at the point of the object to be rendered and a property of the light source, a pixel value which may be added to the pixel of the object to be rendered is calculated and the calculated pixel value is subtracted from the value of the pixel of the object to be rendered.

When the determination is negative in step S1401, the process proceeds to step S1405.

In step S1405, it is determined whether the shadow ray intersected any of a virtual object and an approximate virtual object with reference to the result of the detection performed in step S1310. When the determination is affirmative in step S1405, the point of the object to be rendered (a point on a virtual object) is not illuminated by the light source, and accordingly, a shadow generated due to the light source is not rendered. That is, the value of the pixel of the object to be rendered is not changed and the process is terminated.

On the other hand, when the determination is negative in step S1405, the point of the object to be rendered is illuminated by the light source, and therefore, the process proceeds to step S1406.

In step S1406, a value of a change of the pixel value of the point which occurs due to the light source which illuminates the point is calculated in accordance with the material property of the virtual object including the point of the object to be rendered and the property of the light source, and the calculated value is added to the value of the pixel of the object to be rendered.

By performing the processing described above, in a region in a real object in which a shadow of another real object is cast, influence of a shadow of a virtual object is avoided. Accordingly, a problem in which a region in which a shadow of a real object and a shadow of a virtual object are cast is rendered unnecessarily dark is avoided, and a shadow which is optically consistent between a real space and a virtual space can be rendered.

Note that in the foregoing description, the number of the light sources is one. However, the number of light sources is not limited to this and may be two or more. When the number of light sources is two or more, the operations of step S1309 to step S1311 are repeatedly performed for the two or more light sources.

Furthermore, although the processing is performed on the first-order ray in the foregoing description, a ray which is subjected to the processing is not limited to the first-order ray. The processing may be performed on second-order rays or higher-order rays. When the processing is performed on an N-th-order ray (N is an integer equal to or larger than 2), the "first-order ray" is replaced by the "N-th-order ray" in the foregoing description.

In the intersection determination processing (in step S1310) in the third exemplary embodiment, the virtual object and the approximate virtual object is processed without being distinguished from each other. However, detection of intersection of the shadow ray and the approximate virtual object is sufficient in order to determine whether a shadow of a real object is cast on another real object. Therefore, in the intersection determination processing performed on a shadow ray, in a case where an intersection of the shadow ray and an approximate virtual object is checked before an intersection of the shadow ray and a virtual object is checked, the processing is terminated earlier. That is, high-speed processing is attained. Since a load applied when processing of determining intersection of a ray and an object is performed is large in the ray tracing method, reduction of the number of times the processing is performed is effective.

Therefore, in a fourth exemplary embodiment, processing of determining an intersection of a shadow ray and an approximate virtual object is performed before processing of determining an intersection of the shadow ray and a virtual object is performed. Note that an image processing apparatus employed in this exemplary embodiment is a computer having the hardware configuration such as that shown in FIG. 9. Processing of generating a mixed reality image in accordance with the ray tracing method which is performed using the image processing apparatus according to this exemplary embodiment is the same as that illustrated with reference to FIG. 11, and therefore, description thereof is not repeated here.

Figure 13:
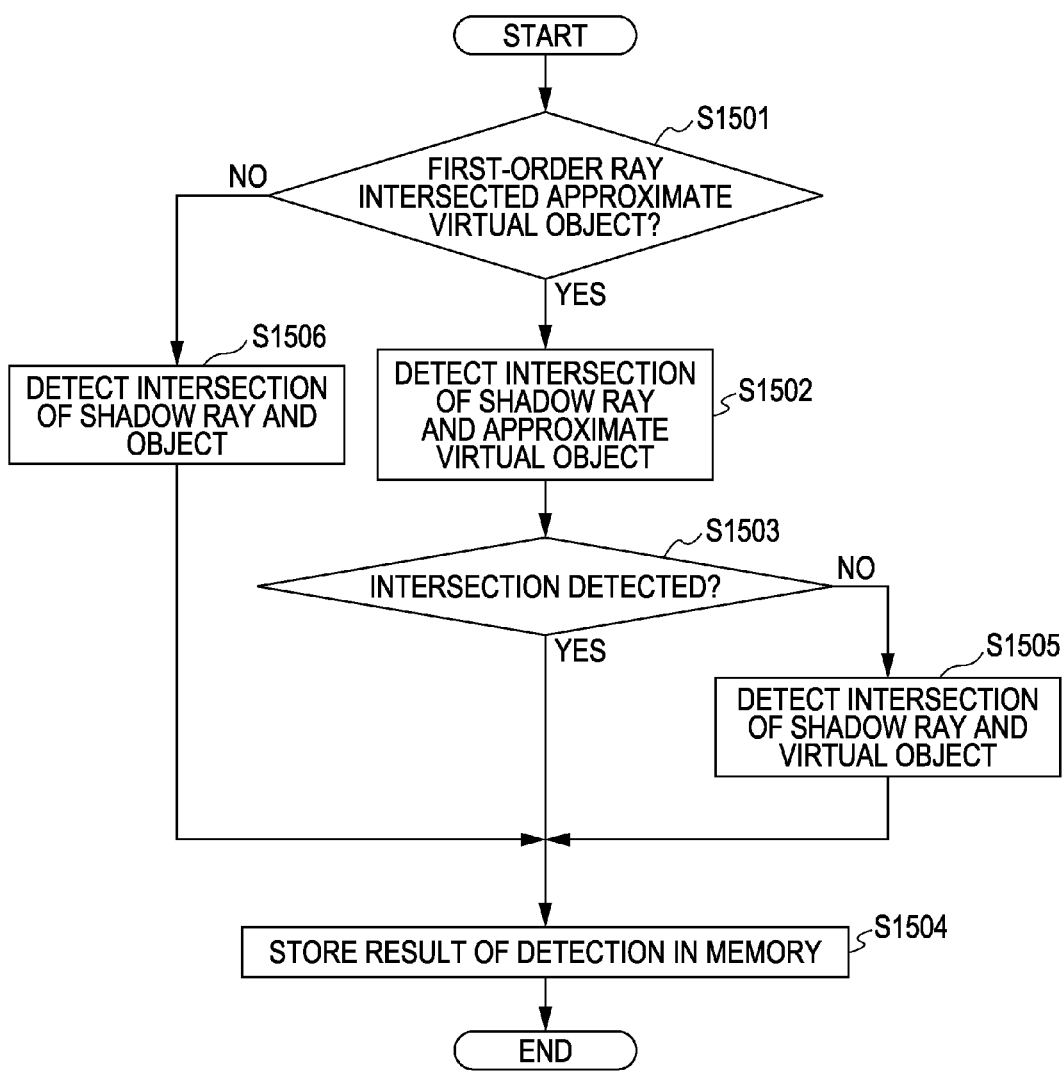
FIG. 13 is a flowchart illustrating processing of detecting objects which intersect with a shadow ray in detail according to a fourth exemplary embodiment of the present invention.

FIG. 13 is a flowchart illustrating another processing corresponding to the operation performed in step S1310 in detail in the fourth exemplary embodiment of the present invention. Note that it is not necessary that a term "detection of an intersection" means detection of intersections of a ray and all objects to be processed. When at least one object in which the ray intersects is detected, the processing is terminated.

In step S1501, it is determined whether a first-order ray intersects a first approximate virtual object with reference to a result of an operation performed in step S1305. When the determination is affirmative in step S1501, the process proceeds to step S1502. In step S1502, an intersection of a shadow ray and a second approximate virtual object is detected. A result of the detection performed in step S1502 is stored in a RAM 1102.

In step S1503, it is determined whether the shadow ray intersected the second approximate virtual object in accordance with the result of the detection performed in step S1502. When the determination is affirmative in step S1503, the process proceeds to step S1504. In step S1504, determination as to whether the shadow ray intersected a virtual object is not performed and a result of the determination performed in step S1503 is stored in the RAM 1102. Note that information stored in the RAM 1102 in step S1504 includes information as to whether the shadow ray intersects an object, and information on a type (a virtual object or an approximate virtual object) of the object if it is determined that the shadow ray intersected the object.

On the other hand, when the determination is negative in step S1503, the process proceeds to step S1505. In step S1505, intersection of the shadow ray and a virtual object is detected, and thereafter, the process proceeds to step S1504.

In step S1501, when it is determined that the first-order ray does not intersect the approximate virtual object (that is, the first-order ray intersects a virtual object), the process proceeds to step S1506. In step S1506, intersection of the shadow ray and a virtual object is detected, and thereafter, the process proceeds to step S1504.

After performing an operation of step S1504, the entire intersection determination processing using the shadow ray is terminated.

As described above, according to this exemplary embodiment, since determination as to whether a shadow ray intersects a virtual object can be eliminated when a region of a shadow of a real object cast on another real object is rendered, high-speed processing is attained.

Note that, as with the third exemplary embodiment, a plurality of light sources may be employed, and in addition, the processing described in this exemplary embodiment may be similarly performed on a second-order ray or a higher-order ray.

In a fifth exemplary embodiment, a method for rendering a reflection of a virtual object on an image of a reflection of a first real object reflected on a second real object in a photographed image without occurrence of optical inconsistency will be described. Specifically, a reflection of a virtual object is rendered on a region of the second real object except for a region in which the first real object is reflected.

Figure 14:
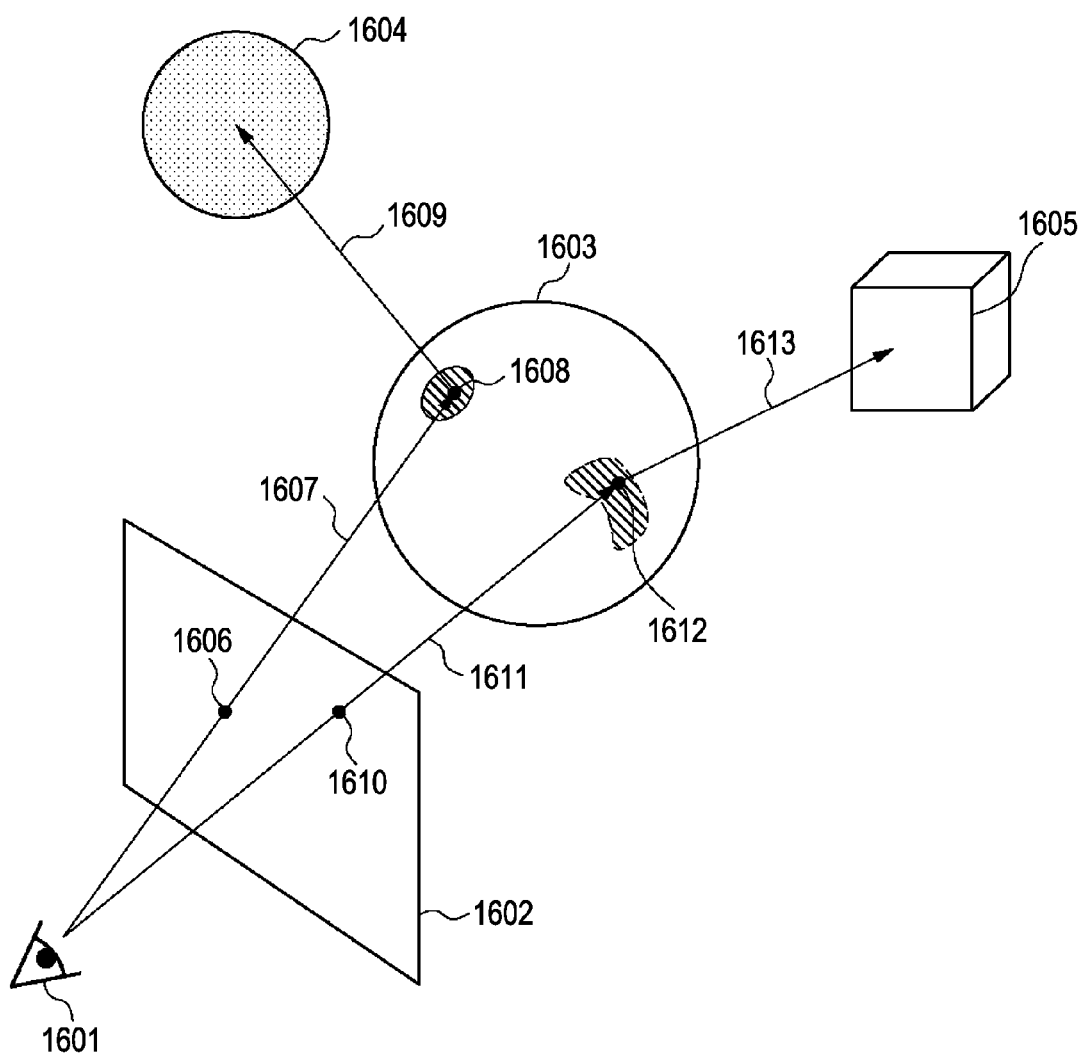
FIG. 14 is illustrates main processing according to a fifth exemplary embodiment of the present invention.

FIG. 14 illustrates main processing according to the fifth exemplary embodiment of the present invention. FIG. 14 shows a mixed reality space including real objects and a virtual object.

In FIG. 14, a virtual viewpoint 1601 corresponds to a viewpoint of a user using a real camera, and a projection plane 1602 is used to project a mixed reality space so that a mixed reality image is generated. A real object 1603 has a sphere shape. In a region corresponding to the real object 1603, an approximate virtual object 1603' (not shown) which is generated by copying the shape of the real object 1603 is arranged (that is, the approximate virtual object 1603' has a shape and a size the same as those of the real object 1603). A real object 1604 has a sphere shape. In a region corresponding to the real object 1604, an approximate virtual object 1604' (not shown) which is generated by copying the shape of the real object 1604 is arranged (that is, the approximate virtual object 1604' has a shape and a size the same as those of the real object 1604). A virtual object 1605 is a cubic virtual object.

Here, a case where a first-order ray 1607 is emitted from the virtual viewpoint 1601 through a pixel 1606 will be described. Furthermore, it is assumed that the first-order ray 1607 intersects the approximate virtual object 1603' first, and a reflected ray 1609 which is generated toward a direction in which the first-order ray 1607 is reflected at a point 1608 intersects the approximate virtual object 1604' first.

In this case, a reflection of the real object 1604 onto the real object 1603 affects pixels in a photographed image corresponding to the pixel 1606. Therefore, when influence of a reflection of the approximate virtual object 1604' onto the approximate virtual object 1603' is added to the pixel 1606, the reflections are superposed with each other. Accordingly, when a reflected ray generated from an approximate virtual object intersects another approximate virtual object first, a reflection is not rendered.

On the other hand, similarly, a case where a reflected ray generated from an approximate virtual object intersects a virtual object first will be described. Specifically, for example, in a case where a reflected ray 1613 generated by reflecting at a point 1612 a first-order ray 1611 which is emitted from the virtual viewpoint 1601, which passes through a pixel 1610, and which intersects the approximate virtual object 1603' intersects the virtual object 1605, a reflection of the virtual object 1605 does not affect the photographed image.

Therefore, influence of the reflection of the virtual object 1605 is calculated and a result of the calculation is added to the pixel 1610.

The main processing of this exemplary embodiment will be described hereinafter. Note that reflected rays are limited to second-order rays here. In addition, an image processing apparatus employed in this exemplary embodiment is a computer having a hardware configuration such as the one shown in FIG. 9.

Figure 15:
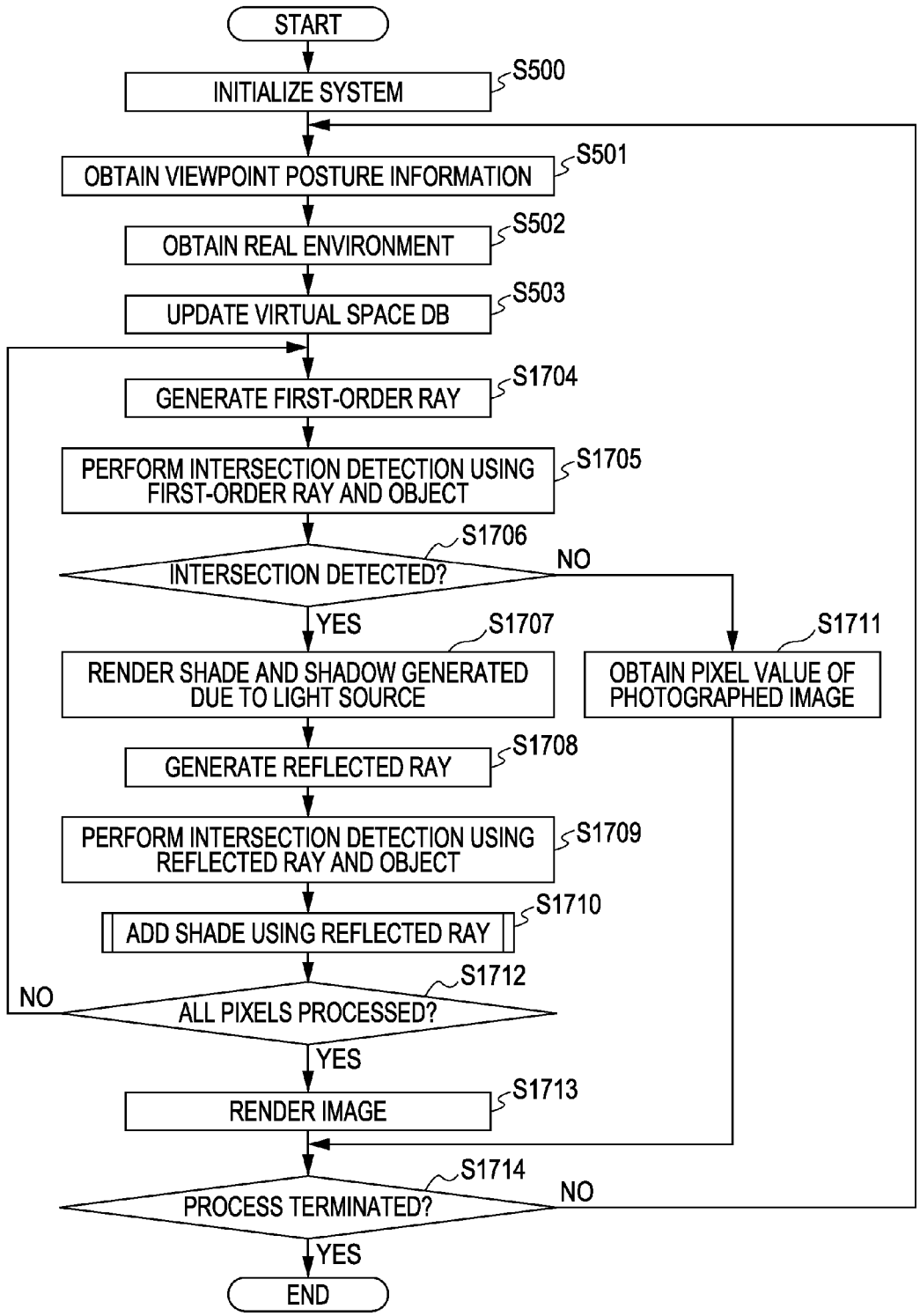
FIG. 15 is a flowchart illustrating processing of generating a mixed reality image by means of the ray tracing method using an image processing apparatus according to the fifth exemplary embodiment of the present invention.

FIG. 15 is a flowchart illustrating processing of generating a mixed reality image by means of the ray tracing method using the image processing apparatus according to the fifth exemplary embodiment of the present invention.

Operations of step S500 to step S503 are the same as those shown in FIG. 8, and therefore, descriptions thereof are not repeated here.

In step S1704, a first-order ray which is emitted from a virtual viewpoint and which passes through a pixel of an object to be rendered is generated.

In step S1705, an intersection of the first-order ray and a virtual object or an approximate virtual object, that is, a point of the object to be rendered is searched for. A result of the searching is stored in a RAM 1102. Here, information stored in step S1705 includes information as to whether the shadow ray intersects an object, and information on a type (a virtual object or an approximate virtual object) of the object if it is determined that the shadow ray intersected the object.

In step S1706, it is determined whether the first-order ray intersected an object in accordance with a result of the searching performed in step S1705. When the determination is negative in step S1706, the pixel of the object to be rendered corresponds to a background, and the process proceeds to step S1711. In step S1711, a pixel value in the photographed image is obtained, and thereafter, the process proceeds to step S1714.

On the other hand, when the determination is affirmative in step S1706, the process proceeds to step S1707.

In step S1707, a shade generated at the point of the object to be rendered due to a light source and influence of a shadow generated due to blocking of the light source by the object are calculated, and a value of the pixel of the object to be rendered is set.

In step S1708, a reflected ray is emitted from an intersection of the first-order ray and the object.

In step S1709, a search is performed for an object which intersects the reflected ray first. A result of the searching performed in step S1709 is stored in the RAM 1102.

In step S1710, a shade generated due to the reflected ray is rendered in accordance with the result of the searching performed in step S1705 and the result of the searching performed in step S1709. The operation performed in step S1710 will be described in detail hereinafter.

In step S1712, it is determined whether the processing has been performed on all pixels of an image to be generated. When the determination is affirmative in step S1712, the process proceeds to step S1713 whereas when the determination is negative in step S1712, the process returns to step S1704.

In step S1713, data corresponding to a generated image is read from the RAM 1102 and is displayed in a display unit 1105.

In step S1714, it is determined whether the user issued an instruction of termination of this processing (by operating an operation unit 1104) or it is determined whether a condition for termination of this processing was satisfied. When the determination is affirmative in step S1714, this processing is terminated whereas when the determination is negative in step S1714, the process returns to step S501 and the operations in step S501 onwards are performed.

The operation performed in step S1710 will now be described in detail.

Figure 16:
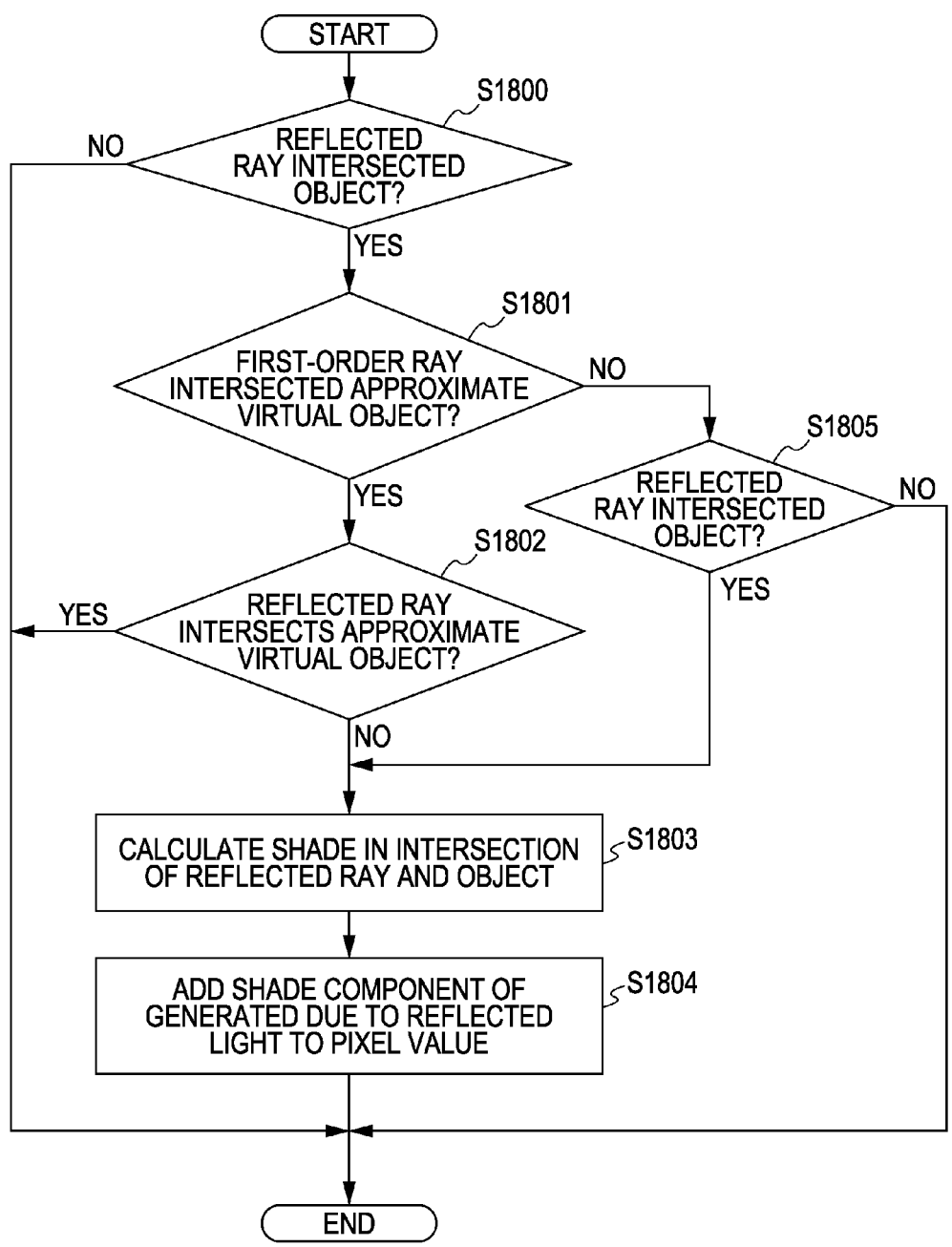
FIG. 16 is a flowchart illustrating processing of generating a shadow of a reflected ray in detail.

FIG. 16 is a flowchart illustrating the operation performed in step S1710, that is, processing of generating a shadow of the reflected ray in detail.

In step S1800, it is determined whether the reflected ray intersected an object in accordance with a result of the operation performed in step S1709. When the determination is affirmative in step S1800, the process proceeds to step S1801. On the other hand, when the determination is negative in step S1800, a reflection which affects the point of the object to be rendered does not occur, and accordingly, the process is terminated.

In step S1801, it is determined whether the first-order ray intersected an approximate virtual object first in accordance with a result of the operation performed in step S1705. When the determination is affirmative in step S1801, the process proceeds to step S1802.

In step S1802, it is determined whether the reflected ray intersected an approximate virtual object first in accordance with the result of the operation performed in step S1709. When the determination is affirmative in step S1802, a reflection of the real object has already been included in the other real object in the real-space image, and accordingly, processing of adding influence of a reflection to the pixel is not performed and the process is terminated.

On the other hand, when it is determined that the reflected ray intersected a virtual object first, the process proceeds to step S1803.

In step S1803, a shade formed on an intersection of the reflected ray and the object is calculated. This calculation operation is the same as that performed in step S1707.

In step S1804, influence of the shade which is generated at the intersection, which is calculated in step S1803, and which is reflected on a value of the pixel of the object to be rendered so that influence of the shade affects the value of the pixel of the object to be rendered is calculated, and a resultant value is added to the value of the pixel of the object to be rendered. Here, the description "influence of the shade which affects the value of the pixel of the object to be rendered" is obtained by multiplying the shade calculated in step S1803 by a rate of a reflection from a direction of the reflected ray to a direction of the first-order ray.

In step S1805, it is determined whether the reflected ray intersected any object in accordance with the result of the operation performed in step S1709. When the determination is affirmative, the process proceeds to step S1803. After the operation in step S1803 is performed, the process proceeds to step S1804 where influence of a reflection of the object in which the reflected ray intersected is added to the value of the pixel of the object to be rendered.

On the other hand, when the determination is negative in step S1805, a reflection is not generated, and therefore, the value of the pixel of the object to be rendered is not changed and the process is terminated.

As described above, according to this exemplary embodiment, a reflection of a virtual object is prevented from being reflected on a region of a real object which is influenced by a reflection of another real object. Consequently, a problem in which a value of a pixel of an object to be rendered is doubly influenced by reflections is prevented from occurring, and in addition, a reflection in which a reflection of the real space and a reflection of the virtual space are matched with each other can be rendered.

Note that although the processing described above is applied to a reflected ray in the above description, the reflected ray may be replaced by a refracted ray. That is, the processing may be applied to a refracted ray.

Note that an order of a reflected ray is limited to a second order in the processing described above. However, processing which employs a method for rendering a reflection of a virtual object taking a reflected ray of an arbitrary order into consideration which prevents inconsistency between the reflection of the virtual object and a reflection of a real object onto another real object from being generated will now be described.

Influence of a reflection of an object in which a high-order ray intersects is transmitted by reversely tracing the ray and is reflected on a value of the pixel of the object to be rendered. Accordingly, in a case where at least one of conditions described below is satisfied for a reflected ray, influence of a reflection of a virtual object should be added to the value of the pixel of the object to be rendered. That is, values of pixels of a reflection image which is shown in a real-space image may not be employed for an image to be generated without changing the pixel values.

(1) A reflected ray intersects a virtual object.
(2) A reflected ray or a refracted ray is emitted from a virtual object to an intersection of an object and a reflected ray.
(3) A shadow of a virtual object is cast on an intersection of an object and a reflected ray.

Conversely, if points in which rays intersect are not influenced by virtual objects while a ray emitted through a certain pixel of an object to be rendered is traced are detected, values of pixels in the real-space image corresponding to pixels corresponding to the points may be employed for values of the pixels corresponding to the points.

Accordingly, in this rendering method, when a condition in which all rays which are traced intersect an approximate virtual object is satisfied, it is determined that the values of the pixels of the real-space image correspond to values of pixels of the object to be rendered. Otherwise, influence of a virtual object is calculated.

Rendering processing in this exemplary embodiment will be described hereinafter.

Here, a first-order reflected ray to an n-th-order reflected ray are generated as described hereinafter. Furthermore, influence of a shadow generated by blocking a light source by an object is not taken into consideration.

Figure 17:
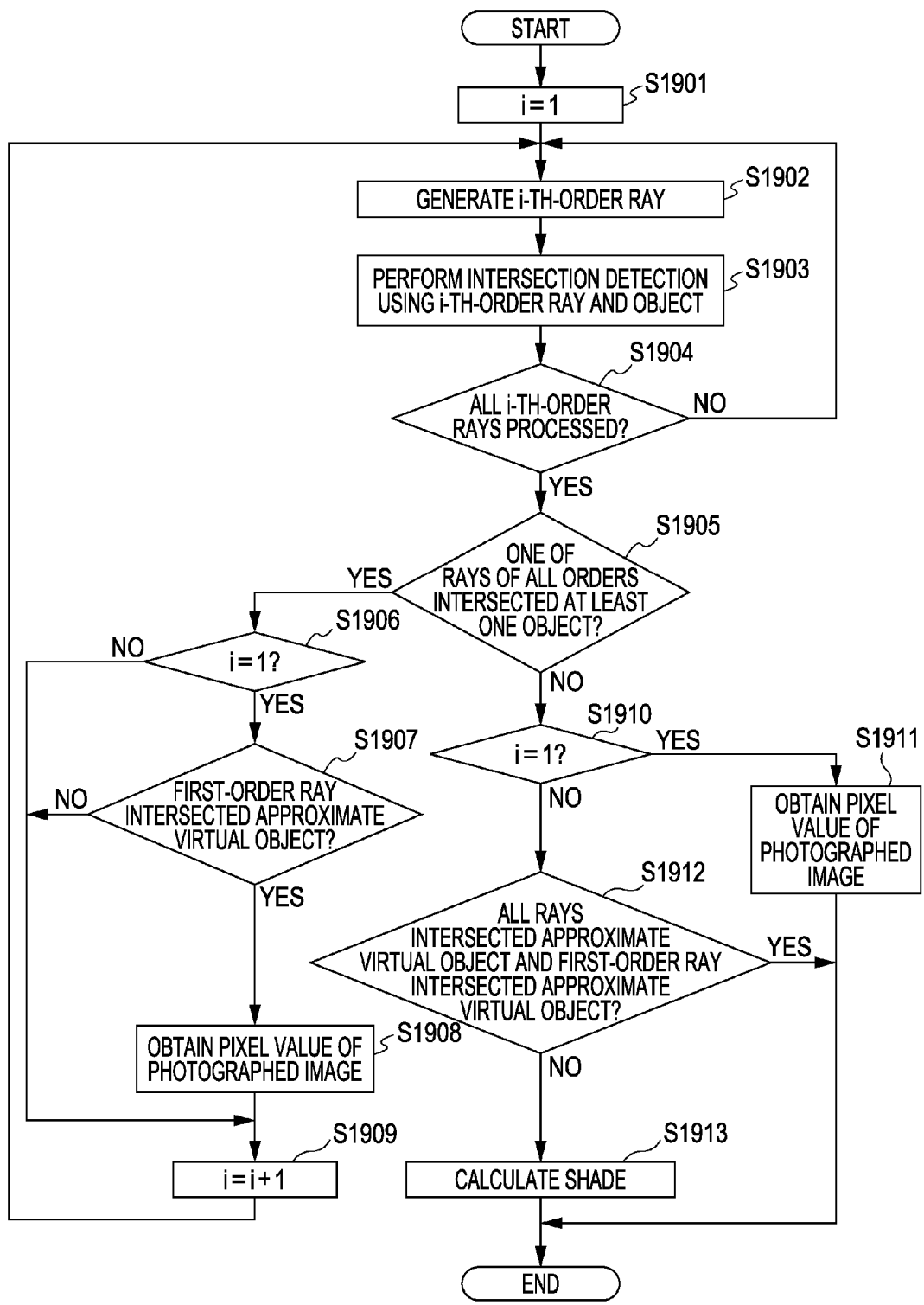
FIG. 17 is a flowchart illustrating processing performed using the image processing apparatus on pixels included in an image generated using the image processing apparatus according to the fifth exemplary embodiment of the present invention.

FIG. 17 is a flowchart illustrating processing performed using the image processing apparatus on pixels included in an image generated using the image processing apparatus according to this exemplary embodiment. When a single image is generated, the processing shown in FIG. 17 is performed on all the pixels.

In step S1901, a variable i representing an order of a ray is initialized to 1.

In step S1902, an i-th-order ray is generated.

In step S1903, an intersection of the generated ray and an object is detected, and a result of the detection is stored in the RAM 1102. Here, data corresponding to the result includes information as to whether the i-th-order ray intersects an object, and information on a type (a virtual object or an approximate virtual object) of an object if it is determined that the i-th-order ray intersected the object.

In step S1904, it is determined whether all i-th-order rays which are required for calculation of a shade are processed. Here, different types of rays which are required for calculation of a shade are employed for different calculation methods of ray tracing. Specifically, only rays corresponding to specular reflection light may be used or only rays corresponding to diffuse reflected light may be used. In any case, it is determined whether all rays which are required for a selected calculation method are processed in step S1904. When the determination is affirmative in step S1904, the process proceeds to step S1905. On the other hand, when the determination is negative in step S1904, the process returns to step S1902 and a ray which has not yet been processed is selected and processed.

In step S1905, it is determined whether a condition for terminating generation of a ray is satisfied. That is, in step S1905, it is determined whether one of the rays of all orders intersected at least one object. When it is determined that the rays of all orders have not intersected any object in step S1905, the process proceeds to step S1910. On the other hand, when it is determined that one of the rays of all orders intersected at least one object in step S1905, the process proceeds to step S1906.

In step S1906, it is determined whether the variable i is 1. When the determination is affirmative (that is, the ray is a first-order ray), the process proceeds to step S1907, and otherwise the process proceeds to step S1909.

In step S1907, it is determined whether the object in which the ray intersected is an approximate virtual object. When the determination is affirmative in step S1907, the process proceeds to step S1908 where a value of a pixel of the object to be rendered is obtained from the real-space image. On the other hand, when the determination is negative in step S1907, the process proceeds to step S1909.

In step S1909, the variable i is incremented so that an order of a ray becomes higher. Thereafter, the process returns to step S1902.

In step S1910, it is determined whether the variable i is 1, that is, it is determined whether the order of the ray is 1. When the determination is affirmative in step S1910, the pixel of the object to be rendered is included in a background area. Then, the process proceeds to step S1911.

In step S1911, a pixel value is obtained from the photographed image. Then the process ends.

On the other hand, when the determination is negative in step S1910, the process proceeds to step S1912.

In step S1912, in accordance with the operation performed in step S1903, it is determined whether each of rays generated by step S1902 intersected an approximate virtual object, and whether the first-order ray intersected an approximate virtual object. When the determination is negative in step S1912, a shade of a virtual object is influenced on a real object, and the process is proceeds to step S1913.

In step S1913, calculations of shades are performed for the all generated rays, and resultant values are added to the values of the pixels of the object to be rendered.

On the other hand, when the determination is affirmative in step S1912, a shade of the virtual object does not affect the pixels of the object to be rendered, and the process is terminated.

According to this processing, only when a real object is reflected only on a real object, an image of a reflection in a real space included in the real-space image is employed, and otherwise, influence of a reflection of a virtual object is added to pixel values. Accordingly, an image of a reflection which is optically consistent can be rendered.

Note that, although the method described above is employed for rendering an image including a reflection, this method may be employed for rendering an image including refraction by replacing the reflected rays by transmitted rays. Furthermore, this method may be employed for an image including a reflection and refraction if a reflected ray and a transmitted ray are processed.

In the description described above, a shadow is not taken into consideration. However, for example, when a shadow ray intersects only a virtual object, influence of the virtual object is added to a pixel value, and otherwise, a pixel value of the real-space image is employed without being changed. In this way, even when a shadow is taken into consideration, this method may be employed.

In a sixth exemplary embodiment, an image processing apparatus which generates a mixed reality image by superposing a projected image of a virtual object on a photographed image captured using a camera will be described as an example.

If a CG image is superposed on the photographed image without taking an overlapping relationship between a real object and a virtual object into consideration, a region in the photographed image which overlaps the virtual object is hidden by an image of the virtual object and is not shown.

In this exemplary embodiment, processing is performed so that a region corresponding to a human hand in a photographed image is detected, and an image of the photographed image corresponding to the region is not hidden by a virtual object. The region corresponding to the hand is detected as a skin-color region in the photographed image. Note that a size of an MR image to be generated is the same as that of the photographed image. Note that it is not necessary that the size of the MR image is the same as the size of the photographed image, and if sizes of the images are different from each other, the photographed image may be resized so that the photographed image has a size the same as that of the MR image. It is assumed that information required for relatively matching a posture in a real space with that in a virtual space, such as a position, a posture, and a field angle of the camera, is obtained in advance by a general method.

Figure 18A:
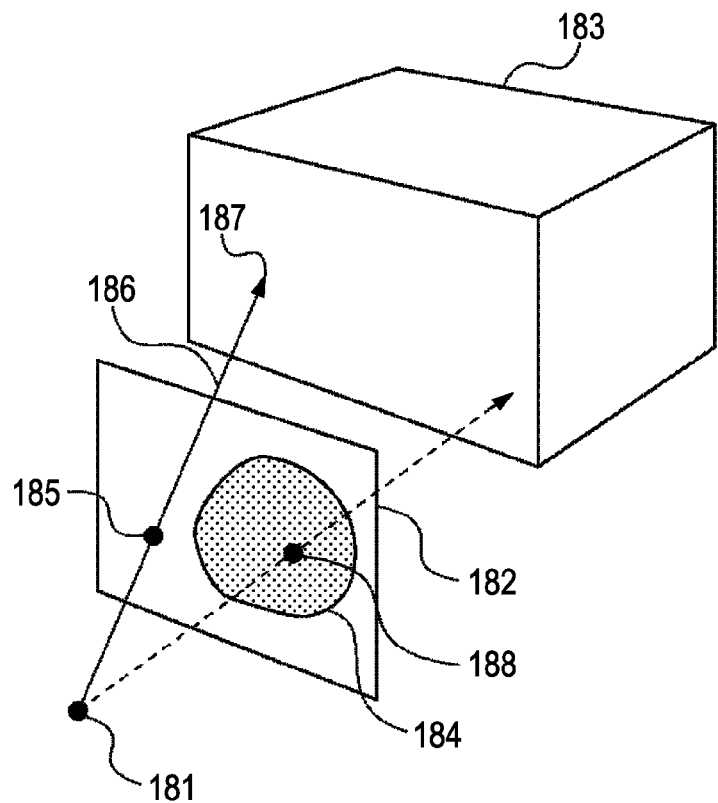
FIGS. 18A and 18B illustrate principles of operation of an apparatus according to a sixth exemplary embodiment of the present invention.
Figure 18B:
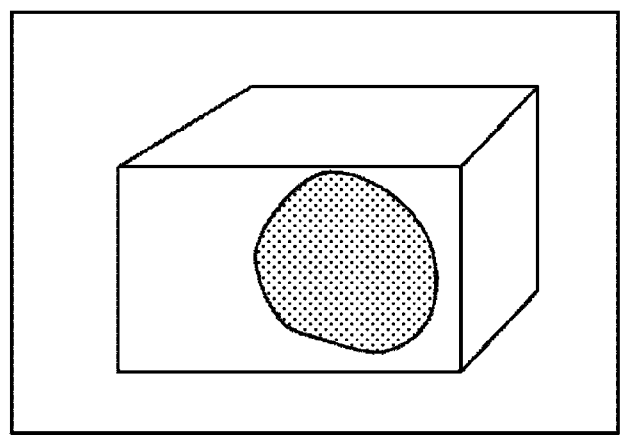

FIGS. 18A and 18B illustrate operation of the image processing apparatus according to the sixth exemplary embodiment. FIG. 18A shows principles of a rendering method and FIG. 18B shows a result of rendering.

In FIG. 18A, a viewpoint 181 corresponds to a viewpoint of a virtual camera when generating a CG image, and also corresponds to a viewpoint of a real camera which captures a photographed image. A screen 182 corresponds to a projection screen, an object 183 corresponds to a virtual object, and a region 184 corresponds to a skin-color region representing a hand which is included as an image in the photographed image.

In this exemplary embodiment, when the CG image is generated, ray tracing is performed on pixels located out of the skin-color region 184 whereas the ray tracing is not performed on pixels located in the skin-color region 184. For example, since a pixel 185 is located out of the skin-color region 184, a ray 186 which passes through the pixel 185 is traced. In FIG. 18A, since the ray 186 intersects the virtual object at a point 187, a shade of the point 187 is calculated as a color of the pixel 185. On the other hand, the ray tracing is not performed on a pixel 188 which is included in the skin-color region 184, and a value of a pixel in the photographed image corresponding to the pixel 188 is set as a value of the pixel 188. In this way, by controlling a ray in accordance with a result of extraction of the skin-color region 184 from the photographed image by image processing, an image is rendered as if the skin-color region 184 is located in front of the virtual object as shown in FIG. 18B. That is, an MR image in which a shape of the skin-color region 184 which is a real object is reflected can be generated.

Figure 19:
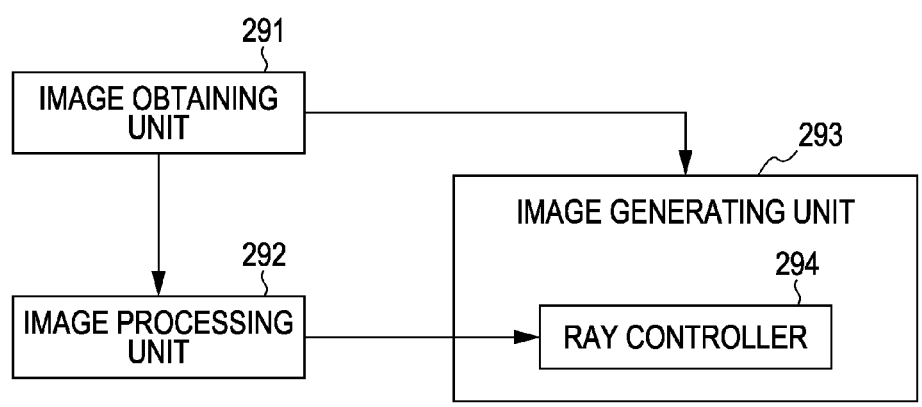
FIG. 19 illustrates an example of a module configuration of the apparatus according to the sixth exemplary embodiment.

Next, a configuration of the image processing apparatus of this exemplary embodiment will be described. FIG. 19 illustrates an example of a module configuration of the image processing apparatus according to the sixth exemplary embodiment. This image processing apparatus includes an image obtaining unit 291, an image processing unit 292, and an image generating unit 293. The image obtaining unit 291 obtains a photographed image from a camera and the image processing unit 292 extracts a skin-color region. The image generating unit 293 generates an MR image by combining a CG image with the photographed image obtained using the image obtaining unit 291. When the CG image is rendered, a ray controller 294 controls rays in accordance with a result of the operation performed using the image processing unit 292.

Figure 20:
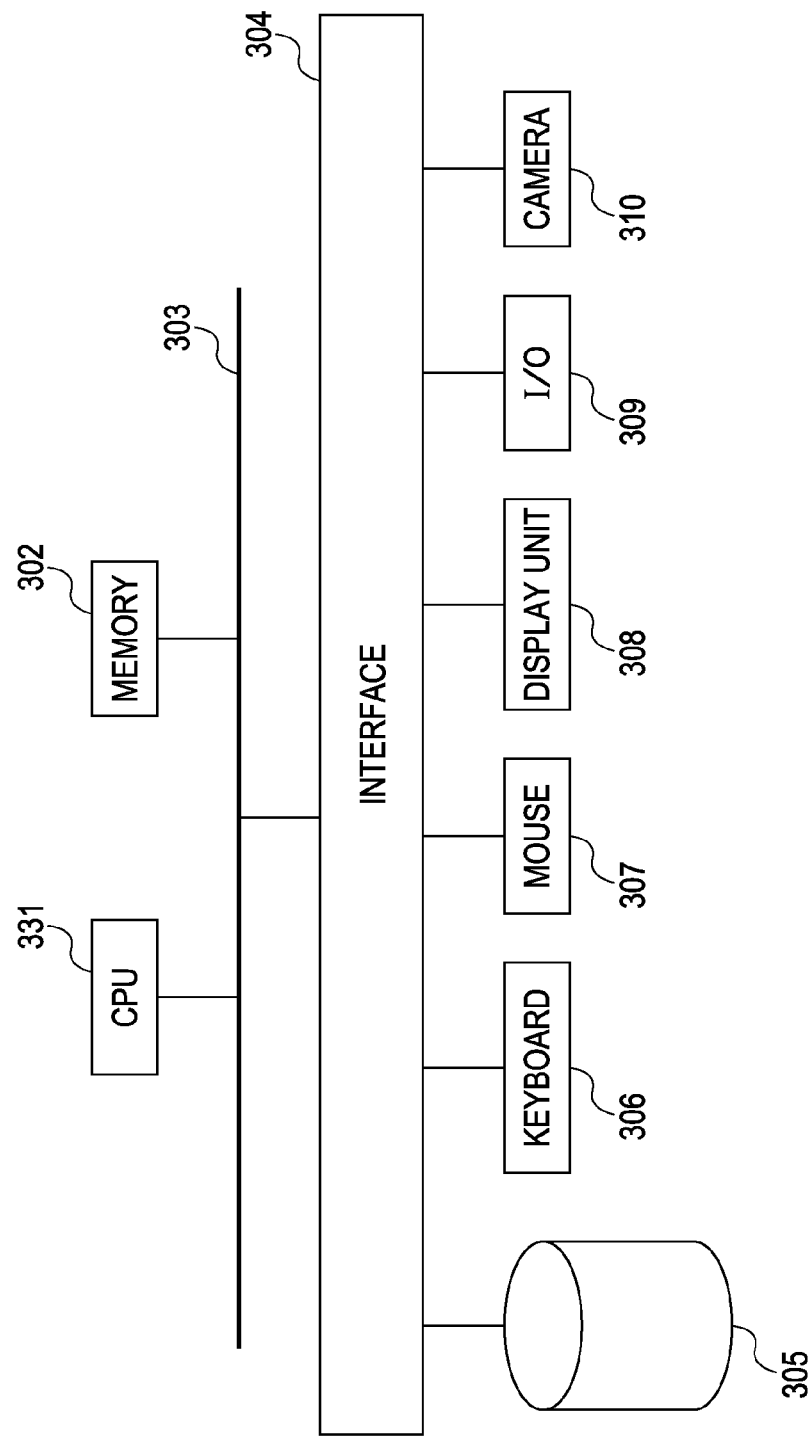
FIG. 20 illustrates an example of a hardware configuration of the apparatus according to the sixth exemplary embodiment.

FIG. 20 is illustrates an example of a hardware configuration of the image processing apparatus according to the sixth exemplary embodiment. In FIG. 20, a CPU 331 controls operation of the image processing apparatus. A memory 302 stores therein programs and data used when the CPU 331 operates. A bus 303 is used to transmit data between configuration modules. An interface 304 is used to connect the bus 303 to various units. An external storage device 305 stores therein programs and data which are to be read by the CPU 331. A keyboard 306 and a mouse 307 included in an input device are used to activate programs and instruct operations of the programs. A display unit 308 displays a result of an operation of a process. A data input/output unit 309 is used to communicate with an external apparatus. A reference numeral 310 denotes a camera.

Figure 21:
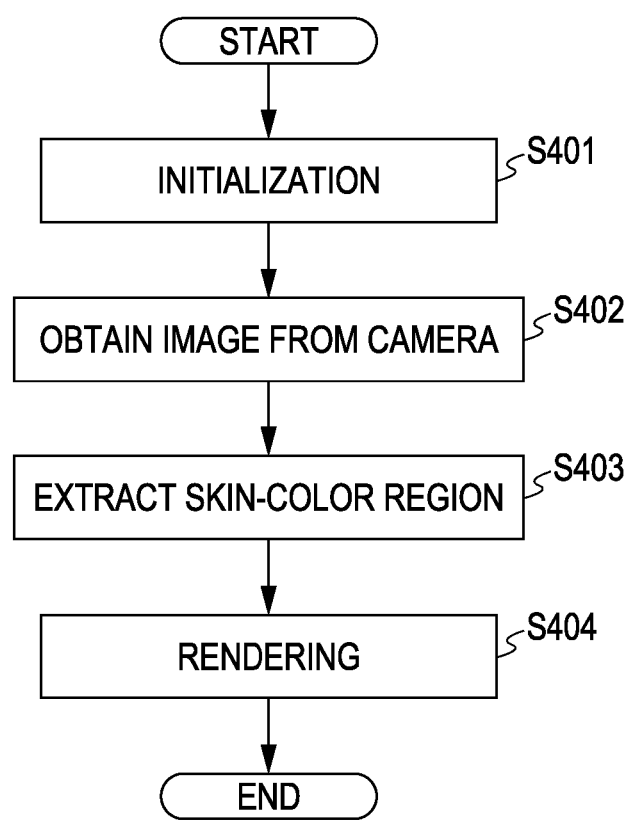
FIG. 21 is a flowchart illustrating main processing according to the sixth exemplary embodiment.

FIG. 21 is a flowchart illustrating processing performed using the image processing apparatus according to the sixth exemplary embodiment. When the processing is started, in step S401, the CPU 331 initializes data used for subsequent steps. Here, the CPU 331 reads, from the external storage device 305 to the memory 302, model data of a virtual object, data representing postures of the real camera and a virtual camera at certain viewpoints, data representing a condition of a projection of an image from a virtual space such as a field angle of the cameras, and a value of a pixel to be extracted as an pixel included in a skin-color region.

In step S402, the CPU 331 obtains a photographed image captured using the camera 310 and stores the photographed image in the memory 302. In step S403, the CPU 331 processes the photographed image so as to extract a skin-color region from the image. In step S404, an MR image is rendered. The operation of step S404 will be described in detail hereinafter.

Note that in step S403, the CPU 331 performs determination on each of pixels included in the photographed image as to whether each of the pixels in the photographed image has a value corresponding to a pixel value which is considered to be included in the skin-color region which is read in step S402. When the determination is affirmative, a pixel of interest is determined as a pixel included in the skin-color region. On the other hand, when the determination is negative, the pixel of interest is determined as a pixel which is not included in the skin-color region. A result of the operation of step S403 is recorded as a black-and-white image having a size the same as that of the photographed image in the memory 302. In the black-and-white image, pixels included in the skin-color region are displayed as white and pixels out of the skin-color region are displayed as black.

Figure 22:
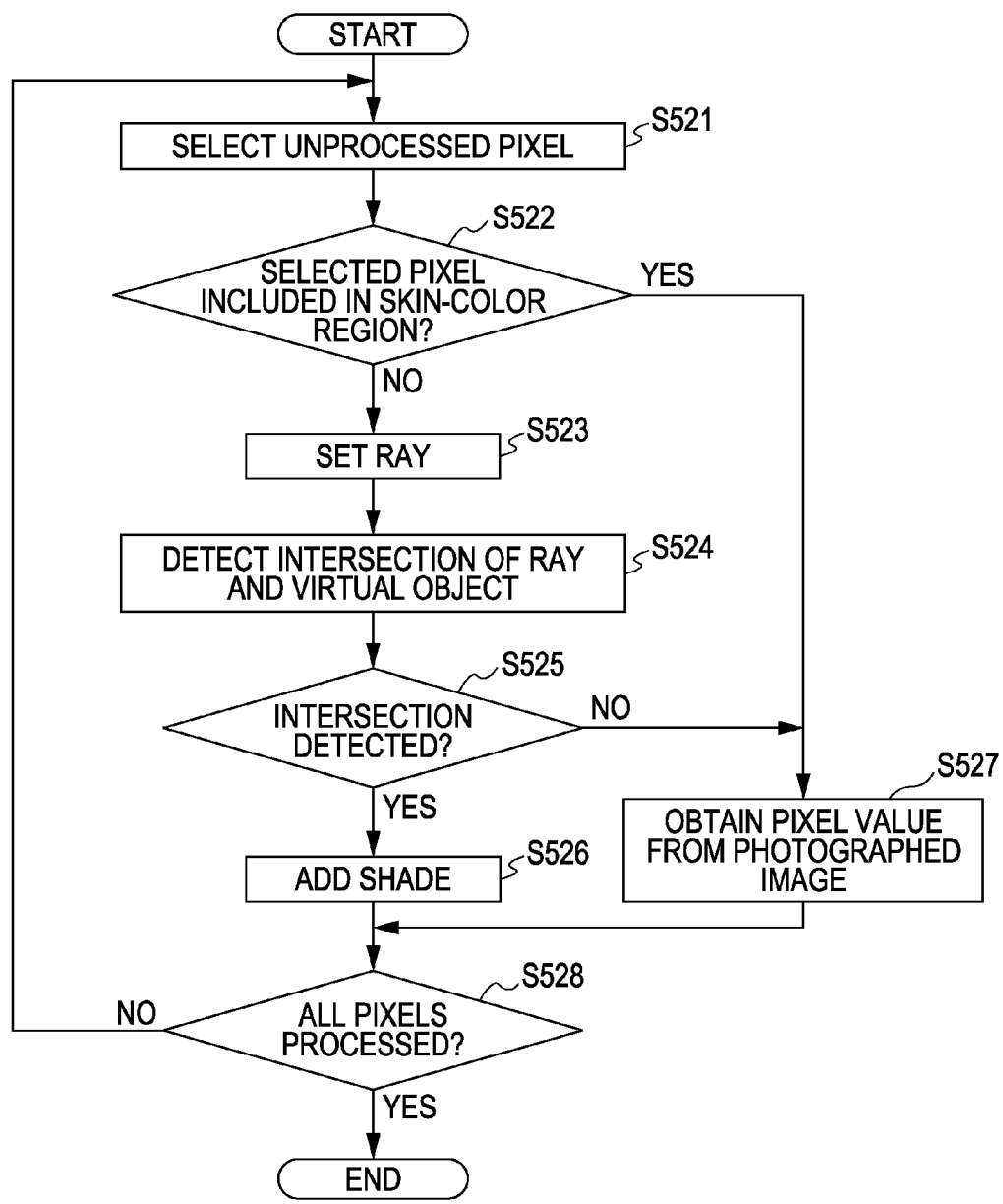
FIG. 22 is a flowchart illustrating processing of generating an image according to the sixth exemplary embodiment.

FIG. 22 is a flowchart illustrating the processing of generating an image (performed in step S404) in detail. When the processing is started, in step S521, the CPU 331 selects a pixel which has not yet been processed. The pixel selected in step S521 is referred to as a "selected pixel" hereinafter. In step S522, the CPU 331 determines whether the selected pixel is included in the skin-color region extracted in step S403. When the determination is affirmative in step S522, the process proceeds to step S527 where the CPU 331 sets a value of a pixel in the photographed image obtained in step S402 which corresponds to the selected pixel as a value of the selected pixel. Thereafter, the process proceeds to step S528.

On the other hand, when the determination is negative in step S522, the process proceeds to step S523 where the CPU 331 sets a ray which passes through the selected pixel and which is used for a ray detection operation. In step S524, the CPU 331 detects an intersection of the ray set in step S523 and a virtual object. In step S525, the CPU 331 determines whether the ray intersected a virtual object in accordance with a result of the ray detection operation performed in step S524. When the determination is affirmative in step S525, the process proceeds to step S526 where the CPU 331 performs addition of a shade to the intersection and calculates a value of the selected pixel. Processing then proceeds to step S528. On the other hand, when the determination is negative in step S525, the selected pixel is included in a background in the photographed image, and the process proceeds to step S527 and further proceeds to step S528. In step S528, the CPU 331 determines whether all pixels in the image are processed. When the determination is affirmative in step S528, the processing of generating an image is terminated. On the other hand, when the determination is negative, the process returns to step S521.

As described above, since the ray tracing is not performed on pixels included in the skin-color region and values of pixels in a photographed image which correspond to the pixels included in the skin-color region are employed, the skin-color region is not hidden by an image of a virtual object and a real object is shown. That is, an MR image on which a shape of the skin-color region corresponding to a real object is reflected and which is consistent can be generated.

Note that, in the description described above, although the image processing includes an operation of extracting a pixel having a value corresponding to a skin color, the image processing may include another operation instead of the operation. Any operation may be included in the image processing as long as the region corresponding to the hand is detected.

Furthermore, the object to be extracted from the photographed image is not limited to a human hand. Any object may be detected as long as a region corresponding to the object is detected. In this case, a suitable method for extracting the object is employed in the image processing. For example, when an object which is characterized by an edge is to be detected, an edge detection operation may be employed.

Furthermore, although the image obtaining unit 291 is the camera which captures the photographed image in this exemplary embodiment, the image obtaining unit 291 is not limited to this. For example, the image obtaining unit 291 may be a module which obtains an image file in a computer network.

In the sixth exemplary embodiment, it is determined whether ray tracing is performed on pixels in a photographed image in accordance with a result of image processing. In a seventh exemplary embodiment, a ray controlling operation is performed in accordance with a result of image processing and an arrangement of a CG model as an example.

In this exemplary embodiment, a photographed image including an image of a certain real object is obtained, and an image of a virtual object having a shape the same as that of the real object is rendered by positioning the image of the virtual object so as to be superposed on the image of the certain real object. A posture of the real object is measured using a six-degree-of-freedom posture sensor. However, a measured value includes a margin of an error. Accordingly, when the virtual object is arranged in a virtual space in accordance with a value obtained using the posture sensor, difference between a position of the real object and a position of the virtual object is generated and the position of the image of the virtual object may shift from the position of the image of the real object. In this exemplary embodiment, a method for rendering an MR image while such a shift of an image is prevented.

Figure 23:
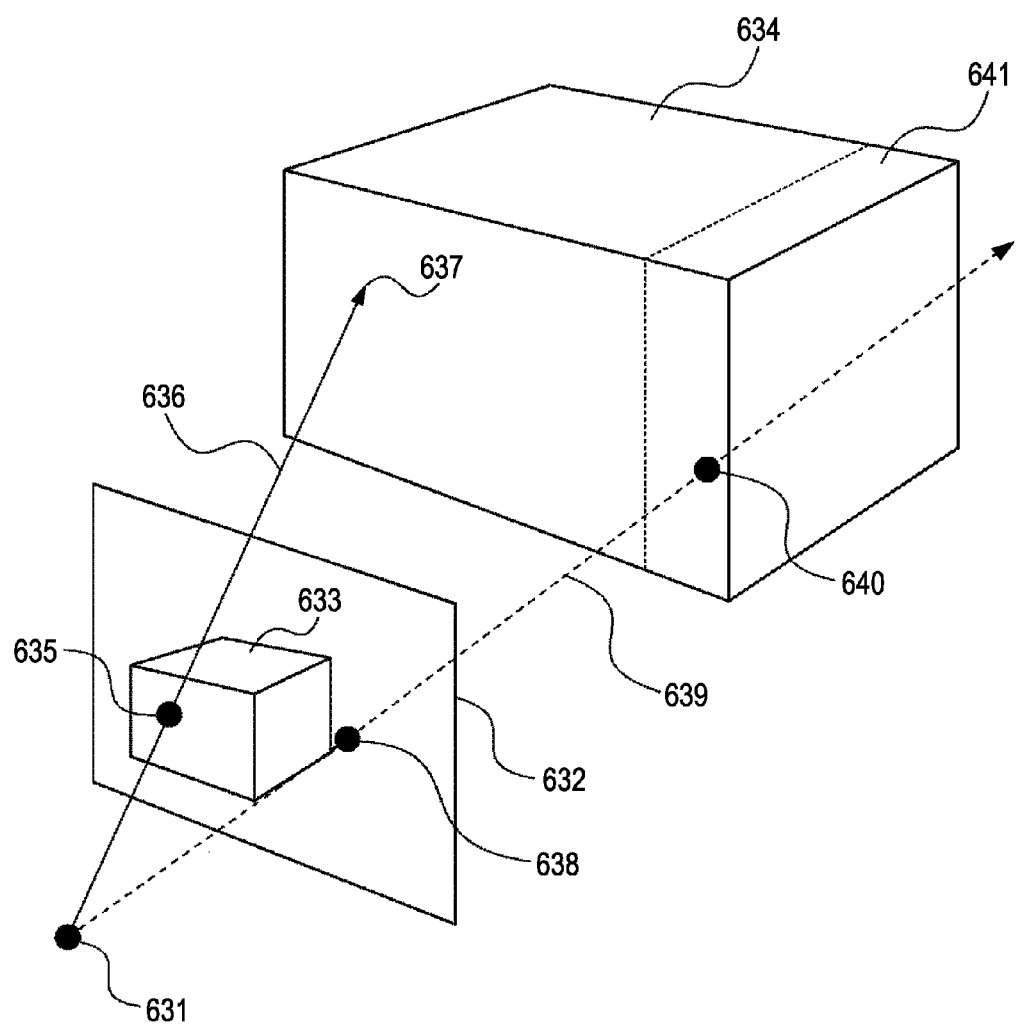
FIG. 23 illustrates principles of operation of an apparatus according to a seventh exemplary embodiment.

FIG. 23 illustrates principles of operation of the image processing apparatus according to the seventh exemplary embodiment. In FIG. 23, a viewpoint 631 is a viewpoint of a virtual camera when a CG image is generated, and is also a camera which captures a photographed image. A reference numeral 632 denotes a projection screen. An image region 633 (hereinafter referred to as a "real object region") includes a real object displayed as if a virtual object is superposed on the real object. A virtual object 634 (hereinafter referred to as a "superposed object") is displayed as if the virtual object is superposed on the real object. Here, it is assumed that the entire real object is blue. In this case, the real object region can be obtained by extracting a blue region from the photographed image.

In this exemplary embodiment, when a CG image is generated by means of the ray tracing method, if a pixel through which a ray which intersects a superposed object passes is included in a real object region, the processing of adding a shade is performed on an intersection. For example, since a pixel 635 in which a ray 636 which intersects the real object at a point 637 is included in the real object region, a shade of the point 637 is calculated as a color of the pixel 635. On the other hand, when a pixel through which a ray which intersects a superposed object passes is not included in the real object region, a shade is not added to an intersection, and ray tracing is continued. For example, a ray 639 intersects the superposed object at a point 640. However, since a pixel 638 through which the ray 639 passes is not included in the real object region, the processing of adding a shade is not performed on the point 640, and the ray tracing is continued. As a result, a shade is not rendered in a portion 641 of the superposed object which is located out of the real object region.

A processing flow of the image processing method in this exemplary embodiment is the same as that shown in FIG. 21. Note that in this exemplary embodiment, the blue region is extracted instead of a skin-color region in order to obtain the real object region in step S403.

Figure 24:
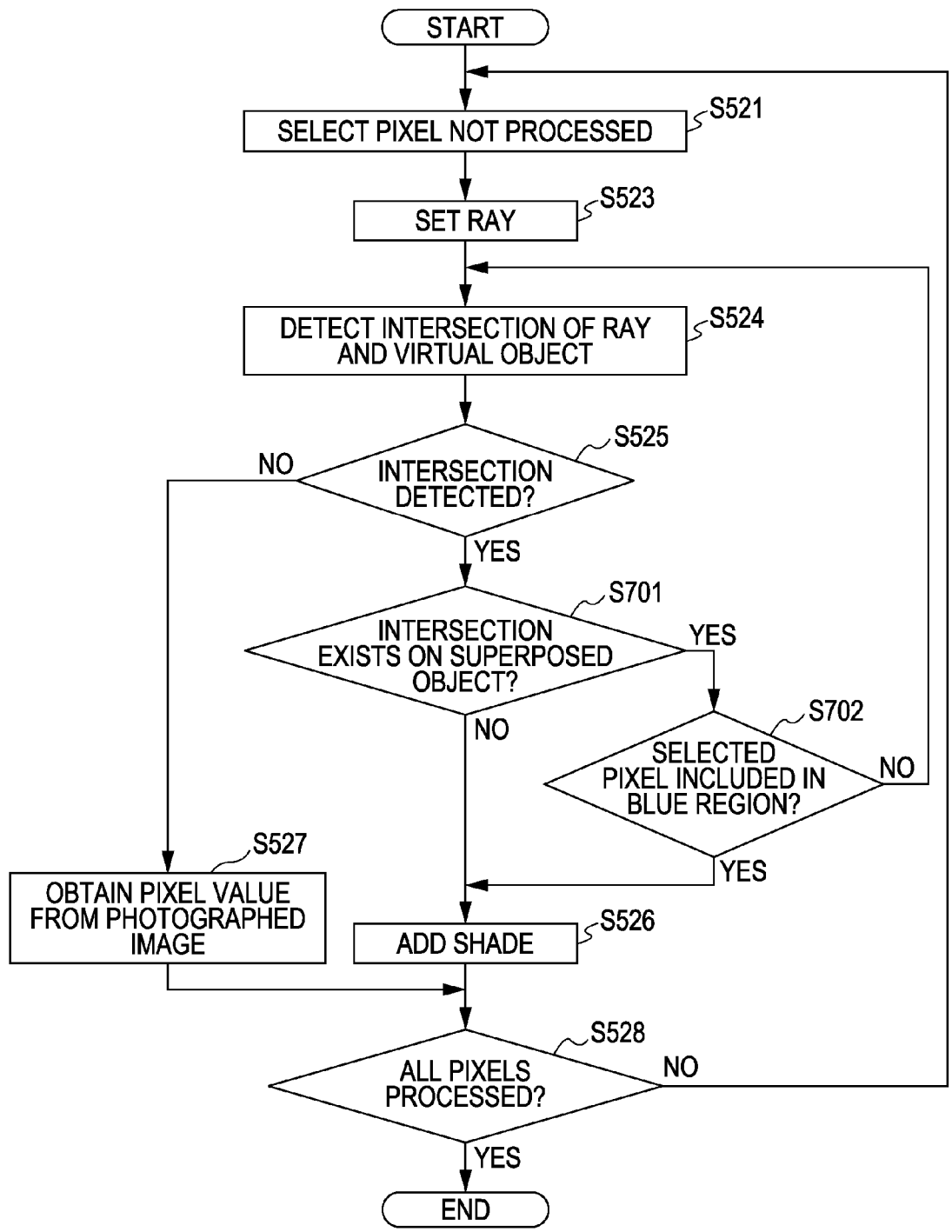
FIG. 24 is a flowchart illustrating processing of generating an image according to the seventh exemplary embodiment.

FIG. 24 is a flowchart illustrating the processing of generating an image performed in step S404 according to the seventh exemplary embodiment. Operations of step S521 and step S523 to step S528 are the same as those in the flowchart shown in FIG. 22, and therefore, detailed descriptions thereof are not repeated. The CPU 331 detects an intersection of a virtual object and a ray which passes through a selected pixel in an image through the operations of step S521, step S523, and step S524. In step S525, it is determined whether an intersection is detected. When the determination is affirmative in step S525, the process proceeds to step S701 where the CPU 331 determines whether the intersection was detected on the superposed object. When the determination is negative in step S701, processing proceeds to step S526 where the CPU 331 performs processing of adding a shade on the intersection of the ray and the virtual object. When the determination is affirmative in step S701, the process proceeds to step S702. In step S702, the CPU 331 determines whether the selected pixel is included in the blue region extracted in step S403, that is, the selected pixel is included in the real object region. When the determination is affirmative in step S702, the process proceeds to step S526 where the CPU 331 performs processing of adding a shade on the intersection of the ray and the virtual object. On the other hand, when the determination is negative, the process returns to step S524, and the ray tracing is continued. Note that when the determination is negative in step S525, the selected pixel is included in a background of the photographed image, and therefore, the CPU 331 obtains a value of a corresponding pixel in the photographed image.

As described above, since the ray is controlled in accordance with the result of the processing performed on the photographed image and the arrangement of the virtual object, inconsistency of the MR image due to a shift of a position of the real object relative to a position of the virtual object can be reduced.

In an eighth exemplary embodiment, when a virtual object (hereinafter referred to as a "mask object") which is generated by copying a shape of a real object is rendered, a ray is controlled so that inconsistency which occurs due to difference of the shape of the real object and a shape of the virtual object is avoided, for example. Here, it is assumed that the real object, a shape of which is copied so that the virtual object is generated, is a skin-color object such as a human hand.

Figure 25A:
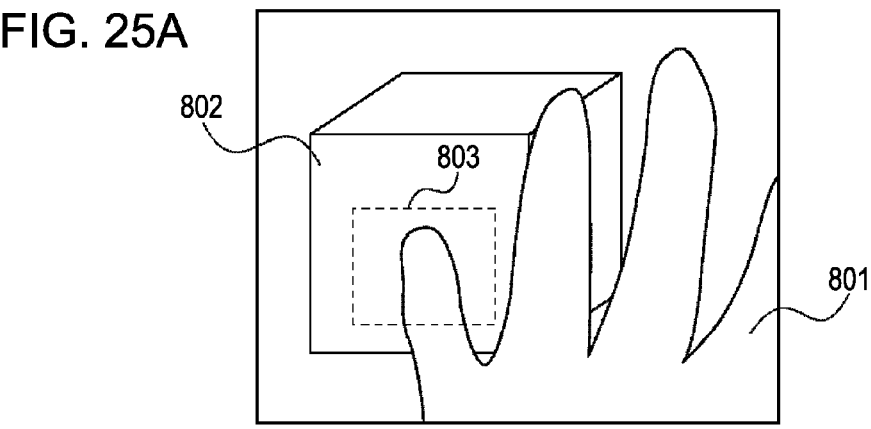
FIGS. 25A to 25D illustrate principles of operation of an apparatus according to an eighth exemplary embodiment.
Figure 25B:
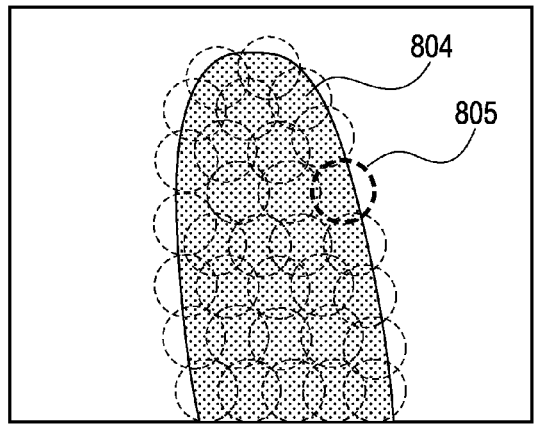

FIGS. 25A to 25D illustrate principles of operation of an image processing apparatus according to the eighth exemplary embodiment. FIG. 25A is an example of an MR image generated in accordance with a method of this exemplary embodiment. The MR image includes a skin-color object 801 which is a real object and a virtual object 802. FIG. 25B shows an enlarged view illustrating a portion 803.

In this exemplary embodiment, the skin-color object 801 is represented by an aggregate of a plurality of sphere objects. In FIG. 25B, a reference numeral 804 denotes a skin-color object, and sphere objects 805 which are virtual objects which constitute the skin-color object 804 and correspond to a part of the mask object. As shown in FIG. 25B, the mask object is projected from the region of the skin-color object 804 in the MR image.

Figure 25C:
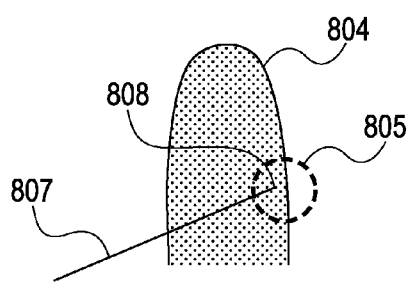
Figure 25D:
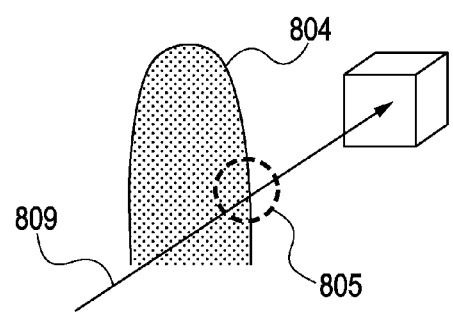

A ray intersects one of the sphere objects 805 within the skin-color region as shown in FIG. 25C or out of the skin-color region as shown in FIG. 25D. In the former case, when a ray 807 intersects one of the sphere objects 805, ray tracing is terminated. Then, it is determined a color of a pixel in a photographed image corresponding to an intersection 808 corresponds to a color of the ray 807. On the other hand, in the latter case, a light 809 passes through one of the sphere objects 805 and the ray tracing is continued. In this way, by controlling a ray, a background of the mask object is rendered in portions of the mask object which are projected from the skin-color object 804.

Figure 26:
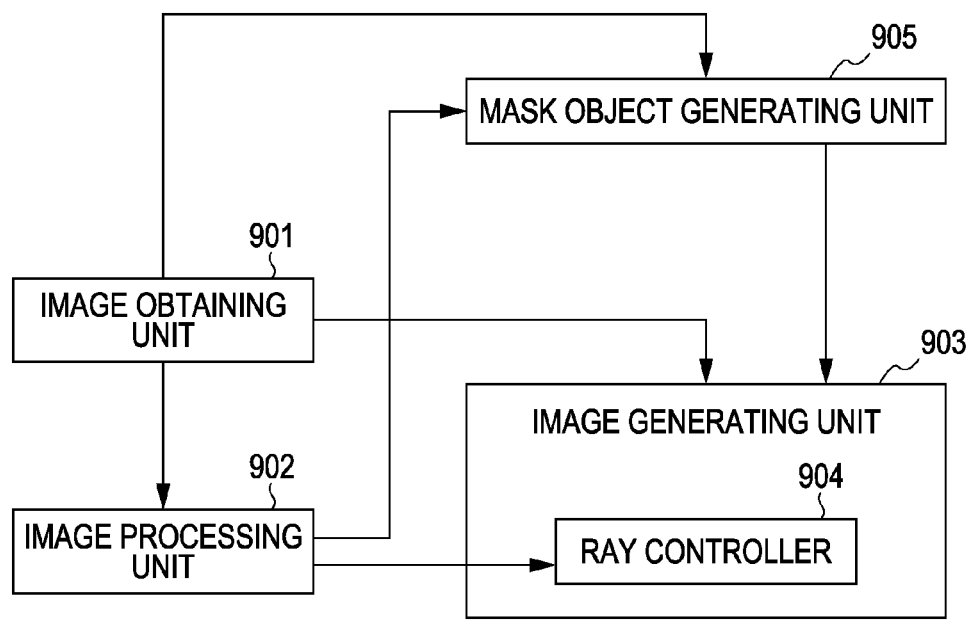
FIG. 26 illustrates an example of a module configuration of the apparatus according to the eighth exemplary embodiment.

FIG. 26 illustrates an example of a module configuration of the image processing apparatus according to the eighth exemplary embodiment. The image processing apparatus includes an image obtaining unit 901, an image processing unit 902, an image generating unit 903, and a mask object generating unit 905. The image obtaining unit 901 obtains a photographed image from a camera and the image processing unit 902 extracts a skin-color region. The mask object generating unit 905 generates an aggregate of sphere objects which has a shape the same as a real object of the skin-color region in accordance with the image obtained using the image obtaining unit 901 and the skin-color region extracted using the image processing unit 902. The image generating unit 903 generates a CG image and generates an MR image by combining the photographed image obtained using the image obtaining unit 901 and the CG image. When the CG image is rendered, a ray controller 904 controls a ray in accordance with a shape of a mask object generated using the mask object generating unit 905 and a result of the processing performed using the image processing unit 902.

The image processing apparatus of this exemplary embodiment has a hardware configuration the same as that shown in FIG. 20. Note that a camera 310 is a stereo camera. Therefore, information output from the camera 310 is a pair of image data blocks.

Figure 27:
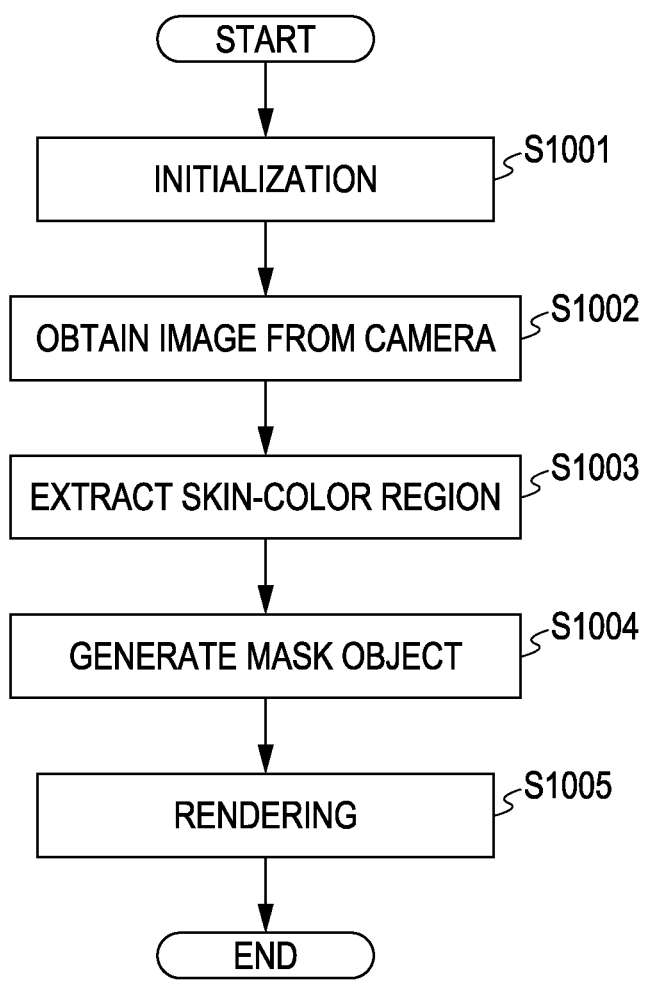
FIG. 27 is a flowchart illustrating processing according to the eighth exemplary embodiment.

FIG. 27 is a flowchart illustrating processing according to the eighth exemplary embodiment. When the processing is started, in step S401, a CPU 331 initializes data used for subsequent steps. The processing performed in step S1001 is the same as the processing performed in step S401 of FIG. 21 in the sixth exemplary embodiment. Note that data representing relative postures of two image pickup devices included in the camera 310 which is used in processing of generating a mask object in step S1004 is read in step S1001. In step S1002, the CPU 331 obtains the photographed images captured using the camera 310 and stores the images in a memory 302. In step S1003, the CPU 331 processes the photographed images so that skin-color regions are extracted from the photographed images. Note that the operation of extracting a skin-color region is performed on all pixels of the stereo images obtained in step S1002. Subsequently, in step S1004, the CPU 331 generates a mask object corresponding to the real object of the skin-color region. Then, in step S1005, the CPU 331 renders an MR image. The operation performed in step S1005 will be described in detail hereinafter.

In step S1004, first, the CPU 331 obtains distances from pixels in the skin-color region to the camera. The distances are calculated by a general method for measuring a distance from stereo images. Subsequently, the CPU 331 generates a mask object by arranging sphere objects having a predetermined radius in a three-dimensional space. Then, in step S1005, the CPU 331 generates an MR image corresponding to one of the stereo images obtained in step S1002.

Figure 28:
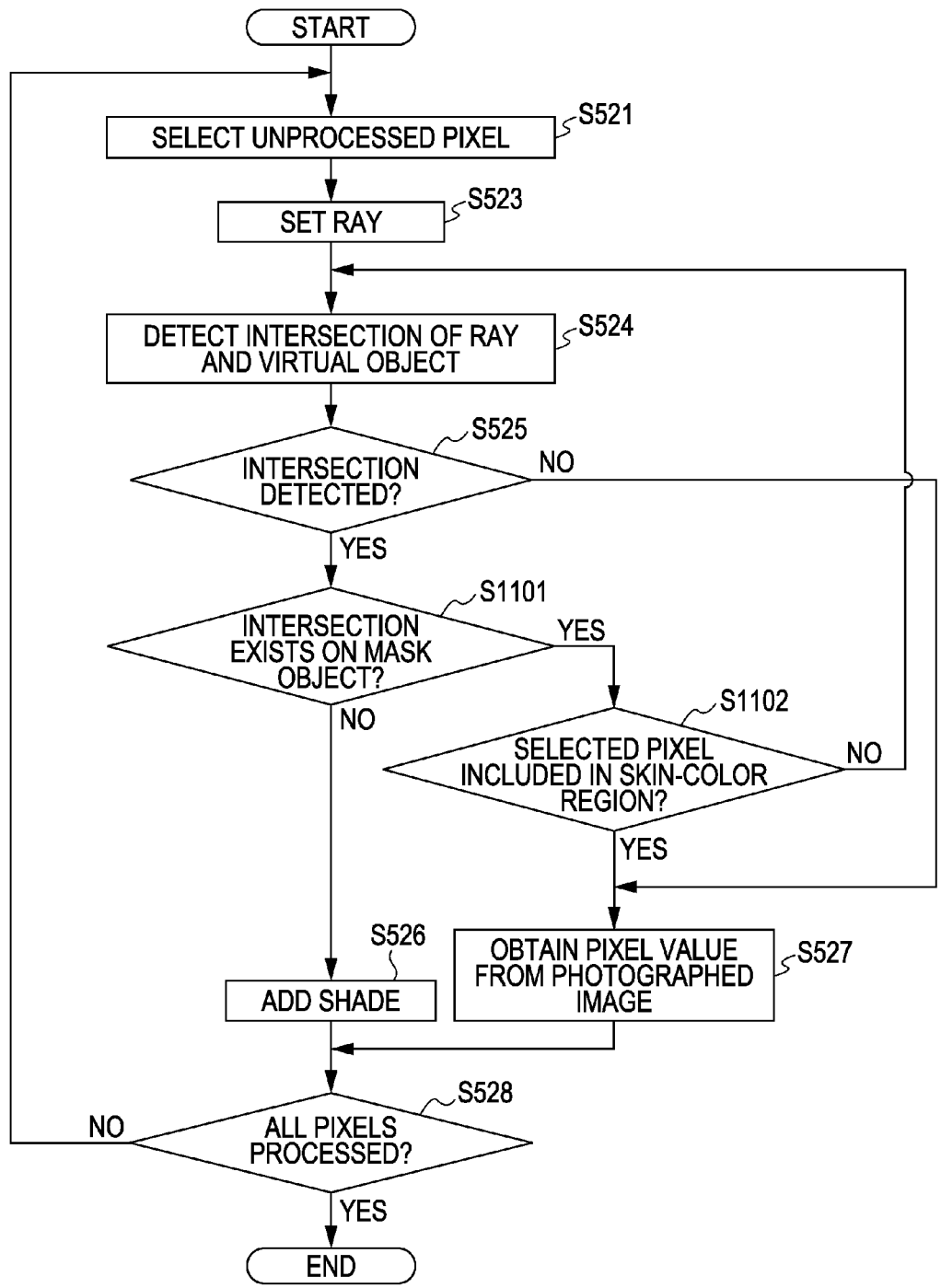
FIG. 28 is a flowchart illustrating processing of generating an image according to the eighth exemplary embodiment.

FIG. 28 is a flowchart illustrating the processing of generating an image performed in step S1005 according to the eighth exemplary embodiment. In FIG. 28, operations performed in step S521 and step S523 to step S528 are the same as those performed in the flowchart shown in FIG. 22. In step S1101, the CPU 331 determines whether an intersection of a ray and a virtual object obtained in step S524 is included in the mask object. When the determination is affirmative in step S1101, the process proceeds to step S1102 where the CPU 331 determines whether a selected pixel is included in a skin-color region. When the determination is affirmative in step S1102, the process proceeds to step S527 where the CPU 331 sets a value of a pixel of the photographed image corresponding to the selected pixel as a value of the selected pixel. On the other hand, when the determination is negative in step S1102, the process returns to step S524, and ray tracing is continued. When the determination is negative in step S1101, the process proceeds to step S526 where the CPU 331 performs the processing of adding a shade on the intersection. When it is determined that the ray does not intersect any virtual object (in a case where a determination is negative in step S525), the selected pixel is included in a background of the photographed image. Then, the process proceeds to step S527 where the CPU 331 sets a value of a pixel of the photographed image corresponding to the selected pixel to a value of the selected pixel.

With the configuration described above, the background is rendered on pixels located in the portions of the mask object which are projected from the skin-color region instead of the mask object. That is, a shade is appropriately added by reflecting the real space.

Note that although the mask object is constituted by the aggregate of the sphere objects arranged in depths of the pixels, a configuration of the mask object is not limited to this. For example, the mask object may be generated by connecting points included in the mask object to one another so that a polyhedron model constituted by plane patches.

As with the sixth exemplary embodiment, the image obtaining unit 291 is not limited to the camera which captures a photographed image, and the image processing may include arbitrary operation instead of the operation of extracting a skin-color region.

Figure 29:
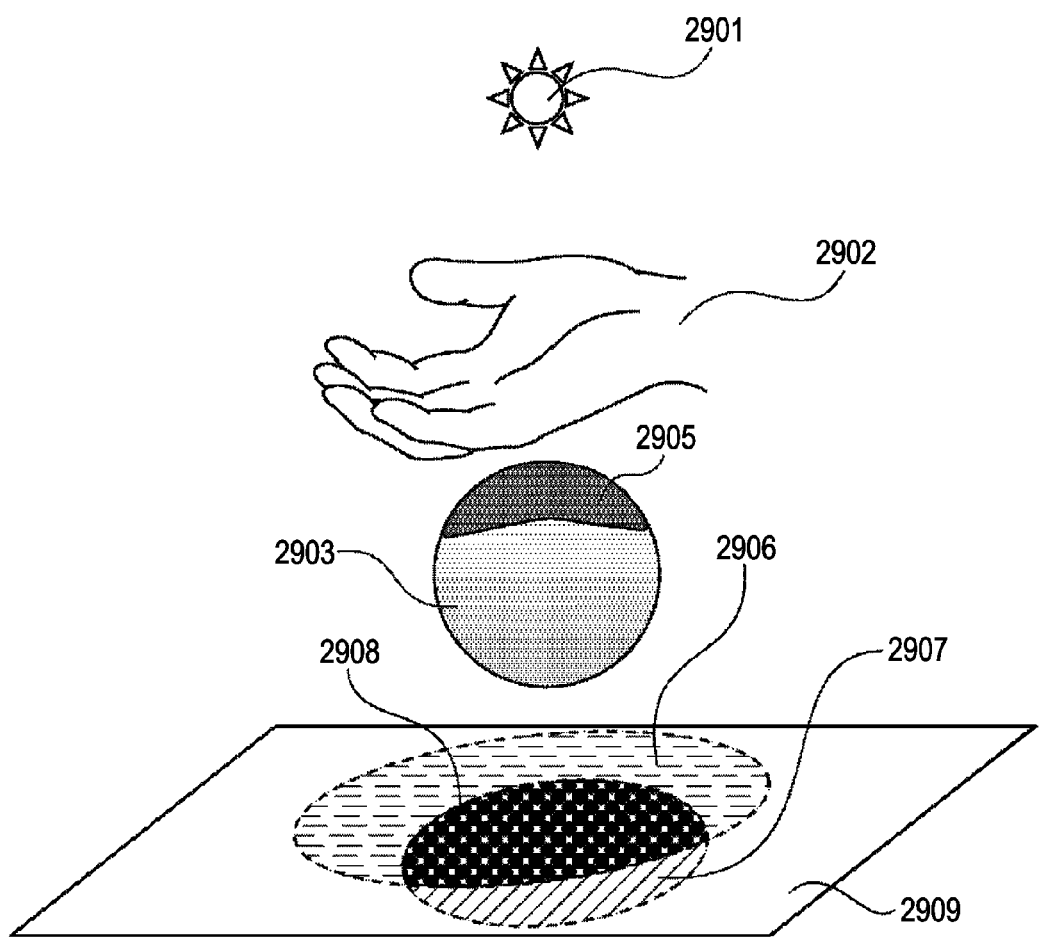
FIG. 29 illustrates principles according to a ninth exemplary embodiment.

FIG. 29 illustrates principles according to a ninth exemplary embodiment. Referring to FIG. 29, a virtual light source 2901, a hand 2902 of a user, a sphere object 2903 serving as a virtual object, and a floor 2909 are arranged in this order from an upper side. It is assumed that a state of a real light source corresponds to a state of the virtual light source 2901.

In FIG. 29, a virtual object which is obtained by copying a real object (the hand 2902 of the user, for example) defined in a virtual space is referred to as an "approximate virtual object" whereas a virtual object other than the approximate virtual object is referred to as a "non-approximate virtual object" so that they are clearly distinguished. In addition, all virtual objects including the approximate virtual object and the non-approximate virtual object are referred to as "all virtual objects".

A rendering operation which is optically correct will be described with reference to the diagram shown in FIG. 29.

1. The user's hand 2902 (real object) makes a shadow (first shadow 2905) on the sphere object 2903 (non-approximate virtual object).
2. The user's hand 2902 (real object) makes a shadow (second shadow 2906) on the floor 2909 (real object).
3. The sphere object 2903 (non-approximate virtual object) makes a shadow (third shadow 2907) on the floor 2909 (real object).
4. In a region in which a real shadow (corresponding to the second shadow 2906) and a virtual shadow (corresponding to the third shadow 2907) should be superposed on each other, the real shadow is rendered but the virtual shadow is not rendered so as to obtain a fourth shadow 2908.

The first shadow 2905 does not exist in a real space. Therefore, in order to display the first shadow 2905 for the user, a shadow of a CG image should be calculated and rendered on the sphere object 2903. Here, when the real object is to make a shadow on the virtual object, information on a shape of the real object should be defined as that of an approximate virtual object in the virtual space.

Then, when a surface of the sphere object (non-approximate virtual object) is rendered, a shadow of the approximate virtual object defined in the virtual space is rendered as a CG image and a shadow of the user's hand 2902 can be rendered on the sphere object.

The user's hand 2902 also makes a shadow (corresponding to the second shadow 2906) on the floor 2909. This is natural in the real space and it is not necessary to render the second shadow 2906 as a CG image.

The sphere object 2903 should make a shadow (corresponding to the third shadow 2907) on the floor 2909. In order to realize this effect, as with the user's hand 2902, the floor 2909 should be defined as an approximate virtual object in the virtual space and a region in which the third shadow 2907 is to be cast should be calculated.

The fourth shadow 2908 is a region in which the second shadow 2906 and the third shadow 2907 are superposed on each other. In this region, since the shadow of the CG image is rendered on the real shadow, a resultant shadow is darker than the real shadow. The ninth exemplary embodiment is provided to address this problem.

An image processing apparatus according to the ninth exemplary embodiment calculates a region in which only a shadow of an non-approximate virtual object is cast by removing a region in which an approximate virtual object makes a shadow corresponding to a region of a shadow of a real object from a region in which a non-approximate virtual object makes a shadow.

Figure 30:
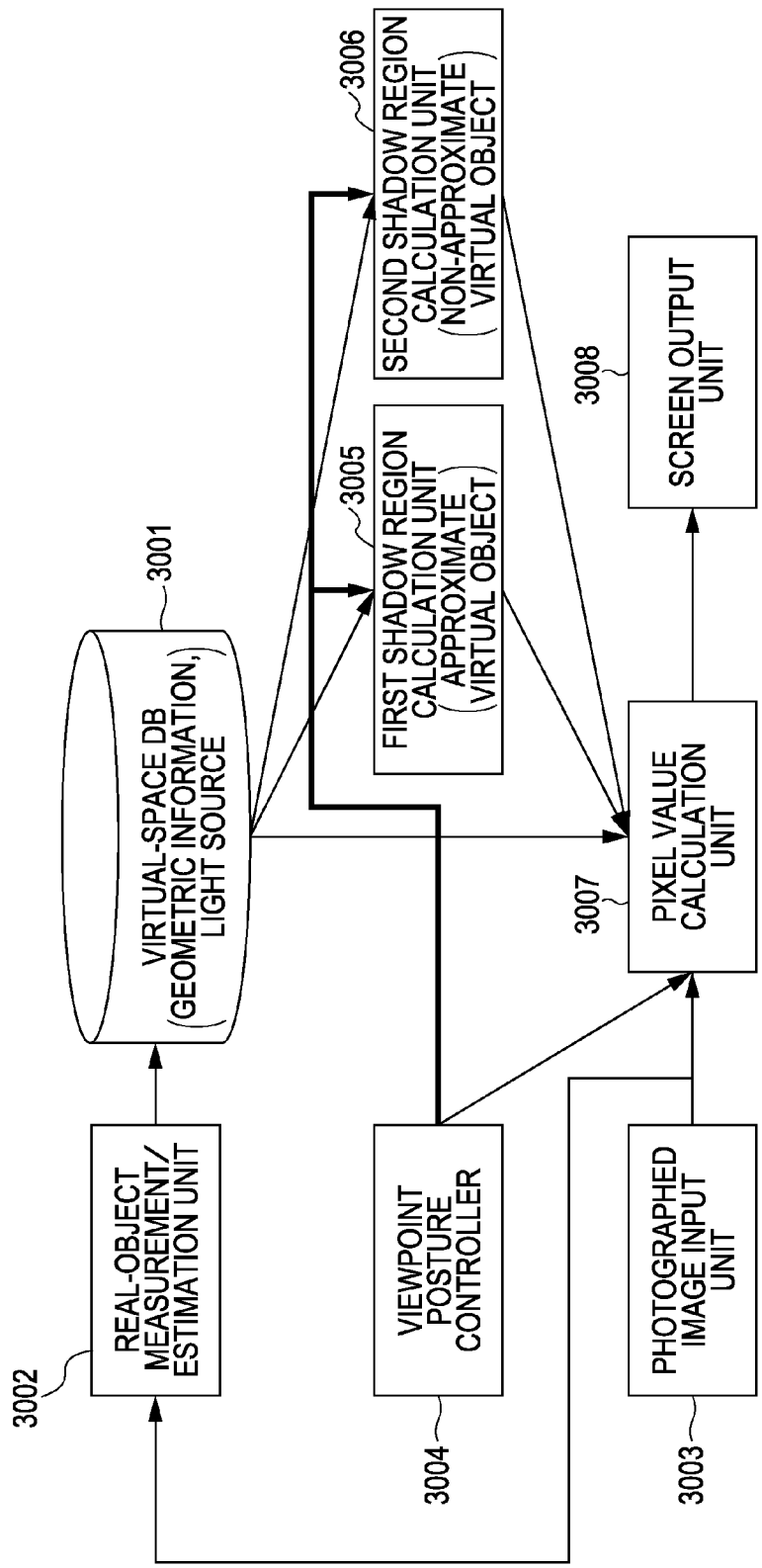
FIG. 30 is a block diagram illustrating an example of an image processing apparatus according to the ninth exemplary embodiment.

Calculation of Non-Approximate Virtual Object Region by Subtraction of Shadow Region FIG. 30 is a block diagram illustrating an example of a configuration of the image processing apparatus according to the ninth exemplary embodiment. A virtual space database (DB) 3001 stores information on a shape, information on material, information on a light source, and information on a posture in a virtual viewpoint, for example. The virtual space DB 3001 is appropriately updated when position information of a virtual object is changed or when attribute information such as the information on material is changed by a user's operation.

A real-object measurement/estimation unit 3002 measures or estimates information on a geometric shape, information on a posture, and information on material of a real object, and supplies them to the virtual space DB 3001. In the ninth exemplary embodiment, depth estimation is performed on a photographed image obtained using a photographed image input unit 3003 by stereo matching. The real-object measurement/estimation unit 3002 performs three-dimensional shape estimation in accordance with a result of the depth estimation, and registers a result of the three-dimensional shape estimation in the virtual space DB 3001.

The real-object measurement/estimation unit 3002 assigns attribute information to a virtual object to be supplied to the virtual space DB 3001, the attribute information indicating that the virtual object is an approximate virtual object. Note that the attribute information is binary information indicating whether an object is an approximate virtual object or a general virtual object (non-approximate virtual object). In accordance with the information, a region in which a shadow is to be cast is calculated.

The photographed image input unit 3003 obtains a video image (an image) captured using a video camera disposed on a head of the user. A photographed image obtained as an input is supplied to the real-object measurement/estimation unit 3002 and a pixel value calculation unit 3007.

A viewpoint posture controller 3004 controls a posture in the virtual viewpoint by detecting a posture of the head of the user. A general method is used for detecting the posture of the head of the user, such as a posture measurement method using a six-degree-of-freedom posture sensor or a method for converting a two-dimensional marker captured using a camera into a posture of a head.

A first shadow region calculation unit 3005 calculates a shadow region of an approximate virtual object registered in the virtual space DB 3001. A method for calculating a shadow includes a method using shadow mapping.

The shadow mapping is a method for calculating a region in which a shadow is cast by rendering depth values (depth information) in a virtual scene viewed from various virtual light sources. The depth values obtained by rendering are stored as depth buffers or texture information. When an image is to be generated by the shadow mapping, rendering utilizing the following two paths should be performed.

First, a shadow map is generated through rendering of a first path. The shadow map is obtained by rendering a z-value in a projection space when a virtual viewpoint corresponds to a position of the virtual light source is selected from among the various virtual light sources. When the obtained shadow map is made visible, texture information indicating that a color on a nearer side is black and a color on a farther side is white is obtained.

Next, in rendering of a second path, a scene of the virtual space DB 3001 is rendered by comparing depth values of a virtual object with values of depth buffers.

As a method for the comparison, the depth values viewed from the virtual light source are written as shadow map. Then, the shadow map is mapped on a screen viewed from the normal virtual viewpoint. Meanwhile, distances from the virtual light source to pixels on the virtual object are obtained when the virtual objet is viewed from the normal virtual viewpoint. Then, for each of the pixels, a value in the shadow map is compared with a distance between the virtual light source to the corresponding pixel obtained through calculation, and it is determined that a portion having a small value in the shadow map is a shadow portion.

A value of the pixel which is determined as the shadow portion is calculated by subtracting a brightness value of the light source which generates a shadow from a pixel value obtained before the shadow is cast in accordance with brightness information of the light source which generates a shadow. This processing is repeatedly performed for the various light sources. Here, since the brightness of the light source and brightness of a surface of an object have a linear relationship, darkness of the shadow may be calculated by independently subtracting a brightness value of each of the various light sources from the pixel value obtained before the shadow is cast. In this way, the region in which the shadow is cast is calculated.

The shadow map is briefly described as above. A general method is used for the method for calculating the shadow map.

A second shadow region calculation unit 3006 calculates a region in which only a shadow of a non-approximate virtual object registered in the virtual space DB 3001 is cast. A method for calculating the region in which the shadow is cast is the same as that used in the first shadow region calculation unit 3005.

The pixel value calculation unit 3007 performs rendering using information supplied from the virtual space DB 3001, information supplied from the first shadow region calculation unit 3005, and information supplied from the second shadow region calculation unit 3006 on the basis of the position of the virtual viewpoint obtained using the viewpoint posture controller 3004 on an image including a background image obtained using the photographed image input unit 3003, so that pixel values are determined.

A screen output unit 3008 outputs all the pixel values obtained using the pixel value calculation unit 3007 to a display unit.

Figure 31:
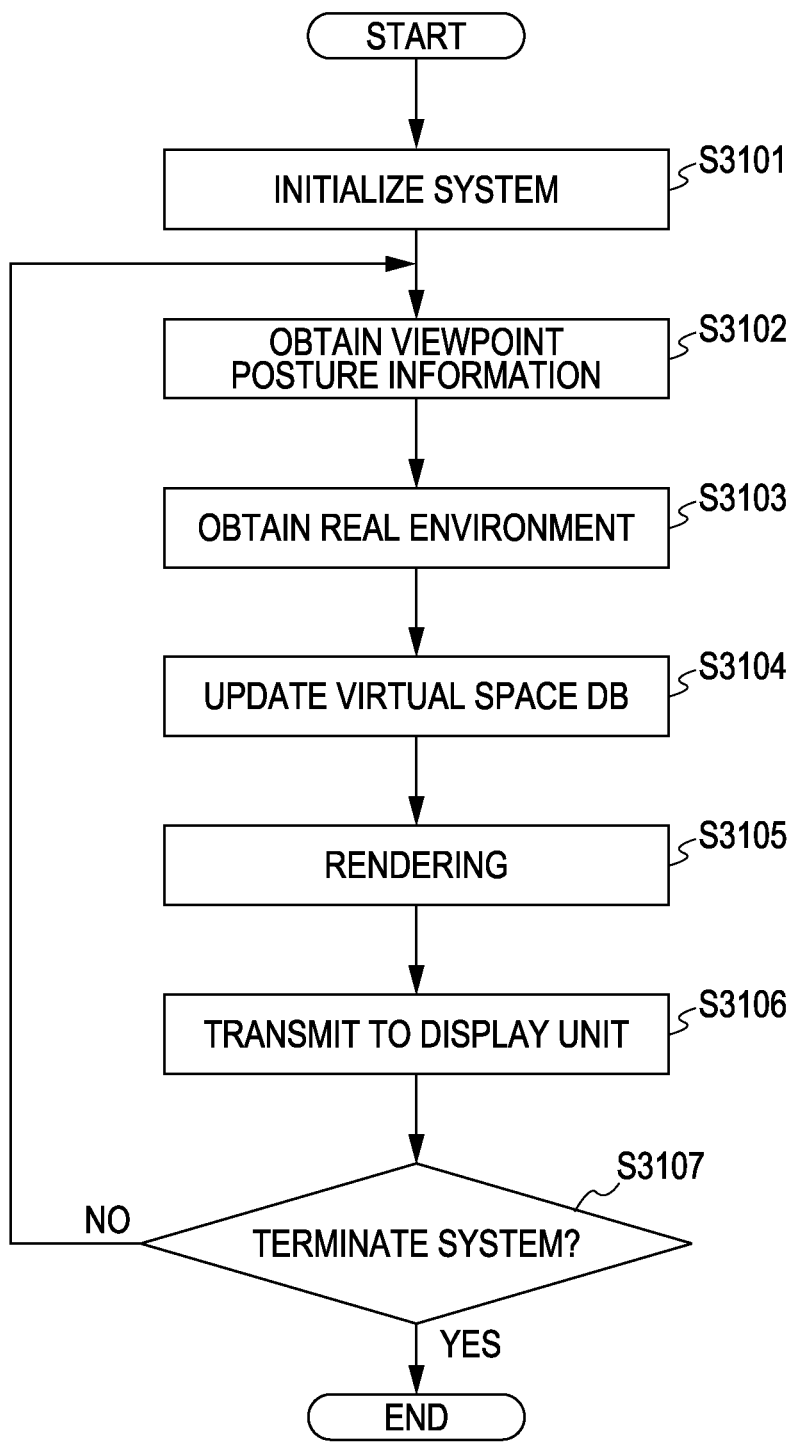
FIG. 31 is a flowchart illustrating operation of the image processing apparatus according to the ninth exemplary embodiment.

FIG. 31 is a flowchart illustrating operation of the image processing apparatus according to the ninth exemplary embodiment. In step S3101, initializing processing such as processing of ensuring a storage region required for performing the operation is performed.

In step S3102, the viewpoint posture controller 3004 obtains information on a head posture of the user.

In step S3103, the real-object measurement/estimation unit 3002 obtains information on a shape and information on material of the real object and information on a real light source. General techniques are employed for a method for obtaining the information on the shape and the information on the material of the real object and a method for obtaining the information on the real light source. For example, a highlight component extracted from a photographed image obtained as a video image is analyzed so that the information on the real light source (position, direction, strength) is calculated and estimated.

In accordance with results of the processing in step S3102 and the processing in step S3103, the virtual space DB 3001 is updated in step S3104. Specifically, the information on the posture of the head of the user obtained in step S3102 is assigned to a posture in the virtual viewpoint in the virtual space. Then, the virtual space DB 3001 registers the information on the shape of the real object obtained in step S3103 in the virtual space.

Here, in order to register a shape of the approximate virtual object in the virtual space, the real-object measurement/estimation unit 3002 generates triangle patches using point group data having three-dimensional position information.

In accordance with the information of the real light source obtained in step S3103, the real-object measurement/estimation unit 3002 arranges a virtual light source in the virtual space. In step S3105, the pixel value calculation unit 3007 performs a rendering operation in accordance with the information on the viewpoint posture obtained in step S3102. The rendering operation will be described in detail hereinafter. In step S3106, the screen output unit 3008 displays an image generated in step S3105 in the display unit.

In step S3107, it is determined whether the system is to be terminated. When the determination is negative, the process returns to step S3102 whereas when the determination is affirmative, processing of terminating the program is performed.

Figure 32:
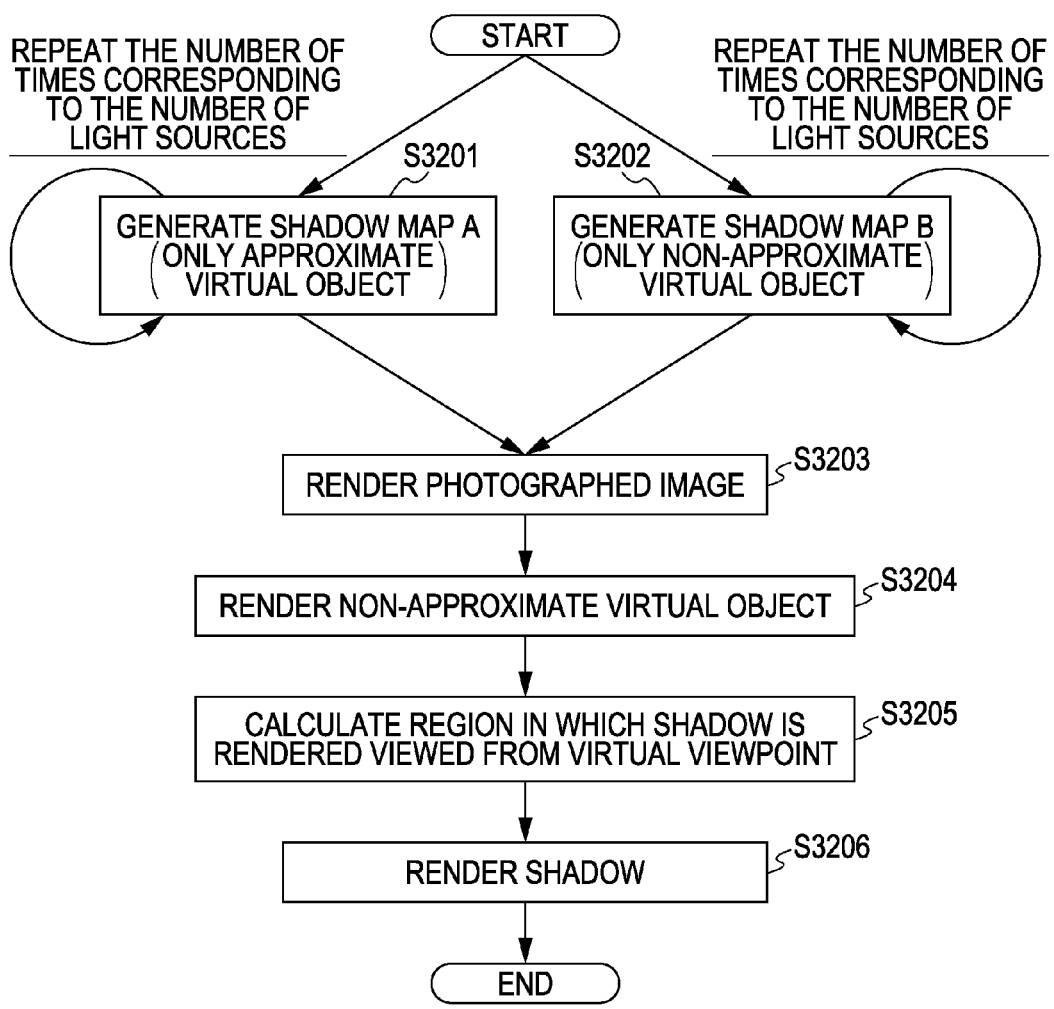
FIG. 32 is a flowchart illustrating a rendering operation performed using the image processing apparatus according to the ninth exemplary embodiment.

The rendering operation will now be described in detail. FIG. 32 is a flowchart illustrating the rendering operation.

In step S3201, the first shadow region calculation unit 3005 calculates the region in which a shadow of the approximate virtual object is cast. Specifically, the first shadow region calculation unit 3005 generates a shadow map A by calculating depth information of the virtual space DB 3001.

In step S3202, the second shadow region calculation unit 3006 generates a shadow map B only using the non-approximate virtual object as an object to be calculated obtained from the virtual space DB 3001.

The shadow map A and the shadow map B are generated for each virtual light source and are stored as texture information in a memory.

In step S3203, the pixel value calculation unit 3007 writes the image obtained using the photographed image input unit 3003 in a frame buffer in order to render the photographed image serving as a background.

In step S3204, the pixel value calculation unit 3007 renders the non-approximate virtual object which is superposed on the photographed image serving as the background.

In step S3205, the pixel value calculation unit 3007 calculates a shadow region of a scene viewed from the virtual viewpoint input using the viewpoint posture controller 3004 on the basis of the shadow maps A and B generated in step S3201 and step S3202. A region in which the shadow is actually rendered as a CG image is calculated by subtracting a region (shadow region A) in which a shadow of the approximate virtual object is cast from a region (shadow region B) in which a shadow of the non-approximate virtual object is cast for each virtual viewpoint.

The difference between the shadow regions A and B is calculated by performing mask processing (or subtraction processing of the pixel values) in a two-dimensional image.

As a result, the region in which only the shadow of the non-approximate virtual object is cast can be rendered as a CG image, and the shadow of the CG image can be rendered without disturbing the real shadow in step S3206.

Here, in addition to the shadow mapping described in this embodiment, examples of a method for calculating the shadow region include a method for calculating a region which is influenced by the shadow as a volume data, that is, a shadow volume method, and a method for calculating global illumination by calculating precomputed radiance transfer.

Note that when shadow regions of all virtual objects are to be calculated, similarly, the shadow regions to be obtained are calculated by removing shadow regions of the approximate virtual object.

Figure 33:
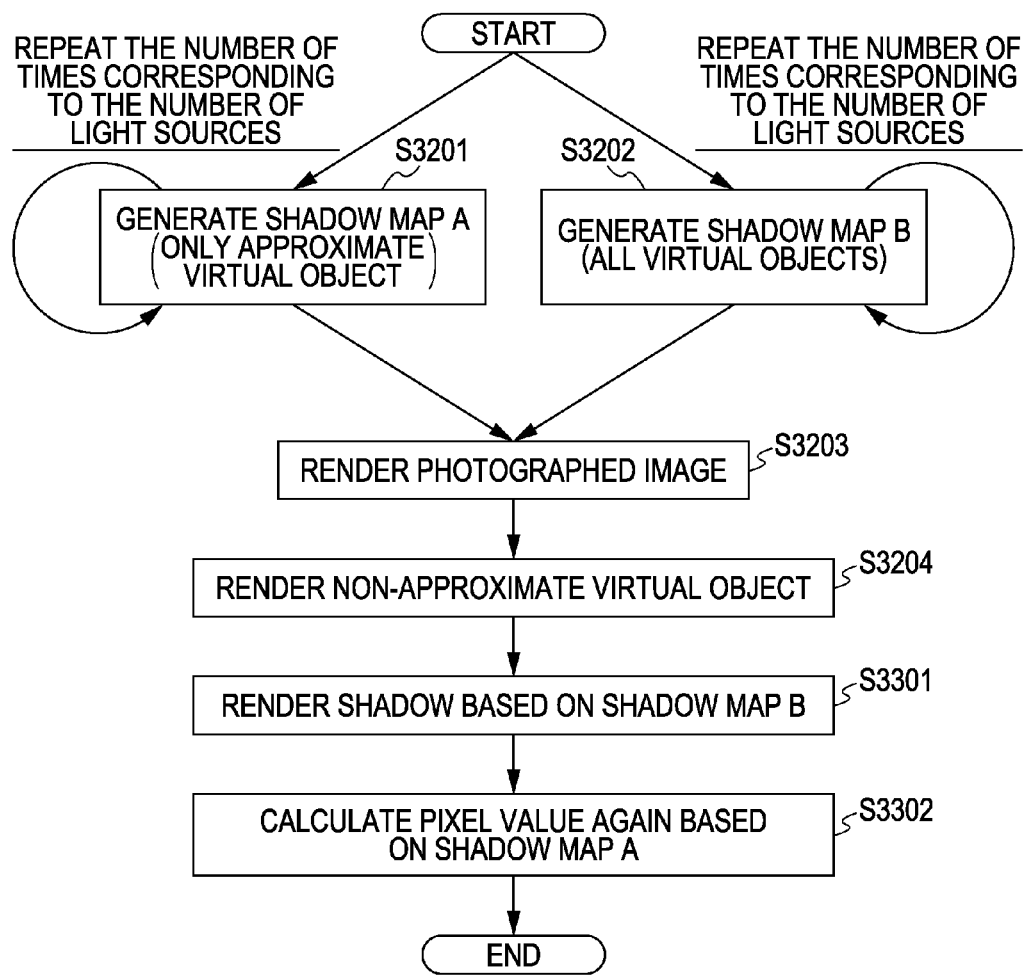
FIG. 33 is a flowchart illustrating another rendering operation performed using the image processing apparatus according to the ninth exemplary embodiment.

In a rendering operation shown in FIG. 33, influence of the shadow of the approximate virtual object generated as the CG image is subtracted when each of the pixel values is calculated.

Operations performed in step S3301 and step S3302 in the rendering operation shown in FIG. 33 are different from the operations performed in step S3205 and step S3206 in the rendering operation shown in FIG. 32. In addition, in step S3202 of FIG. 33, shadow maps B are generated for all the virtual objects.

In step S3301, the pixel value calculation unit 3007 renders shadows as CG images on the image generated in step S3204 on the basis of shadow regions (shadow maps B) of all the virtual objects. In this step, since shadows are rendered as CG images on the shadow regions of all the virtual objects including the approximate virtual object, an appropriate rendering operation is not attained (a region in which a real shadow and a shadow of an CG image are superposed on each other exists).

In step S3302, the pixel value calculation unit 3007 cancels an unnecessary shadow region (a region in which a real shadow and a shadow of a CG image are superposed on each other) rendered in step S3301 on the basis of the shadow region (shadow map A) of the approximate virtual object. This cancelling operation is realized by again calculating values of pixels in the shadow region calculated using the shadow map A. Specifically, shadows rendered as the CG images can be cancelled by calculating all the virtual light sources which are blocked by the approximate virtual object with reference to the shadow map A, and adding brightness values of all the virtual light sources to the pixels.

Figure 34:
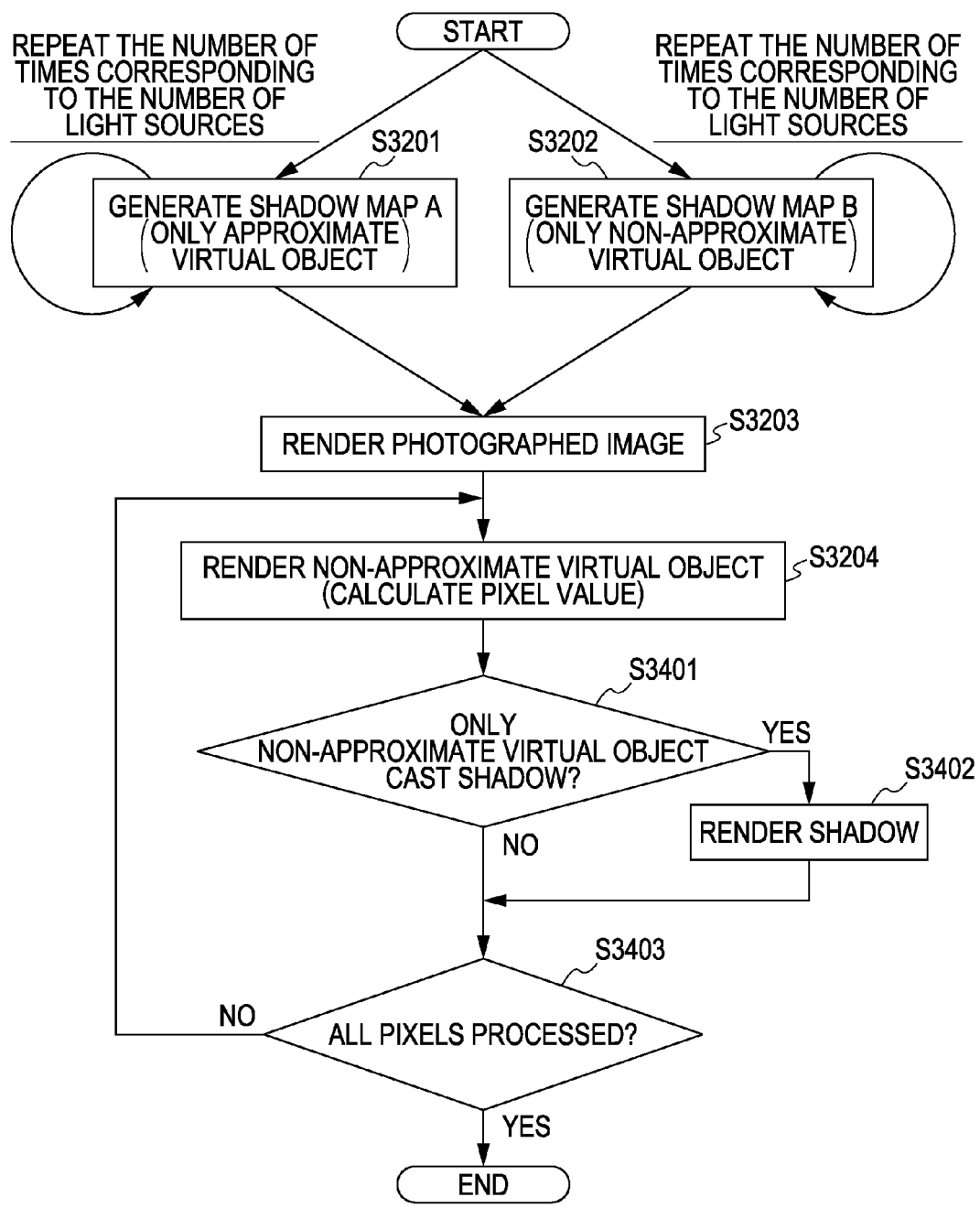
FIG. 34 is a flowchart illustrating still another rendering operation performed using the image processing apparatus according to the ninth exemplary embodiment.

FIG. 34 is a flowchart illustrating another rendering operation performed when rendering calculation of a shadow is performed in a unit of a pixel while a non-approximate virtual object is rendered.

Operations performed in step S3401 to step S3403 in the rendering operation shown in FIG. 34 are different from the operations performed in step S3205 and step S3206 in the rendering operation shown in FIG. 32. Operations performed in step S3201 to step S3204 are the same as those of FIG. 32, and therefore, descriptions thereof are not repeated.

Note that the operations in step S3401 to step S3403 are performed in a unit of a pixel. Accordingly, in step S3204, a value of one of pixels of the non-approximate virtual object is calculated, and thereafter, it is determined whether a shadow is rendered on the pixel.

In step S3401, the pixel value calculation unit 3007 determines whether a shadow is rendered as a CG image on a pixel of interest. Specifically, the pixel value calculation unit 3007 refers to the shadow map B and determines whether a shadow of the non-approximate virtual object is cast on the pixel of interest. When it is determined that the shadow of the non-approximate virtual object is not cast on the pixel of interest, it is not necessary to render the shadow as a CG image, and the process proceeds to step S3403.

Then, the pixel value calculation unit 3007 refers to the shadow map A and determines whether a shadow of the approximate virtual object is cast on the pixel of interest. When it is determined that the shadows of the approximate virtual object and the non-approximate virtual object are cast on the pixel of interest, a real shadow exists. Therefore, it is not necessary to render a shadow as a CG image, and the process proceeds to step S3403.

When only the shadow of the non-approximate virtual object is cast on the pixel of interest, the process proceeds to step S3402 where the shadow is rendered on the pixel of interest.

Here, since the shadow maps are generated for each light source, the determination processing in step S3401 is repeatedly performed with reference to the shadow maps for the light sources.

In step S3402, the pixel value calculation unit 3007 renders the shadow on the pixel of interest. Specifically, the pixel value calculation unit 3007 specifies a virtual light source which relates to the shadow cast on the pixel of interest, and subtracts a brightness value of the virtual light source from a value of a corresponding pixel in the photographed image serving as the background or a value of a corresponding pixel in the non-approximate virtual object.

The virtual light source is specified by specifying a virtual light source which generated the shadow map A in which the shadow is cast on the pixel of interest.

In step S3403, it is determined whether all pixels in a virtual screen have been subjected to calculation. When the determination is negative, the process returns to step S3204 and a value of the next pixel is calculated. On the other hand, when the determination is affirmative, the rendering operation is terminated.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims the benefit of Japanese Patent Application No. 2007-316810 filed Dec. 7, 2007, Japanese Patent Application No. 2007-289966 filed Nov. 7, 2007, Japanese Patent Application No. 2008-006291 filed Jan. 15, 2008, and Japanese Patent Application No. 2008-002163 filed Jan. 9, 2008, which are hereby incorporated by reference herein in their entirety.

What is claimed is:

1. An image processing apparatus, comprising:
    an obtaining unit configured to obtain a real image including a real object;
    a setting unit configured to set a virtual viewpoint, a virtual ray source, and a virtual screen in a virtual space;
    an arrangement unit configured to arrange the virtual space, an approximate virtual object which approximates a shape of the real object and a normal virtual object which does not correspond to any real objects, based on the set virtual viewpoint and the obtained real image;
    a generation unit configured to generate a ray from the virtual viewpoint to a ray source until the generated ray intersects with any virtual objects in the virtual space and generate a new ray from an intersection point at which the generated ray intersects with a virtual object if the generated ray intersects with the virtual object, in accordance with a ray tracing method;
    an intersection determination unit configured to determine whether an object type of a virtual object is an approximate virtual object or a normal virtual object if the ray intersects with the virtual object, and to determine an intersection order of object types for a plurality of virtual objects if the ray intersects with the plurality of virtual objects; and
    a pixel value determination unit configured to determine a pixel value of each pixel on the virtual screen based on the generated ray, a pixel value of a corresponding pixel position in the real image, and a result of determination by the intersection determination unit,
    wherein if the intersection determination unit determines that the generated ray intersects a normal virtual object and thereafter the generated ray intersects an approximate virtual object, the pixel value determination unit determines a pixel value of a pixel position at which the generated ray goes through the virtual screen based on a reflection or a refraction of the normal virtual object and a shadow of the approximate virtual object which casts on the normal virtual object, and
    wherein if the intersection determination unit determines that the generated ray intersects an approximate virtual object and thereafter the generated ray intersects a normal virtual object, the pixel value determination unit determines a pixel value of a pixel position at which the generated ray goes through the virtual screen based on a pixel value of a corresponding pixel position in the real image in consideration of a shadow or a reflection of the normal virtual object.

2. The image processing apparatus according to claim 1, wherein the pixel value determination unit determines a pixel value of a pixel position on the virtual screen using a pixel value of the real image when the intersection determination unit determines that no intersection exists between the ray through the pixel position and any virtual objects.

3. The image processing apparatus according to claim 1, wherein if the intersection determination unit determines that the generated ray successively intersects with the approximate virtual object at least twice and thereafter the generated ray does not intersect any other virtual objects, the pixel value determination unit determines a pixel value of a pixel position at which the generated ray goes through the virtual screen based on a pixel value of a corresponding pixel position in the real image without calculating any shadows.

4. The image processing apparatus according to claim 1, wherein if the intersection determination unit determines that the generated ray successively intersects with the approximate virtual object at least twice and thereafter the generated ray intersects a normal virtual object, the pixel value determination unit determines a pixel value of a pixel position at which the generated ray goes through the virtual screen based on a pixel value of a corresponding pixel position in the real image and a shadow of the normal virtual object.

5. The image processing apparatus according to claim 1, wherein if the intersection determination unit determines that the generated ray successively intersects with the approximate virtual object at least twice and a distance between intersection points on the approximate virtual object is smaller than a threshold, the pixel value determination unit determines a pixel value of a pixel position at which the generated ray goes through the virtual screen with no consideration for a shadow of the approximate virtual object.

6. An image processing method, comprising:
    an obtaining step to obtain a real image including a real object using an image obtaining unit;
    a setting step of setting a virtual viewpoint, a virtual ray source, and a virtual screen in a virtual space;
    an arranging step of arranging in the virtual space an approximate virtual object which approximates a shape of the real object and a normal virtual object which does not correspond to any real objects, based on the set virtual viewpoint and the obtained real image;
    a generating step of generating a ray from the virtual viewpoint to a ray source until the generated ray intersects with any virtual objects in the virtual space and generate a new ray from an intersection point at which the generated ray intersects with a virtual object if the generated ray intersects with the virtual object, in accordance with a ray tracing method;
    an intersection determination step of determining whether an object type of a virtual object is an approximate virtual object or a normal virtual object if the ray intersects with the virtual object, and further determining an intersection order of object types for a plurality of virtual objects if the ray intersects with the plurality of virtual objects; and
    a pixel value determination step of determining a pixel value of each pixel on the virtual screen based on the generated ray, a pixel value of a corresponding pixel position in the real image, and a result of the intersection determination step, wherein, if the intersection determination step determines that the generated ray intersects a normal virtual object and thereafter the generated ray intersects an approximate virtual object, the pixel value determination step determines a pixel value of a pixel position at which the generated ray goes through the virtual screen based on a reflection or a refraction of the normal virtual object and a shadow of the approximate virtual object which casts on the normal virtual object, and wherein, if the intersection determination step determines that the generated ray intersects an approximate virtual object and thereafter the generated ray intersects a normal virtual object, the pixel value determination step determines a pixel value of a pixel position at which the generated ray goes through the virtual screen based on a pixel value of a corresponding pixel position in the real image in consideration of a shadow or a reflection of the normal virtual object.

7. A non-transitory computer-readable storage medium storing program which causes a computer to execute an image processing method comprising:

an obtaining step to obtain a real image including a real object using an image obtaining unit;

a setting step of setting a virtual viewpoint, a virtual ray source, and a virtual screen in a virtual space;

an arranging step of arranging in the virtual space an object type of a virtual object is an approximate virtual object or a normal virtual object if the ray intersects with the virtual object, and further determining an intersection order of object types for a plurality of virtual objects if the ray intersects with the plurality of virtual objects;

an intersection determination step of determining whether an object type of a virtual object is an approximate virtual object or a normal virtual object if the ray intersects with the virtual object, and further determining an intersection order of object types for a plurality of virtual objects if the ray intersects with the plurality of virtual objects; and a pixel value determination step of determining a pixel value of each pixel on the virtual screen based on the generated ray, a pixel value of a corresponding pixel position in the real image, and a result of the intersection determination step, wherein, if the intersection determination step determines that the generated ray intersects a normal virtual object and thereafter the generated ray intersects an approximate virtual object, the pixel value determination step determines a pixel value of a pixel position at which the generated ray goes through the virtual screen based on a reflection or a refraction of the normal virtual object and a shadow of the approximate virtual object which casts on the normal virtual object, and wherein, if the intersection determination step determines that the generated ray intersects an approximate virtual object and thereafter the generated ray intersects a normal virtual object, the pixel value determination step determines a pixel value of a pixel position at which the generated ray goes through the virtual screen based on a pixel value of a corresponding pixel position in the real image in consideration of a shadow or a reflection of the normal virtual object.

\* \* \* \* \*